(12) United States Patent
Al-Yami et al.

(10) Patent No.: US 9,376,905 B2
(45) Date of Patent: Jun. 28, 2016

(54) EXPERT SYSTEMS FOR WELL COMPLETION USING BAYESIAN PROBABILITIES, OPEN HOLE GRAVEL PACK TYPES, GRAVEL PACK DESIGN DETAILS, OPEN HOLE GRAVEL PACKS, AND COMPLETION TYPES

(71) Applicants: Saudi Arabian Oil Company, Dhahran (SA); The Texas A&M University System, College Station, TX (US)

(72) Inventors: Abdullah Saleh Hussain Al-Yami, Dhahran (SA); Jerome Schubert, College Station, TX (US)

(73) Assignees: Saudi Arabian Oil Company, Dhahran (SA); The Texas A&M University System, College Station, TX (US)

( * ) Notice: Subject to any disclaimer, the term of this patent is extended or adjusted under 35 U.S.C. 154(b) by 0 days.

(21) Appl. No.: 14/808,961

(22) Filed: Jul. 24, 2015

(65) Prior Publication Data
US 2015/0332162 A1    Nov. 19, 2015

Related U.S. Application Data

(62) Division of application No. 13/827,581, filed on Mar. 14, 2013, now Pat. No. 9,140,112.

(60) Provisional application No. 61/722,035, filed on Nov. 2, 2012.

(51) Int. Cl.
*G06F 15/18* (2006.01)
*E21B 44/00* (2006.01)
(Continued)

(52) U.S. Cl.
CPC ............... *E21B 44/00* (2013.01); *G06N 5/045* (2013.01); *G06N 7/005* (2013.01)

(58) Field of Classification Search
CPC ............ E21B 1/00; E21B 7/00; E21B 43/16; E21B 2041/0092; E21B 43/00
USPC ................................................ 706/12, 62, 45
See application file for complete search history.

(56) References Cited

U.S. PATENT DOCUMENTS 4,460,045 A    7/1984   Elson et al.
5,749,419 A    5/1998   Coronado et al.
(Continued)

FOREIGN PATENT DOCUMENTS

EP    2090742    8/2009
WO    2006112864    10/2006

OTHER PUBLICATIONS

Al-Yami et al. "Expert System for the Optimal Design and Execution of Successful Completion Practices Using Artificial Bayesian Intelligence" SPE 143826, Brasil Offshore Conference and Exhibition, Macae, Brazil, Jun. 14-17, 2011; pp. 1-24.
(Continued)

*Primary Examiner* — David Vincent
(74) *Attorney, Agent, or Firm* — Bracewell LLP; Constance G. Rhebergen; Brian H. Tompkins

(57) ABSTRACT

Systems and methods are provided for expert systems for well completion using Bayesian decision networks to determine well completion recommendations. The well completion expert system includes a well completion Bayesian decision network (BDN) model that receives inputs and outputs recommendations based on Bayesian probability determinations. The well completion BDN model includes a treatment fluids section, a packer section, a junction classification section, a perforation section, a lateral completion section, and an open hole gravel packing section.

7 Claims, 67 Drawing Sheets

(51) Int. Cl.
*G06N 5/04* (2006.01)
*G06N 7/00* (2006.01)

(56) References Cited

U.S. PATENT DOCUMENTS

| | | | |
|---|---|---|---|
| 6,826,486 | B1 | 11/2004 | Malinverno |
| 7,028,586 | B2 | 4/2006 | Robichaux |
| 7,092,928 | B1 | 8/2006 | Elad et al. |
| 7,509,297 | B2 | 3/2009 | Kerisit |
| 7,650,321 | B2 | 1/2010 | Krishnan et al. |
| 9,140,112 | B2 | 9/2015 | Al-Yami et al. |
| 2003/0116887 | A1 | 6/2003 | Scott |
| 2004/0113061 | A1 | 6/2004 | Valant-Spaight |
| 2004/0154801 | A1 | 8/2004 | Pandey |
| 2005/0091012 | A1 | 4/2005 | Przytula et al. |
| 2005/0192855 | A1 | 9/2005 | Chitty et al. |
| 2009/0076873 | A1 | 3/2009 | Johnson et al. |
| 2009/0132458 | A1 | 5/2009 | Edwards et al. |
| 2009/0182572 | A1 | 7/2009 | Mendoza Garrido |
| 2009/0327207 | A1 | 12/2009 | Anderson et al. |
| 2010/0084191 | A1 | 4/2010 | Chapman et al. |
| 2010/0112217 | A1 | 5/2010 | Pawlik et al. |
| 2011/0155462 | A1 | 6/2011 | Du Castel et al. |
| 2011/0225111 | A1 | 9/2011 | Ringer |
| 2012/0069131 | A1 | 3/2012 | Abelow |

OTHER PUBLICATIONS

Al-Yami et al. "Guidelines for Optimum Underbalanced Drilling Practices Using Artificial Bayesian Intelligence" OTC 22883, Offshore Technology Conference, Houston, Texas, Apr. 30-May 3, 2012; pp. 1-57.
Al-Yami et al. "Underbalanced Drilling Expert System Development" SPE 152101, SPE Western Regional Meeting, Bakersfield, California, Mar. 19-23, 2012, pp. 1-41.
International Search Report and Written Opinion, PCT/US2013/067639, dated Jul. 21, 2014.
International Search Report and Written Opinion, PCT/US2013/067644, dated Jul. 17, 2014.
Martinelli et al. "Building Bayesian Networks from Basin Modeling Scenarios for Improved Geological Decision Making" Petroleum Geoscience Jul. 30, 2012; pp. 1-27.
Al-Yami et al. "Development of a Drilling Expert System for Designing and Applying Successful Cement Jobs" IADC/SPE 135183, Asia Pacific Drilling Technology Conference and Exhibition, Nov. 2010; pp. 1-23.
"Using Bayesian Network to Develop Drilling Expert Systems" http://repository.tamu.edu/handle/1969.1/ETD-TAMU-2012-08-11454, pp. 1-3.
Moridis et al. "SeTES, A Self-Teaching Expert System for the Analysis, Design, and Prediction of Gas Production from Unconventional Gas Resources" Research Partners to Secure Energy for America, Nov. 28, 2011; pp. 1-116.
International Preliminary Report on Patentability for PCT/US2013/067639 dated Feb. 25, 2015.
International Preliminary Report on Patentability for PCT/2013/067644 dated Feb. 25, 2015.
Written Opinion of International Preliminary Examining Authority in PCT/US2013/067639 mailed Nov. 25, 2014.
Written Opinion of International Preliminary Examining Authority in PCT/US2013/067644 mailed Nov. 25, 2014.
International Search Report and Written Opinion, PCT/US2013/067387, mailed Sep. 23, 2014.
International Search Report and Written Opinion, PCT/US2013/067653, mailed Oct. 1, 2014.
Basseville "Detecting Changes in Signals and Systems—A Survey" Automatica, vol. 24, No. 3, 1988; pp. 309-326.
Garrouch et al. "Development of an expert system for underbalanced drilling using fuzzy logic" Journal of Petroleum Science & Engineering, vol. 31, 2001; pp. 23-39.
Lloyd et al. "Practical Application of Real-Time Expert System for Automatic Well Control" IADC/SPE 19919, IADC/SPE Drilling Conference, Houston, Texas, Feb. 27-Mar. 2, 1990; pp. 119-130.
Macarthur "Coiled tubing provides advantages for UB operations" Drilling Contractor, Jul./Aug. 2003; pp. 40-41.
Martin "Manageed Pressure Drilling Techniques and Tools" Thesis for Master of Science degree, Petroleum Engineering, Texas A&M University, May 2006; pp. 1-65.
Muir "Manages Pressure Drilling (MPD) Systems & Applications" retrieved at http://www.drillsafe.org.au/06-08_pres/DrillSafe_Forum_Jun08_KEEP_DRILLING_Ken_Muir_Managed_Pressure_Talk.pdf, 2011; pp. 1-36.
Office Action for co-pending U.S. Appl. No. 13/827,408 dated Apr. 6, 2015.
Office Action for co-pending U.S. Appl. No. 13/827,746 dated Feb. 13, 2015.
Office Action for co-pending U.S. Appl. No. 13/827,794 dated Feb. 25, 2015.
Thomson et al. "Plan Recommendation for Well Engineering" Springer-Vedrlag Berlin Heidelberg, IEA/AIE, Part II, LNAI 6704, 2011; pp. 436-445.

| Swelling packer | Water Swelling Packer | Oil Swelling Packer |
|---|---|---|
| Lactic acid | 0.9 | 0.5 |
| HCl acid | 0.1 | 0.5 |

| Swelling packer | Water Swelling | | Oil Swelling | |
|---|---|---|---|---|
| Treating Fluid | Lactic acid | HCl acid | Lactic acid | HCl acid |
| Formate drilling fluid | 0.8 | 0.2 | 0.8 | 0.2 |
| CaCO₃ drilling fluid | 0.2 | 0.8 | 0.2 | 0.8 |

| Swelling packer | Water Swelling Packer | | | | Oil Swelling Packer | | | |
|---|---|---|---|---|---|---|---|---|
| Drilling fluid | Formate drilling fluid | | CaCO$_3$ drilling fluid | | Formate drilling fluid | | CaCO$_3$ drilling fluid | |
| Treating fluid | Lactic acid | HCl acid | Lactic acid | HCl acid | Lactic acid | HCl acid | Lactic acid | HCl acid |
| Recommended | 0 | 0 | 1 | 0 | 1 | 0 | 0 | 1 |
| Not recommended | 1 | 1 | 0 | 1 | 0 | 1 | 1 | 0 |

FIG. 8

| Consequences | Recommended | Not Recommended |
|---|---|---|
| Value | 1 | 0 |

FIG. 9

| Swelling packer | Water Swelling Packer | Oil Swelling Packer |
|---|---|---|
| Formate drilling fluid | 0.74 | 0.5 |
| $CaCO_3$ drilling fluid | 0.26 | 0.5 |

FIG. 10

|   | Swelling packer | Water Swelling | | Oil Swelling | |
|---|---|---|---|---|---|
| 1102 | Treating Fluid | | | | |
| 1104 | Lactic acid | 0.9729 | 0.6923 | 0.2 | 0.8 |
|  | HCl acid | 0.027 | 0.3076 | 0.8 | 0.2 |
| 1110 | Drilling fluid | | | | |
| 1112 | Formate drilling fluid | Selected by user | | Selected by user | |
|  | CaCO$_3$ drilling fluid | | Selected by user | | Selected by user |

*FIG. 11*

| Swelling packer | Water Swelling Packer | Oil Swelling Packer |
|---|---|---|
| Recommended | 0.6923 | 0.8 |
| Not Recommended | 0.3076 | 0.2 |

*FIG. 12*

| Swelling packer | Water Swelling | Oil Swelling |
|---|---|---|
| Expected utility | 0.6923 | 0.8 |

FIG. 13

| Swelling packer | Water Swelling Packers | Oil Swelling Packers |
|---|---|---|
| Recommended | 0 | 1 |
| Not Recommended | 1 | 0 |

FIG. 14

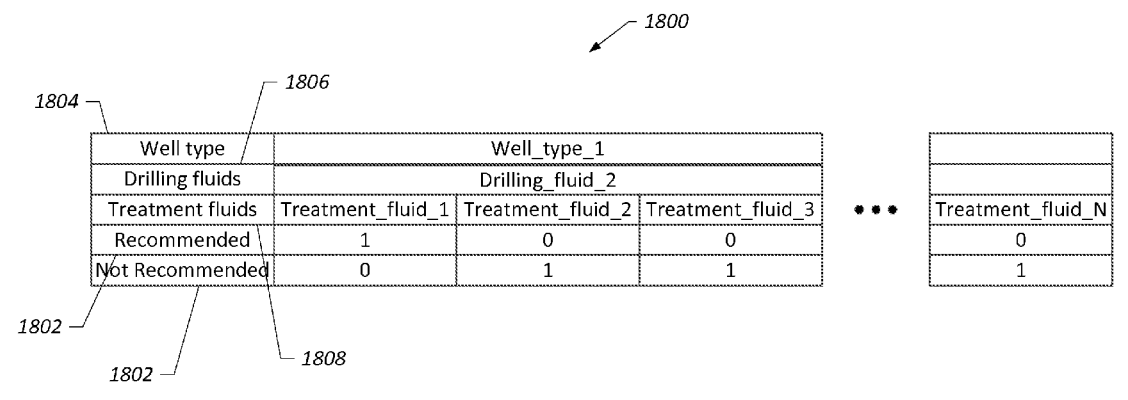

| Well type | Well_type_1 | | | ... | |
|---|---|---|---|---|---|
| Drilling fluids | Drilling_fluid_2 | | | | |
| Treatment fluids | Treatment_fluid_1 | Treatment_fluid_2 | Treatment_fluid_3 | ... | Treatment_fluid_N |
| Recommended | 1 | 0 | 0 | | 0 |
| Not Recommended | 0 | 1 | 1 | | 1 |

FIG. 18

| Packer | Packer_1 | | | | | |
|---|---|---|---|---|---|---|
| Hydrocarbon type | Hydrocarbon_2 | | | | | |
| Completion fluids | Completion_fluid_1 | | | | | |
| Treatment fluids | Treatment_fluid_1 | | | Treatment_fluid_2 | | |
| Wellbore fluids | Wellbore_fluid_1 | ... | Wellbore_fluid_N | Wellbore_fluid_1 | ... | Wellbore_fluid_N |
| Recommended | 1 | ... | 0 | 1 | ... | 0 |
| Not Recommended | 0 | ... | 1 | 0 | ... | 1 |

FIG. 20

| Junction Classification | \multicolumn{4}{c}{Junction_classification_1} |
|---|---|---|---|---|
| Reliability level | \multicolumn{4}{c}{Reliability_level_1} |
| Productivity level | \multicolumn{4}{c}{Productivity_level_1} |
| Cost level | \multicolumn{4}{c}{Cost_level_2} |
| Zonal isolation level | \multicolumn{4}{c}{Zonal_isolation_2} |
| Completion type | \multicolumn{2}{c|}{Completion_type_1} | \multicolumn{2}{c}{Completion_type_2} |
| Consequences (junc.) | Recommended | Not_recommended | Recommended | Not_recommended |
| Recommended | 1 | 0 | 1 | 0 |
| Not Recommended | 0 | 1 | 0 | 1 |

FIG. 24

| Junction Classification Consequences | Recommended | | | | ... |
|---|---|---|---|---|---|
| Lateral completion consequences | Recommended | | | | ... |
| Completion fluid consequences | Recommended | | | | ... |
| Packer consequences | Recommended | | | | ... |
| Open hole gravel pack consequences | Recommended | | | | ... |
| Perforation consequences | Recommended | | Not Recommended | | ... |
| Consequences (junc.) | Recommended | Not_recommended | Recommended | Not_recommended | |
| Recommended | 1 | 0 | 1 | 0 | ... |
| Not Recommended | 0 | 1 | 0 | 1 | |

FIG. 29

| Junction classification | Level_1 | Level_2 | Level_3 | Level_4 | Level_5 |
|---|---|---|---|---|---|
| Recommended | 0 | 0 | 0 | 1 | 0 |
| Not Recommended | 1 | 1 | 1 | 0 | 1 |

FIG. 31

Figure 32:
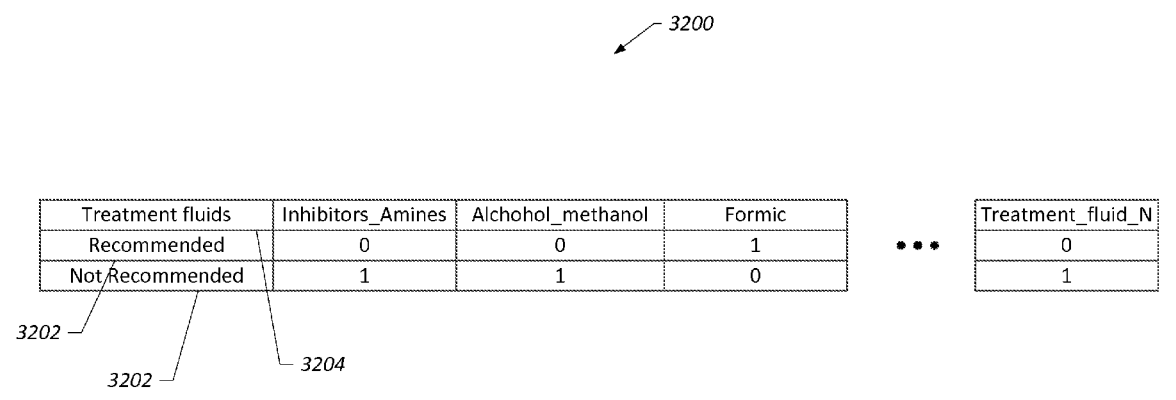

| Treatment fluids | Inhibitors_Amines | Alchohol_methanol | Formic | ... | Treatment_fluid_N |
|---|---|---|---|---|---|
| Recommended | 0 | 0 | 1 | ... | 0 |
| Not Recommended | 1 | 1 | 0 | ... | 1 |

| Junction classification | Level_4 | | | | |
|---|---|---|---|---|---|
| Completion type | Standalone_screen | Open_hole_gravel_pack | Open_hole_expandable_screen | ... | Completion_type_N |
| Recommended | 0 | 0 | 1 | ... | 0 |
| Not Recommended | 1 | 1 | 0 | | 1 |

FIG. 33

| Open hole gravel pack | gravel_pack_fluid_ water_or_oil_with _viscosifier | gravel_pack_fluid_of_ water_used_with_fric tion_reducer | high slurry density of 8 ppa | | Open_hole_gravel _pack_N |
|---|---|---|---|---|---|
| Recommended | 0.05 | 0.05 | 0.05 | ... | 0.05 |
| Not Recommended | 0.95 | 0.95 | 0.95 | | 0.95 |

| Junction classification | Level_4 | | | | |
|---|---|---|---|---|---|
| Completion type | Standalone_screen | Open_hole_gravel_pack | Open_hole_expandable_screen | ... | Completion_type_N |
| Recommended | 0 | 1 | 0 | | 0 |
| Not Recommended | 1 | 0 | 1 | | 1 |

FIG. 36

| Open hole gravel pack | gravel_pack_fluid_ water_or_oil_with _viscosifier | gravel_pack_fluid_of_ water_used_with_fric tion_reducer | high slurry density of 8 ppa | ... | Open_hole_gravel _pack_N |
|---|---|---|---|---|---|
| Recommended | 0 | 0 | 1 | ... | 0 |
| Not Recommended | 1 | 1 | 0 | ... | 1 |

EXPERT SYSTEMS FOR WELL COMPLETION USING BAYESIAN PROBABILITIES, OPEN HOLE GRAVEL PACK TYPES, GRAVEL PACK DESIGN DETAILS, OPEN HOLE GRAVEL PACKS, AND COMPLETION TYPES

RELATED APPLICATIONS

This application is a divisional of U.S. patent application Ser. No. 13/827,581, entitled "Systems and Methods for Expert Systems for Well Completion Using Bayesian Decision Networks" and filed on Mar. 14, 2013, which claims priority to and the benefit of U.S. Provisional Application No. 61/722,035, entitled "Systems and Methods for Expert Systems for Well Completion Using Bayesian Decision Networks" and filed on Nov. 2, 2012, the disclosures both of which are hereby incorporated by reference in their entireties.

BACKGROUND OF THE INVENTION

1. Field of the Invention

This invention relates generally to the drilling and extraction of oil, natural gas, and other resources, and more particularly to evaluation and selection of well completion operations.

2. Description of the Related Art

Oil, gas, and other natural resources are used for numerous energy and material purposes. The search for extraction of oil, natural gas, and other subterranean resources from the earth may cost significant amounts of time and money. Once a resource is located, drilling systems may be used to access the resources, such as by drilling into various geological formations to access deposits of such resources. The drilling systems rely on numerous components and operational techniques to reduce cost and time and maximize effectiveness. For example, drill strings, drill bits, drilling fluids, and other components may be selected to achieve maximum effectiveness for a formation and other parameters that affect the drilling system. Typically, many years of field experience and laboratory work are used to develop and select the appropriate components and operational practices for a drilling system. However, these techniques may be time-consuming and expensive. Moreover, such techniques may produce inconsistent results and may not incorporate recent changes in practices and opinions regarding the drilling systems.

SUMMARY OF THE INVENTION

Various embodiments of systems and methods for expert systems for well completion using Bayesian decision networks are provided. In some embodiments, a system is provided having one or more processors and a non-transitory tangible computer-readable memory. The memory includes a well completion expert system executable by the one or more processors and configured to provide one or more well completion recommendations based on one or more inputs, the well completion expert system comprising a well completion Bayesian decision network (BDN) model. The well completion BDN model includes a drilling fluids uncertainty node configured to receive one or more drilling fluids from the one or more inputs, a well types uncertainty node configured to receive one or more well types from the one or more inputs, a treatment fluids uncertainty node configured to receive one or more treatment fluids from the one or more inputs, and a completion fluid consequences node dependent on the drilling fluids uncertainty node, the well types uncertainty node, and the treatment fluids decision node. The completion fluid consequences node is configured to output the one or more well completion recommendations based on one or more Bayesian probabilities calculated from the one or more drilling fluids, the one or more well types, and the one or more treatment fluids.

Additionally, in some embodiments, a system is provided having one or more processors and a non-transitory tangible computer-readable memory. The memory includes a well completion expert system executable by the one or more processors and configured to provide one or more well completion recommendations based on one or more inputs, the well completion expert system comprising a well completion Bayesian decision network (BDN) model. The well completion BDN model includes a wellbore fluids uncertainty node configured to receive one or more wellbore fluids from the one or more inputs, a hydrocarbon types uncertainty node configured to receive one or more hydrocarbon types from the one or more inputs, a completion fluids uncertainty node configured to receive one or more completion fluids from the one or more inputs, a packers decision node configured to receive one or more packers from the one or more inputs, a treatment fluids decision node configured to receive one or more treatment fluids from the one or more inputs, and a packers consequences node dependent on the wellbore fluids uncertainty node, the hydrocarbon types uncertainty node, the completion fluids uncertainty node, the packers decision node, and the treatment fluids decision node. The packer consequences node is configured to output the one or more well completion recommendations based on one or more Bayesian probabilities calculated from the one or more wellbore fluids, the one or more hydrocarbon types, the one or more completion fluids, the one or more packers, and the one or more treatment fluids.

In some embodiments, a system is also provided having one or more processors and a non-transitory tangible computer-readable memory. The memory includes a well completion expert system executable by the one or more processors and configured to provide one or more well completion recommendations based on one or more inputs, the well completion expert system comprising a well completion Bayesian decision network (BDN) model. The well completion BDN model includes a multilateral junction design considerations uncertainty node configured to receive multilateral junction design considerations from the one or more inputs, a junction classification decision node configured to receive one or more junction classifications from the one or more inputs, and a junction classification consequences node dependent on the multilateral junction design considerations uncertainty node and the junction classification decision node. The junction classifications consequences node is configured to output one or more well completion recommendations based on one or more Bayesian probabilities calculated from the one or more multilateral junction design considerations and the one or more junction classifications.

In some embodiments, a system is also provided having one or more processors and a non-transitory tangible computer-readable memory. The memory includes a well completion expert system executable by the one or more processors and configured to provide one or more well completion recommendations based on one or more inputs, the well completion expert system comprising a well completion Bayesian decision network (BDN) model. The well completion BDN model includes a zonal isolation types uncertainty node configured to receive one or more zonal isolation types from the one or more inputs, a reliability level uncertainty node configured to receive one or more reliability levels from the one or more inputs, a cost level uncertainty node configured to receive one or more cost levels from the one or more inputs, a productivity level uncertainty node configured to receive one or more productivity levels from the one or more inputs, a completion type decision node configured to receive one or more completion types from the one or more inputs, a junction classification decision node configured to receive one or more junction classifications from the one or more inputs, and a completion consequences node dependent on the zonal isolation types uncertainty node, the reliability level uncertainty node, the cost level uncertainty node, the productivity level uncertainty node, the completion type decision node, and the junction classifications decision node. The completion consequences node is configured to output one or more well completion recommendations based on one or more Bayesian probabilities calculated from the one or more zonal isolation types, the one or more reliability levels, the one or more cost levels, the one or more productivity levels, the one or more completion types, and the one or more junction classifications.

Additionally, in some embodiments, a system is also provided having one or more processors and a non-transitory tangible computer-readable memory. The memory includes a well completion expert system executable by the one or more processors and configured to provide one or more well completion recommendations based on one or more inputs, the well completion expert system comprising a well completion Bayesian decision network (BDN) model. The well completion BDN model includes a fluid loss formation uncertainty node configured to receive one or more fluid loss formations from the one or more inputs, an open hole gravel pack type uncertainty node dependent on the fluid loss formation uncertainty node and configured to receive one or more open hole gravel pack types from the one or more inputs, a gravel pack design details uncertainty node configured to receive one or more gravel pack design details from the one or more inputs, an open hole gravel pack decision node uncertainty node configured to receive one or more open hole gravel packs from the one or more inputs, a completion type decision node configured to receive one or more completion types from the one or more inputs, and an open hole gravel pack consequences node dependent on the open hole gravel pack type uncertainty node, the gravel pack design details uncertainty node, the open gravel pack decision node, and the completion type decision node. The open hole gravel pack consequences node is configured to output one or more well completion recommendations based on one or more Bayesian probabilities calculated from the one or more open hole gravel pack types, the one or more gravel pack design details, the one or more open hole gravel packs, and the one or more completion types.

Further, in some embodiments, a system is also provided having one or more processors and a non-transitory tangible computer-readable memory. The memory includes a well completion expert system executable by the one or more processors and configured to provide one or more well completion recommendations based on one or more inputs, the well completion expert system comprising a well completion Bayesian decision network (BDN) model. The well completion BDN model includes an underbalanced (UB) perforation utility uncertainty node configured to receive one or more UB perforation utilities from the one or more inputs, a fluids damage and temperature effects uncertainty node dependent on the UB perforation utility uncertainty node and configured to receive one or more fluid damages, temperature effects, or a combination thereof from the one or more inputs, a perforation considerations uncertainty node dependent on the fluids damage and temperature effects uncertainty node and configured to receive one or more perforation considerations from the one or more inputs, a perforation analysis uncertainty node dependent on the perforation considerations uncertainty node and configured to receive one or more perforation analyses from the one or more inputs, a perforation type uncertainty node configured to receive one or more perforation types from the one or more inputs, a completion type decision node configured to receive one or more completion types from the one or more inputs, and a perforation consequences node dependent on the perforation analysis uncertainty node, the perforation type decision node, and the completion type decision node. The perforation consequences node is configured to output one or more well completion recommendations based on one or more Bayesian probabilities calculated from the one or more perforation analyses, the one or more perforation types, and the one or more completion types.

Moreover, in some embodiment a computer-implemented method is provided that includes receiving, at one or more processors, one or more inputs and providing, by one or more processors, the one or more inputs to one or more nodes of the well completion BDN model. The one or more nodes include a drilling fluids uncertainty node, a well types uncertainty node, a treatment fluids decision node, and a consequences node dependent on the drilling fluids uncertainty node, the well types uncertainty node, and the treatment fluids decision node. The method also includes determining, by one or more processors, one or more well completion recommendations at the consequences node of the well completion BDN model, the determination comprising a calculation of one or more Bayesian probabilities based on the one or more inputs and providing, by one or more processors, the one or more well completion recommendations to a user.

In some embodiments, another computer-implemented method is also provided that includes receiving, at one or more processors, one or more inputs and providing, by one or more processors, the one or more inputs to one or more nodes of the well completion BDN model. The one or more nodes include a wellbore fluids uncertainty node, a hydrocarbon types uncertainty node, a completion fluids uncertainty node, a packers decision node, a treatment fluids decision node, and a consequences node dependent on the wellbore fluids uncertainty node, the hydrocarbon types uncertainty node, the completion fluids uncertainty node, the packers decision node, and the treatment fluids decision node. The method also includes determining, by one or more processors, one or more well completion recommendations at the consequences node of the well completion BDN model, the determination comprising a calculation of one or more Bayesian probabilities based on the one or more inputs and providing, by one or more processors, the one or more well completion recommendations to a user.

In some embodiments, another computer-implemented method is also provided that includes receiving, at one or more processors, one or more inputs and providing, by one or more processors, the one or more inputs to one or more nodes of the well completion BDN model. The one or more nodes include a multilateral junction design considerations uncertainty node, a junction classification decision node, and a consequences node dependent on the multilateral junction design considerations uncertainty node and the junction classification decision node. The method also includes determining, by one or more processors, one or more well completion recommendations at the consequences node of the well completion BDN model, the determination comprising a calculation of one or more Bayesian probabilities based on the one or more inputs and providing, by one or more processors, the one or more well completion recommendations to a user.

Further, in some embodiments, another computer-implemented method is also provided that includes receiving, at one or more processors, one or more inputs and providing, by one or more processors, the one or more inputs to one or more nodes of the well completion BDN model. The one or more nodes include a zonal isolation types uncertainty node, a reliability level uncertainty node, a cost level uncertainty node, a productivity level uncertainty node, a completion type decision node, a junction classification decision node, and a consequences node dependent on the zonal isolation types uncertainty node, the reliability level uncertainty node, the cost level uncertainty node, the productivity level uncertainty node, the completion type decision node, and the junction classification decision node. The method also includes determining, by one or more processors, one or more well completion recommendations at the consequences node of the well completion BDN model, the determination comprising a calculation of one or more Bayesian probabilities based on the one or more inputs and providing, by one or more processors, the one or more well completion recommendations to a user.

In some embodiments, a computer-implemented method is also provided that includes receiving, at one or more processors, one or more inputs and providing, by one or more processors, the one or more inputs to one or more nodes of the well completion BDN model. The one or more nodes include a fluid loss formation uncertainty node, an open hole gravel pack type uncertainty node dependent on the fluid loss formation uncertainty node, a gravel pack design details uncertainty node, an open hole gravel pack decision node uncertainty node, a completion type decision node, and a consequences node dependent on the open hole gravel pack type uncertainty node, the gravel pack design details uncertainty node, the open gravel pack decision node, and the completion type decision node. The method also includes determining, by one or more processors, one or more well completion recommendations at the consequences node of the well completion BDN model, the determination comprising a calculation of one or more Bayesian probabilities based on the one or more inputs and providing, by one or more processors, the one or more well completion recommendations to a user.

Finally, a computer-implemented method is provided that includes receiving, at one or more processors, one or more inputs and providing, by one or more processors, the one or more inputs to one or more nodes of the well completion BDN model. The one or more nodes include an underbalanced (UB) perforation utility uncertainty, a fluids damage and temperature effects uncertainty node dependent on the UB perforation utility uncertainty node, a perforation considerations uncertainty node dependent on the fluids damage and temperature effects uncertainty node, a perforation analysis uncertainty node dependent on the perforation considerations uncertainty node, a perforation type decision node configured to receive one or more perforation types from the one or more inputs, a completion type decision node, and a consequences node dependent on the perforation analysis uncertainty node, the perforation type decision node, and the completion type decision node. The method also includes determining, by one or more processors, one or more well completion recommendations at the consequences node of the well completion BDN model, the determination comprising a calculation of one or more Bayesian probabilities based on the one or more inputs and providing, by one or more processors, the one or more well completion recommendations to a user.

BRIEF DESCRIPTION OF THE DRAWINGS

FIGS. 5-8 are tables of the probability states associated with the nodes of the Bayesian decision network model of FIG. 4;

FIG. 9 is a table of input utility values assigned to a consequences node of the Bayesian decision network model of FIG. 4;

FIG. 10 is a table of total probability calculations for drilling fluid types of the Bayesian decision network model of FIG. 4;

FIG. 11 is a table of Bayesian probability determinations for the Bayesian decision network model of FIG. 4;

FIG. 12 is a table of consequences based on the Bayesian probability determinations depicted in FIG. 11;

FIG. 13 is a table of expected utilities based on the consequences depicted in FIG. 12;

FIG. 14 is a table of consequences based on the probability states depicted in FIG. 8;

FIG. 18 is a table depicting outputs from a completion fluid section of the well completion BDN model of FIGS. 16A and 16B in accordance with an embodiment of the present invention;

FIG. 20 is a table depicting outputs from a packer section of the well completion BDN model of FIGS. 16A and 16B in accordance with an embodiment of the present invention;

FIG. 24 is a table depicting outputs from a lateral completion section of the well completion BDN model of FIGS. 16A and 16B in accordance with an embodiment of the present invention;

FIG. 29 is a table depicting outputs from a final consequences node of the well completion BDN model of FIGS. 16A and 16B in accordance with an embodiment of the present invention;

FIG. 31 is a table depicting outputs from a junction classification section of the well completion BDN model of FIGS. 16A and 16B in accordance with an embodiment of the present invention;

FIG. 32 is a table depicting outputs from a completion fluids section of the well completion BDN model of FIGS. 16A and 16B in accordance with an embodiment of the present invention;

FIG. 33 is a table depicting outputs from a lateral completion section of the well completion BDN model of FIGS. 16A and 16B in accordance with an embodiment of the present invention;

FIG. 34 is a table depicting outputs from an open hole gravel pack section of the well completion BDN model of FIGS. 16A and 16B in accordance with an embodiment of the present invention;

FIG. 36 is a table depicting outputs from an lateral completion section of the well completion BDN model of FIGS. 16A and 16B in accordance with an embodiment of the present invention;

FIG. 38 is a table depicting outputs from an open hole gravel pack section of the well completion BDN model of FIGS. 16A and 16B in accordance with an embodiment of the present invention;

Figure 1:
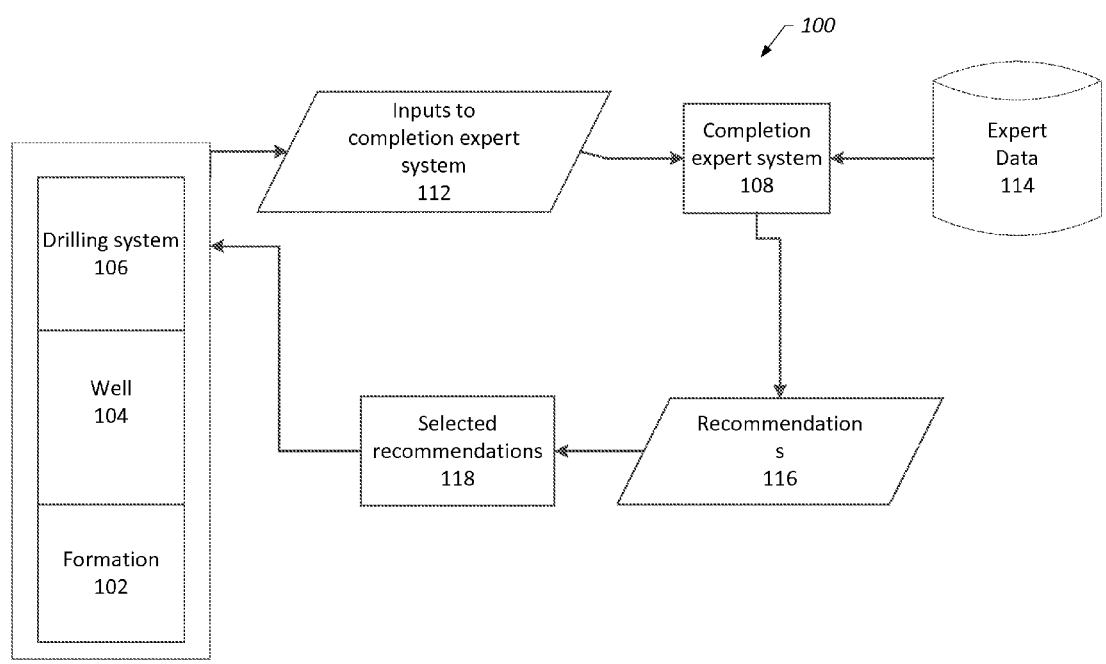
FIG. 1 is a block diagram that illustrates a system in accordance with an embodiment of the present invention.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION

As discussed in more detail below, provided in some embodiments are systems and methods for expert systems for well completion based on Bayesian decision networks. The well completion expert system includes a user interface and probability data based on expert opinions. The well completion expert system includes a well completion Bayesian decision network model having six sections: a treatment fluids section, a packer section, a junction classification section, a perforation section, a lateral completion section, and an open hole gravel packing section. Each section includes uncertainty nodes and decision nodes that receive inputs, and the consequences node form each section may output a recommendation based on the inputs and Bayesian probability determinations.

FIG. 1 is a block diagram that illustrates a system 100 in accordance with an embodiment of the present invention. The system 100 includes a formation 102, a well 104, and a drilling system 106. The system 100 also includes a completion expert system 108 for use with the drilling system 106. As described further below, the completion expert system 108 may be implemented on a computer and may include a Bayesian decision network to evaluate inputs and output recommended completion operations for use with the drilling system 106. As will be appreciated, the well 104 may be formed on the formation 102 to provide for extraction of various resources, such as hydrocarbons (e.g., oil and/or natural gas), from the formation 102. In some embodiments, the well 104 is land-based (e.g., a surface system) or subsea (e.g., a subsea system).

The drilling system 106 may develop the well 104 by drilling a hole into the formation 102 using a drill bit, e.g., a roller cone bits, drag bits, etc. The drilling system 106 may generally include, for example, a wellhead, pipes, bodies, valves, seals and so on that enable drilling of the well 104, provide for regulating pressure in the well 16, and provide for the injection of chemicals into the well 104. After drilling the well, the well may be completed as a production well for producing hydrocarbons. For example, a completion operation may include running and cementing production casing, and attaching a production wellhead (sometimes referred to as a "Christmas tree") to the well, and suspending production tubing in the well. The completion operation may include require several different decisions, such as the use of treating fluid (also referred to as "completion fluid), the use of sealing elements (referred to as "packers"), the use of junctions (such as multilateral junctions between a main bore and lateral bores), the use of lateral completion technologies, the use of perforations (such as for perforating the casing to connect the reservoir with the inside of the well, and the use of gravel packs in an open-hole completion (such as in sand reservoirs to prevent sand from clogging or damaging the well). In some embodiments, the well 104, drilling system 106 and other components may include sensors, such as temperature sensors, pressure sensors, and the like, to monitor the drilling process and enable a user to gather information about well conditions.

The drilling system 106, well 104, and formation 102 may provide a basis for various inputs 112 to the completion expert system 108. For example, as described below, the types of drilling fluids, the type of well, the type of wellbore fluids, the type of hydrocarbon, cost, and so on may be provided as inputs 112 to the completion expert system 108. The completion expert system 108 may access an expert data repository 114 that includes expert data, such as probability data used by the well completion expert system 108. The expert data may be derived from best practices, expert opinions, research papers, and the like. As described further below, based on the inputs 112, the well completion expert system 108 may output well completion recommendations 116 for use in the drilling system 106. For example, the well completion expert system 108 may provide for recommendations 116 for a completion operation, such as packer recommendations, completion fluid recommendations, junction recommendations, completion type recommendations, perforation recommendations, and open hole gravel packing recommendations. A user may select some or all of these recommendations, and the selected recommendations 118 may be implemented in a completion operation performed on the well 104.

Figure 2:
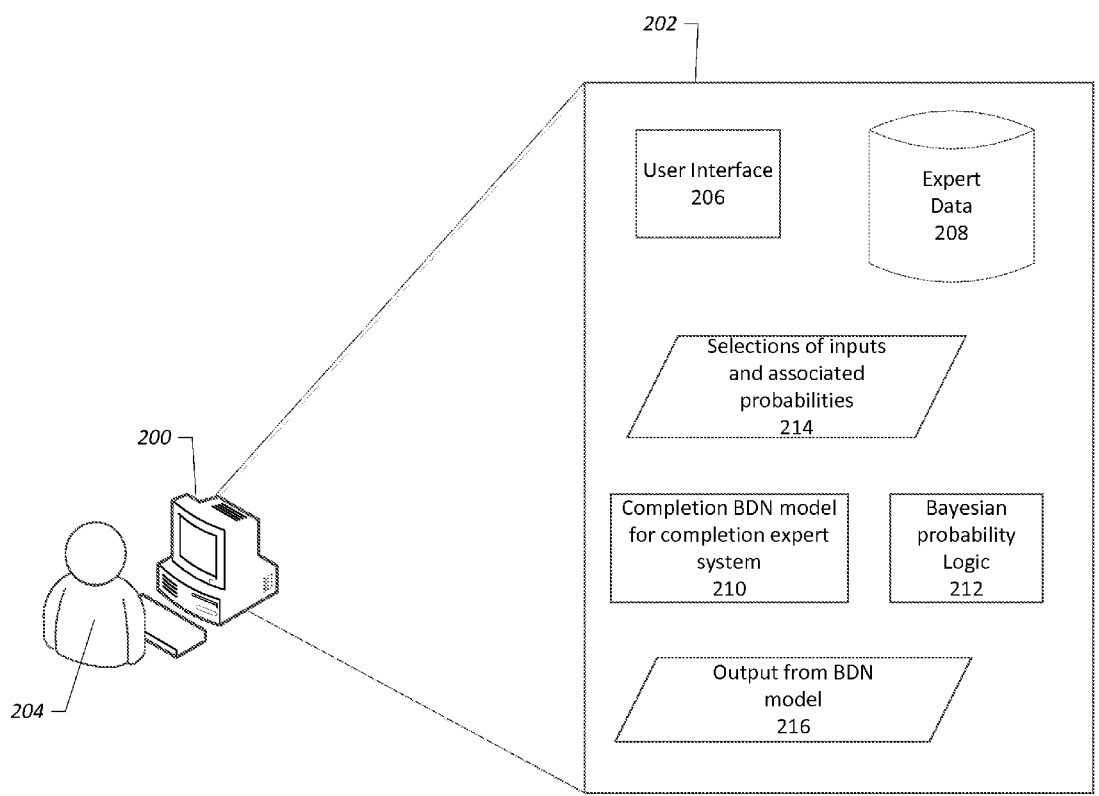
FIG. 2 is a schematic diagram of a computer and a well completion expert system in accordance with an embodiment of the present invention.

FIG. 2 depicts a computer 200 implementing a well completion expert system 202 in accordance with an embodiment of the present invention. As shown in FIG. 2, a user 204 may interact with the computer 200 and the well completion expert system 202. In some embodiments, as shown in FIG. 2, the well completion expert system 202 may be implemented in a single computer 200. However, in other embodiments, the well completion expert system 202 may be implemented on multiple computers in communication with each other over a network. Such embodiments may include, for example, a client/server arrangement of computer, a peer-to-peer arrangement of computers, or any other suitable arrangement that enables execution of the well completion expert system 202. In some embodiments, the well completion expert system 202 may implemented as a computer program stored on a memory of the computer 200 and executed by a process of the computer 200.

In some embodiments, the well completion expert system 202 may include a user interface 206 and an expert data repository 208. The user interface 206 may be implemented using any suitable elements, such as windows, menus, buttons, web pages, and so on. As described in detail below, the well completion expert system 202 may include a completion Bayesian decision network (BDN) model 210 that implemented Bayesian probability logic 212. The completion BDN model 210 may evaluate selections of inputs and associated probabilities 214 and output a decision 216 from the BDN model. In the embodiments described herein, the completion BDN model 210 may include six sections related to well completion: treatment fluids, packers, junction classification, perforation, lateral completion, and an open hole gravel packing. The completion BDN model 210 may then calculate Bayesian probabilities for the consequences resulting from the selected inputs, and then output well completion recommendations. The output may include an expected utility value for each well control recommendations to enable to user to evaluate and select the well completion recommendations having the optimal expected utility for the selected inputs.

As described below, a user 204 may use the user interface 206 to enter selections 210 of inputs for the BDN model 210. The associated probabilities for the inputs may be obtained from the expert data repository 208. Based on the inputs 210, a user 204 may receive the outputs 212 from the BDN model 210, such as well completion recommendations and expected utility value. The output 212 may be provided for viewing in the user interface 206. Further, as explained below, a user may return to the well completion expert system 202 to add or change the inputs 214. The BDN model 210 may recalculate the outputs 216 based on the added or changed inputs 214 and the Bayesian probability logic 212. The recalculated outputs 216 may then provide additional or changed completion recommendations and expected utility values. Here again, the outputs 216 may be provided to the user in the user interface 206.

Figure 3A:
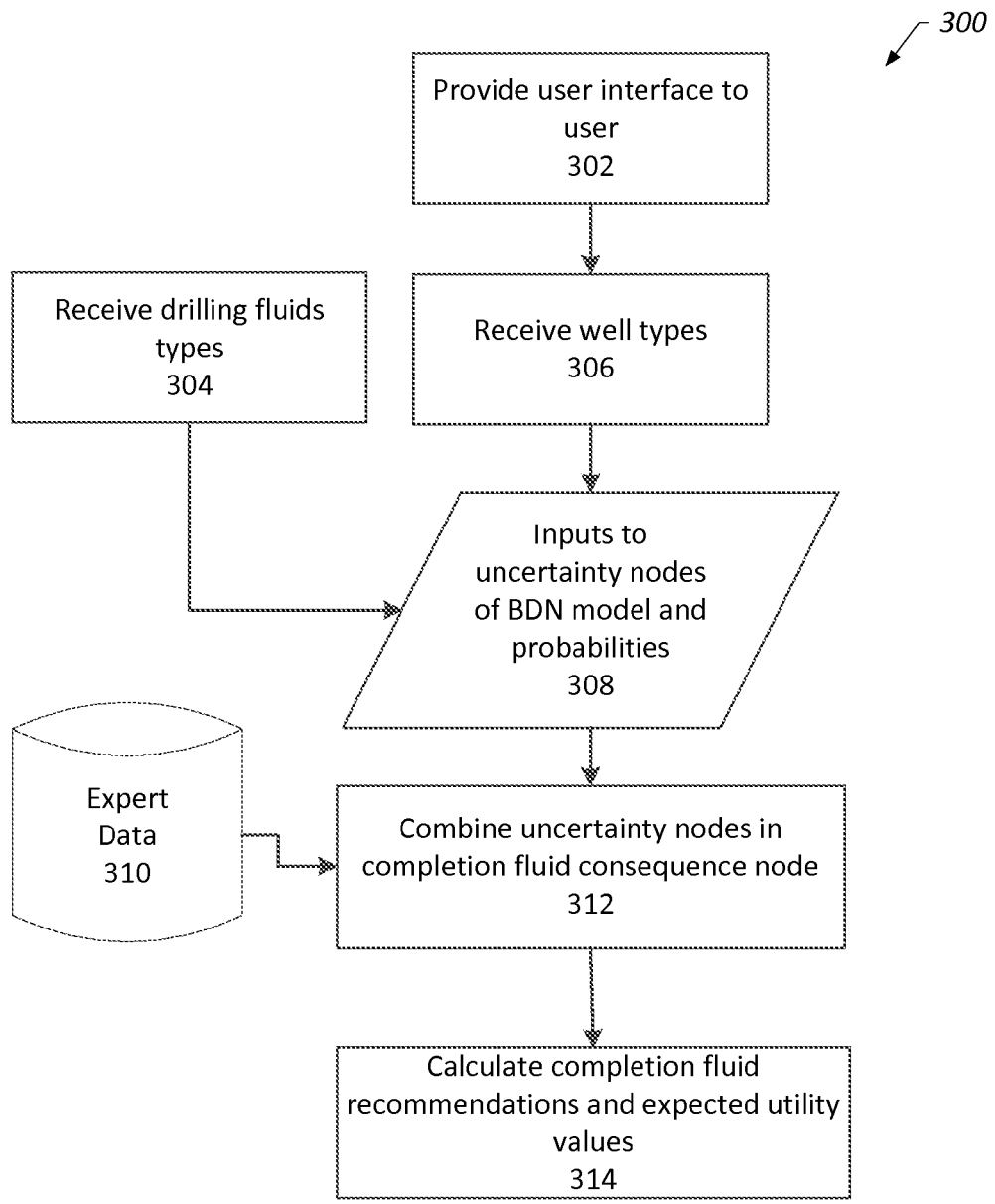
FIGS. 3A-3F are a block diagrams of processes of a well completion expert system in accordance with an embodiment of the present invention.

FIG. 3A depicts a process 300 of the operation of a portion of a well completion expert system in accordance with an embodiment of the present invention. The process 300 illustrates a process for a treating fluid section of the well completion expert system, as illustrated further below. Initially, a user interface for a well completion expert system may be provided to a user (block 302). From the user interface, various selections of inputs may be received. For example, drilling fluid types may be received (block 304) by the well completion expert system. As explained below, a user may enter a selection of one or more drilling fluid types into the well completion expert system. Additionally, well types may be received (block 306) by the well completion expert system. Any one of or combination of these selections may be received. As described below, the well completion expert system enables a user to enter inputs at any node of the well completion BDN model.

Next, the received selections may be provided as inputs to uncertainty nodes of a well completion BDN model of the well completion expert system (block 308), and the inputs may include associated probability states, as determined from expert data 312. Next, the data from the uncertainly nodes may be combined (i.e., propagated to) a consequence node of the well completion BDN model based on the expert data (block 310). The propagation and determination of consequences is based on the Bayesian logic described below in FIGS. 2-15 and implemented in the well completion BDN model. Next, well completion recommendations and expected utility values may be calculated by the BDN model (block 316). In some embodiments, the recommended well completion practices, expected utility values, or both may be output in a user interface of the well completion expert system.

Figure 3B:
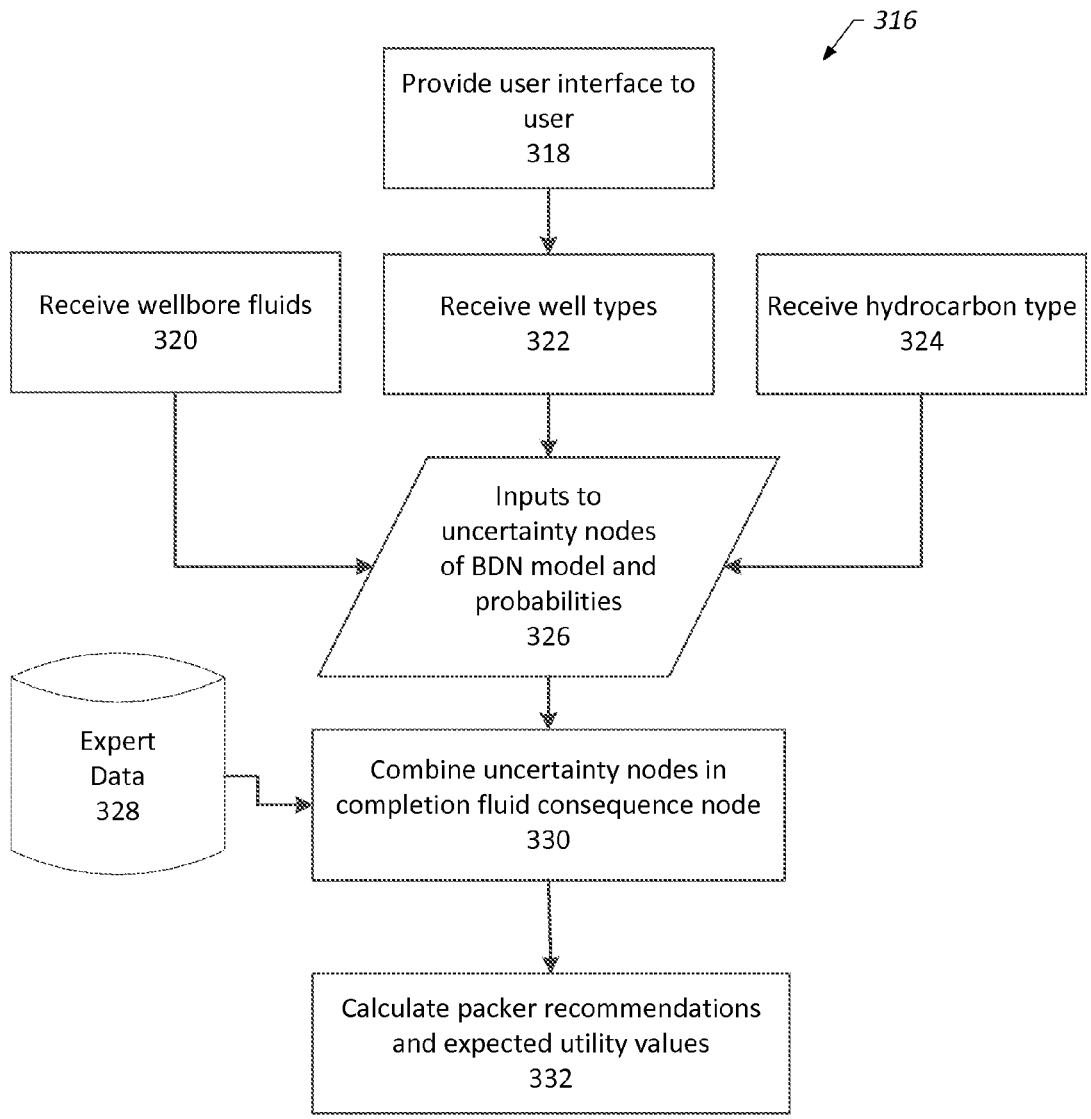

FIG. 3B depicts a process 316 of the operation of another section of a well completion expert system in accordance with an embodiment of the present invention. The process 316 illustrates a process for a packer section of the well completion expert system, as illustrated further below. Initially, a user interface for a well completion expert system may be provided to a user (block 318). From the user interface, various selections of inputs may be received. For example, wellbore fluids may be received (block 320) by the well completion expert system. As explained below, a user may enter a selection of one or more possible wellbore fluids into the well completion expert system. Additionally, well types may be received (block 322) by the well completion expert system, such as by a user selecting one or more of the well types. In some instances, hydrocarbon types may also be received by the well completion expert system (block 324). Any one of or combination of these selections may be received. As described below, the well completion expert system enables a user to enter inputs at any node of a well completion BDN model.

Next, the received selections may be provided as inputs to uncertainty nodes of a well completion BDN model of the well completion expert system (block 326), and the inputs may include associated probability states, as determined from expert data 328. Next, the data from the uncertainly nodes may be combined (i.e., propagated to) a consequence node of the well completion BDN model based on the expert data (block 330). As noted above, the propagation and determination of consequences is based on the Bayesian logic described below in FIGS. 4-15 and implemented in the well completion BDN model. Next, packer recommendations and expected utility values may be calculated by the BDN model (block 332). In some embodiments, the packer recommendations, expected utility values, or both may be output in a user interface of the well completion expert system.

Figure 3C:
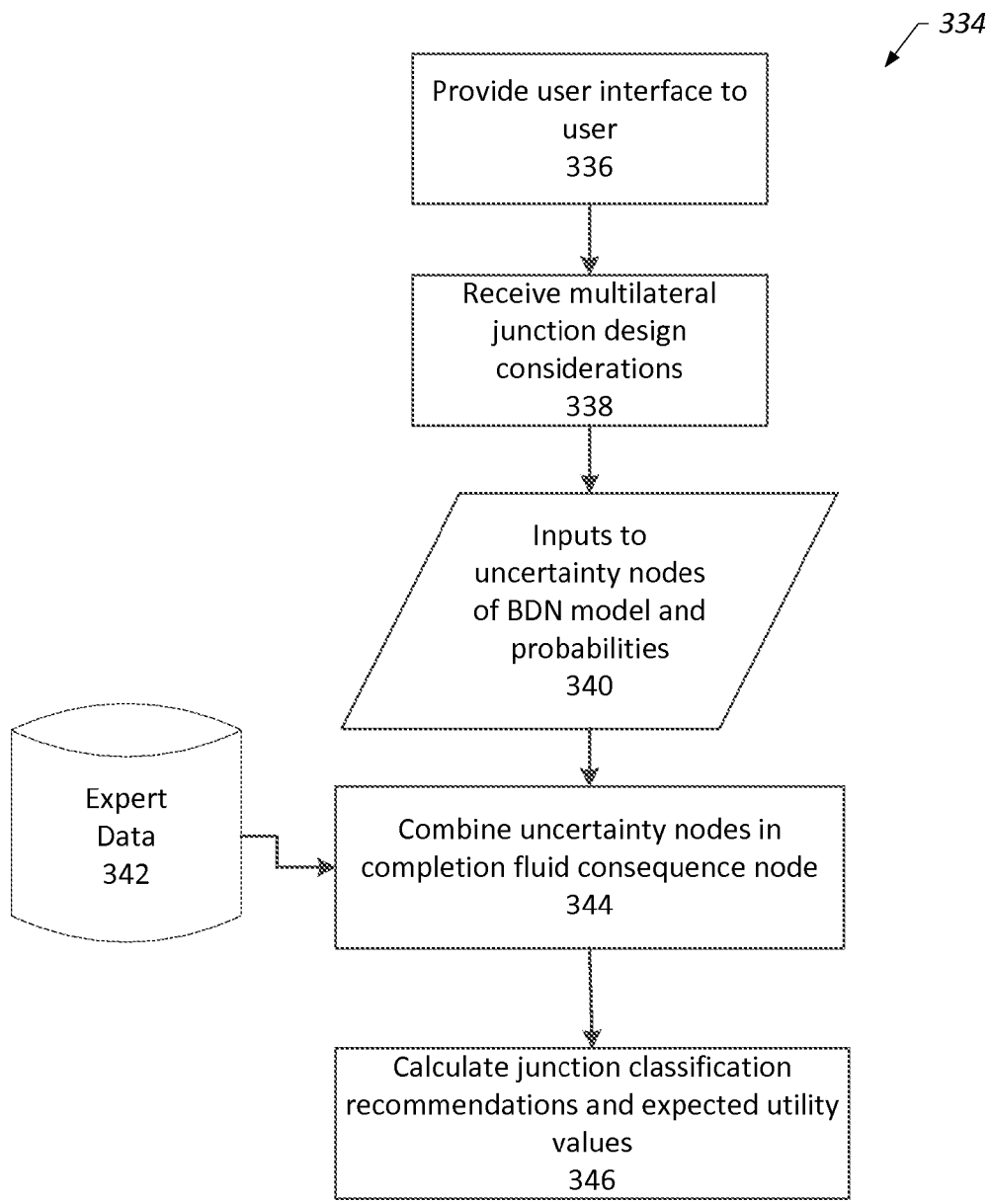

FIG. 3C depicts a process 334 of the operation of another section of a well completion expert system in accordance with an embodiment of the present invention. The process 338 illustrates a junction classification section of the well completion expert system, as illustrated further below. Initially, a user interface for a well completion expert system may be provided to a user (block 336). From the user interface, various selections of inputs may be received. For example, one or more multilateral junction design considerations may be received (block 338) by the well completion expert system. As explained below, a user may enter a selection of one or more multilateral junction design considerations into the well completion expert system.

Next, the received input may be provided to an uncertainty node of a well completion BDN model of the well completion expert system (block 340), and the inputs may include associated probability states, as determined from expert data 342. Next, the data from the uncertainly nodes may be combined (i.e., propagated to) a consequence node of the well completion BDN model (block 344). The propagation and determination of consequences is based on the Bayesian logic described below in FIGS. 2-15 and implemented in the well completion BDN model. Next, junction classification recommendations and expected utility values may be calculated by the well completion BDN model (block 346). Finally, the junction classification recommendations, expected utility values, or both may be output in a user interface of the well completion expert system.

Figure 3D:
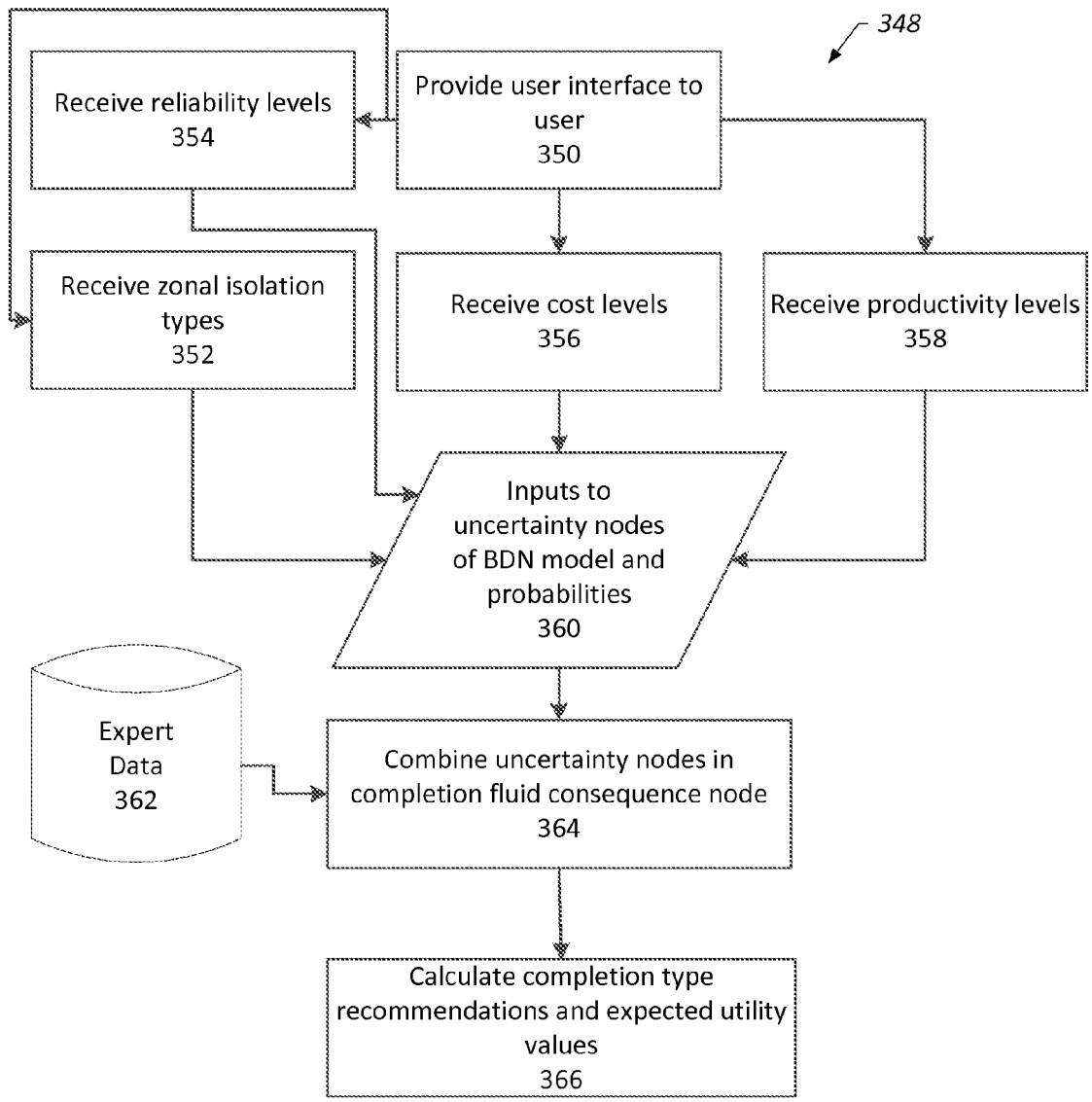

FIG. 3D depicts a process 348 of the operation of another section of a well completion expert system in accordance with an embodiment of the present invention. The process 348 illustrates a process for a completion type section of the well completion expert system, as illustrated further below. Initially, a user interface for a well completion expert system may be provided to a user (block 350). From the user interface, various selections of inputs may be received. For example, zonal isolation types may be received (block 352) by the well completion expert system. As explained below, a user may enter a selection of one or more possible zonal isolation types into the well completion expert system. Additionally, reliability levels may be received (block 354) by the well completion expert system, such as by a user selecting a reliability level. In some instances, cost levels may also be received by the well completion expert system (block 356). Finally, productivity levels may be received by the well completion expert system (block 358). Any one of or combination of these selections may be received. As described below, the well completion expert system enables a user to enter inputs at any node of a well completion BDN model.

Here again, the received selections may be provided as inputs to uncertainty nodes of a well completion BDN model of the well completion expert system (block 360), and the inputs may include associated probability states, as determined from expert data 362. Next, the data from the uncertainly nodes may be combined (i.e., propagated to) a consequence node of the well completion BDN model based on the expert data (block 362). As noted above, the propagation and determination of consequences is based on the Bayesian logic described below in FIGS. 4-15 and implemented in the well completion BDN model. Next, completion type recommendations and expected utility values may be calculated by the BDN model (block 366). In some embodiments, the completion type recommendations, expected utility values, or both may be output in a user interface of the well completion expert system.

Figure 3E:
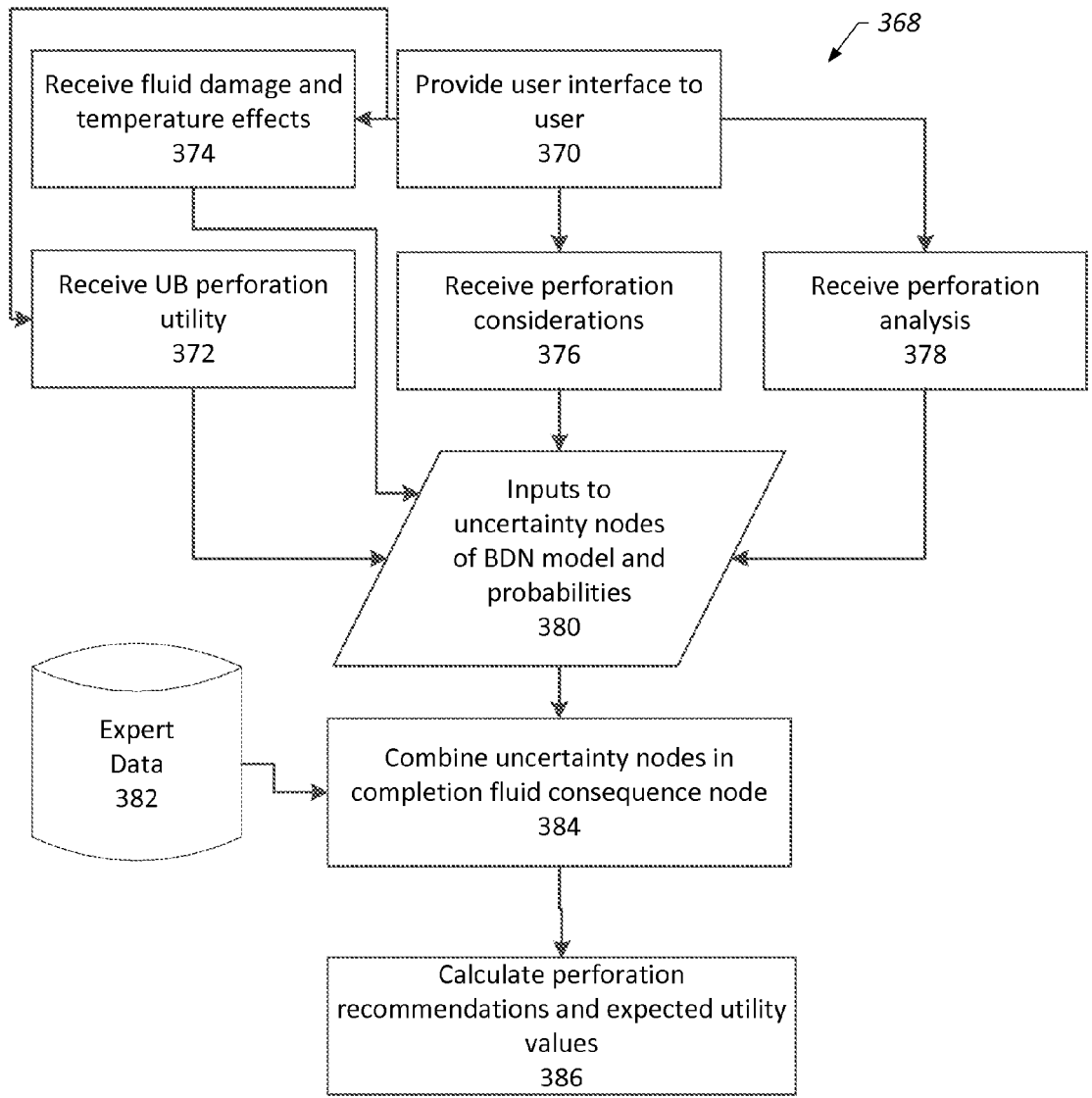

FIG. 3E depicts a process 368 of the operation of another section of a well completion expert system in accordance with an embodiment of the present invention. The process 368 illustrates a process for a perforation section of the well completion expert system, as illustrated further below. Initially, a user interface for a well completion expert system may be provided to a user (block 370). From the user interface, various selections of inputs may be received. For example, an underbalance (UB) perforation utility may be received (block 372) by the well completion expert system. As explained below, a user may enter a selection of utility for UB perforation (e.g., if UB perforation is useful, not useful, not required, etc.). Additionally, fluid damage and temperature effects associated with perforation may be received (block 374) by the well completion expert system, such as by a user selecting a reliability level. As illustrated below, the fluid damages and temperature effects are dependent on the UB performance utility input to the well completion BDN model.

In some instances, perforation considerations may also be received by the well completion expert system (block 376). As illustrated below, the perforation considerations are dependent on the fluid damages and temperature effects input to the well completion BDN model. Finally, perforation analysis may be received by the well completion expert system (block 378). Any one of or combination of these selections may be received. As described below, the well completion expert system enables a user to enter inputs at any node of the well completion BDN model.

As described above, the received selections may be provided as inputs to uncertainty nodes of a well completion BDN model of the well completion expert system (block 380), and the inputs may include associated probability states, as determined from expert data 382. Next, the data from the uncertainly nodes may be combined (i.e., propagated to) a consequence node of the well completion BDN model based on the expert data (block 384). As noted above, the propagation and determination of consequences is based on the Bayesian logic described below in FIGS. 4-15 and implemented in the well completion BDN model. Next, perforation recommendations and expected utility values may be calculated by the BDN model (block 386). In some embodiments, the perforation recommendations, expected utility values, or both may be output in a user interface of the well completion expert system.

Figure 3F:
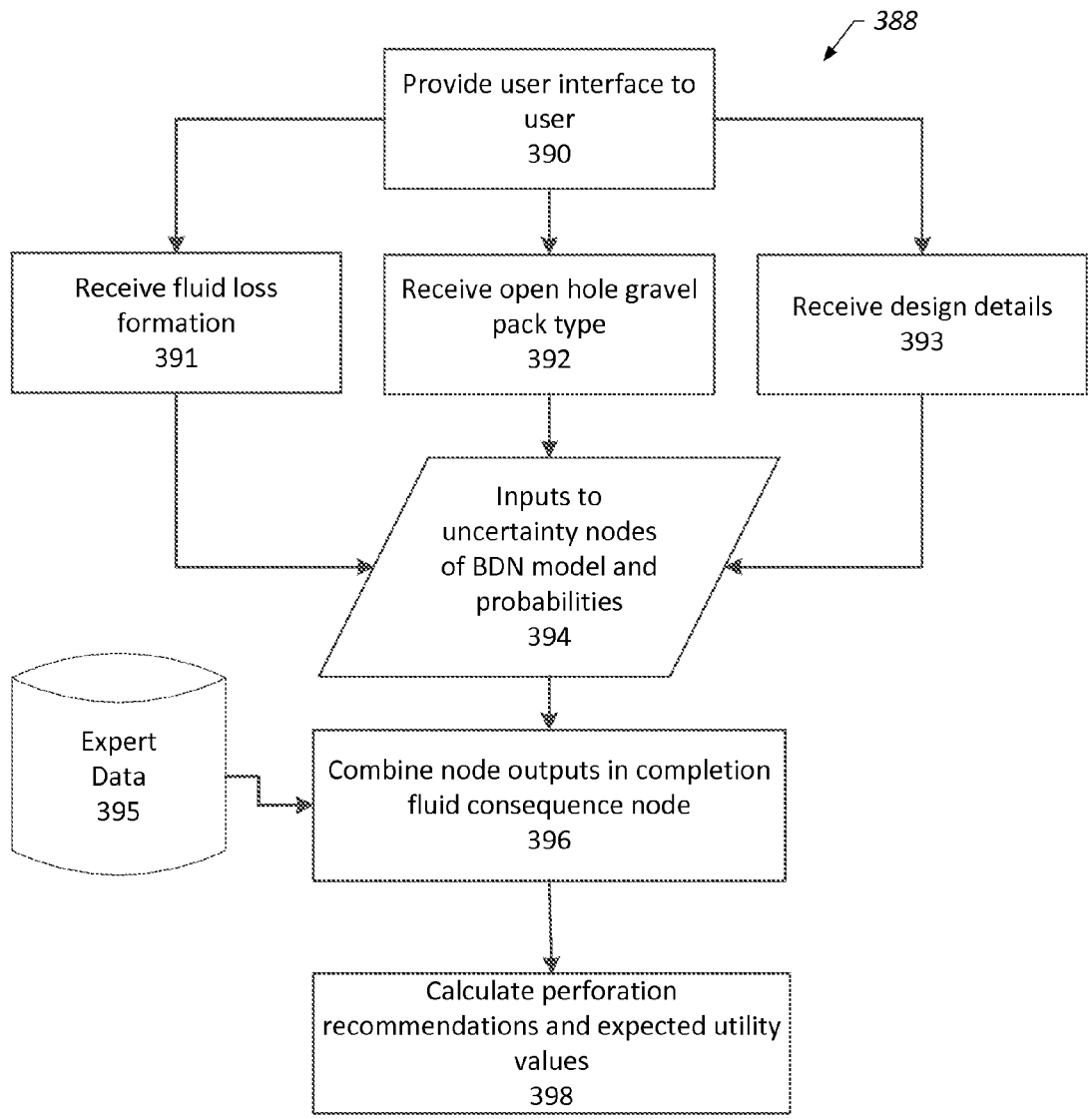

Finally, FIG. 3F depicts a process 388 of the operation of another section of a well completion expert system in accordance with an embodiment of the present invention. The process 388 illustrates a process for an open hole gavel packing section of the well completion expert system, as illustrated further below in FIG. 16B. Initially, a user interface for a well completion expert system may be provided to a user (block 390). From the user interface, various selections of inputs may be received. For example, one or more fluid loss formations may be received (block 391) by the well completion expert system. As explained below, a user may enter a selection of one or fluid loss formations into the well completion BDN model. Additionally, one or more open hole gravel pack types may be received (block 392) by the well completion expert system, such as by a user selecting specific gravel pack types. As illustrated below in FIG. 16B, the fluid damages and temperature effects are dependent on the UB performance utility input to the well completion BDN model. In some instances, one or more design details may also be received by the well completion expert system (block 393). Any one of or combination of these selections may be received. As described below, the well completion expert system enables a user to enter inputs at any node of the well completion BDN model.

As described above, the received selections may be provided as inputs to uncertainty nodes of a well completion BDN model of the well completion expert system (block 394), and the inputs may include associated probability states, as determined from expert data 395. Next, the outputs from the nodes of the well completion BDN model, such as the uncertainty nodes and a decision node) may be combined (i.e., propagated to) a consequence node of the well completion BDN model based on the expert data (block 396). As noted above, the propagation and determination of consequences is based on the Bayesian logic described below in FIGS. 4-15 and implemented in the well completion BDN model. Next, open hole gravel packing recommendations and expected utility values may be calculated by the BDN model (block 398). In some embodiments, the perforation recommendations, expected utility values, or both may be output in a user interface of the well completion expert system.

FIGS. 4-15 depict an example of a BDN model simulating the decision-making process of the selection of a swelling packer. The model described below in FIGS. 4-15 is illustrative of the application of a Bayesian decision network to the selection of a swelling packer for use in a drilling system. Based on the techniques illustrated in FIGS. 4-15 and described below, a well completion BDN model associated with a well completion expert system, such as that described above in FIGS. 1 and 2 may be implemented. The well completion BDN model is illustrated in detail in FIGS. 16-29 and described below. Thus, the techniques and implementation described in FIGS. 4-15 may be applied to the more detailed BDN model and operation illustrated in FIGS. 16-29.

Figure 4:
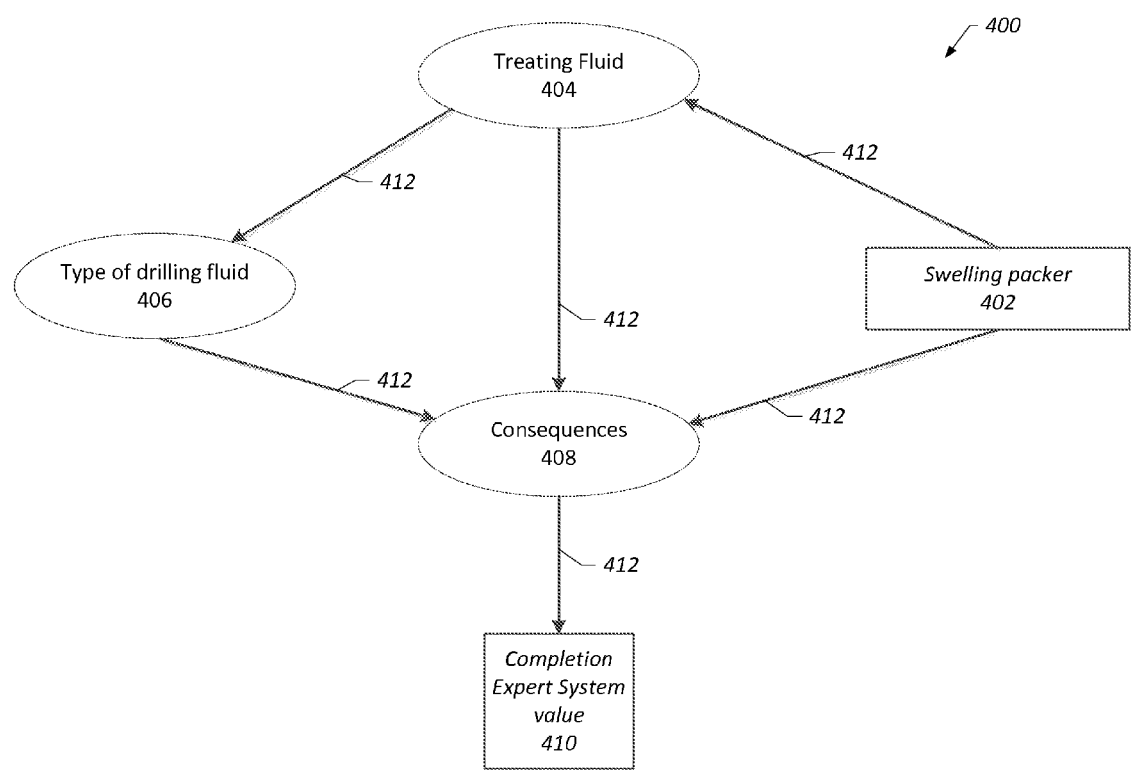
FIG. 4 is a schematic diagram of an example of a Bayesian decision network model for the selection of a swelling packer in accordance with an embodiment of the present invention.

FIG. 4 depicts a BDN model 400 for the selection of a swelling packer in accordance with an embodiment of the present invention. The BDN model 400 depicted in FIG. 4 includes a swelling packer decision node 402, a treating fluid uncertainty node 404, a drilling fluid type uncertainty node 406, a consequences node 408, and a completion expert system value node 410. As will be appreciated, the selection of a swelling packer may be relevant in the completion of a well to production status. In the illustrated BDN model 400, the various connection lines 412 indicate direct dependencies between the different nodes. Accordingly, the consequences node may be dependent on the inputs to the uncertainty nodes 404 and 406 and the decision node 402. Similarly, the treating fluid uncertainty node 404 may be dependent on the swelling packer decision node 402.

Figures 5, 6, 7:
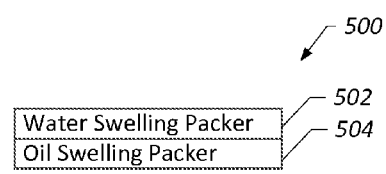

After defining the BDN model 400, the probability states associated with each node may be defined. FIGS. 5-7 depict various tables illustrating the states, such as probability states, associated with each node of the BDN model 400. The probability distributions may be defined based on expert data entered in the BDN model 400. FIG. 5 depicts a table 500 illustrating the states associated with the swelling packer decision node 402. As shown in table 500, the swelling packer decision node 402 may have a first probability state 502 of "water swelling packer" and a second probability state 504 of "oil swelling packer." Next, FIG. 6 depicts a table 600 illustrating the probability states associated with the treating fluid uncertainty node 404. The probability states associated with the treating fluid uncertainty node 404 are dependent on the dependency on the swelling packer decision node 402. As shown in table 600, the probability states for two treating fluids 602 ("Lactic acid") and 604 ("HCl acid") are shown. For example, for a lactic acid treating fluid 602, the probability state for a water swelling packer 606 is 0.9 and the probability state for an oil swelling packer 608 is 0.5. Similarly, for an HCl acid treating fluid 604, the probability state for the water swelling packer 606 is 0.1 and the probability state for the oil swelling packer 608 is 0.5.

FIG. 7 depicts a table 700 illustrating the probability states associated with the drilling fluid type uncertainty node 406. As shown in the BDN model 400 depicted in FIG. 4, the drilling fluid type uncertainty node 406 is dependent on the dependency on the treating fluid uncertainty node 404 and the swelling packer decision node 406. In the table 700, the probably states associated with two drilling fluid types 702 ("Formate drilling fluid") and 704 ("$CaCO_3$ drilling fluid") are depicted for combinations of a water swelling packer 706, an oil swelling packer 708, a lactic acid treating fluid 710, and an HCl acid treating fluid 712. For example, as shown in FIG. 7, for the formate drilling fluid type 702, the probability state for the water swelling packer 706 and lactic acid treating fluid 710 is 0.8 and the probability state for the water swelling packer 706 and HCl acid treating fluid 712 is 0.2. Similarly, for the $CaCO_3$ drilling fluid type 704, the probability state for the water swelling packer 706 and lactic acid treating fluid 710 is 0.2 and the probability state for the water swelling packer 706 and HCl acid treating fluid 712 is 0.8. In a similar manner, the table 700 of FIG. 7 depicts the probability states for the oil swelling packer 708 and the various combinations of lactic acid treating fluid 710 and the HCl acid treating fluid 712, and the formate drilling fluid type 702 and the $CaCO_3$ drilling fluid type 704.

FIG. 8 depicts a table 800 illustrating the probability states of the consequences node 408. The consequences node 408 is dependent on its dependency on the swelling packer decision node 402, treating fluid uncertainty node 404, and the drilling fluid type uncertainty node 406. As shown in table 800, the probability states associated with two consequences 802 ("Recommended") and 804 ("Not recommended") are depicted for various combinations of a water swelling packer 806 or an oil swelling packer 808, a formate drilling fluid type 810 or a $CaCO_3$ drilling fluid type 812, and a lactic acid treating fluid 814 or an HCl acid treating fluid 816. For example, for the Recommended consequence 802, the probability state for the combination of water swelling packer 806, the formate drilling fluid 810, and lactic acid treating fluid 814 is 0 and the probability state for the combination of the water swelling packer 806, the formate drilling fluid 810, and HCl acid treating fluid 816 is 1. In another example, as shown in table 800, for the Not recommended consequence 804, the probability state for combination of the water swelling packer 806, the formate drilling fluid 810, and lactic acid treating fluid 814 is 1 and the probability state for the combination of the water swelling packer 806, the formate drilling fluid 810, and HCl acid treating fluid 816 is 0.

In the BDN model 400, the consequences associated with the consequences utility node 408 may be assigned input utility values. FIG. 9 depicts a table 900 illustrating the input utility values assigned to the consequences from the consequences utility node 408. As shown in table 900, a value 902 may be assigned to each consequence of the consequence node 408. For a consequence 904 of Recommended, an input utility value of 1 may be assigned. Similarly, for a consequence 906 of Not Recommended, an input utility value of 0 may be assigned. As described below, after the probability states for the consequences are determined in the BDN model 400, the input utility values assigned to each consequence may be Using the model and probabilities described above, the functionality of the BDN model 400 will be described. After receiving inputs to the model 400, the model 400 may simulate the uncertainty propagation based on the evidence, e.g., the probability states, at each node, using Bayesian probability determinations. A Bayesian probability may be determined according to Equation 1:

$$p(\text{hypothesis}|\text{evidence}) = \left( \frac{p(\text{evidence}|\text{hypothesis})p(\text{hypothesis})}{p(\text{evidence})} \right) \quad (1)$$

Where:
p(hypothesis|evidence) is the probability of a hypothesis conditioned upon evidence;
p(evidence|hypothesis) is the probability the evidence is plausible based on the hypothesis;
p(hypothesis) is the degree of certainty of the hypothesis; and
p(evidence) is the degree of certainty of the evidence.

Referring again to the BDN model 400 discussed above, the model 400 illustrates that a selection of drilling fluid affects the treating fluid and the swelling packer, as illustrated by the dependencies in the model 400. First, the total probability for a drilling fluid type may be calculated based on the evidence from the uncertainty nodes by Equation 2:

$$\sum_{i=1}^{m} P(B \mid A_i) P(A_i) \quad (2)$$

Where:
$P(B|A_i)$ is the probability based on B in view of $A_i$;
$P(A_i)$ is the probability of $A_i$; and
m is the total number of evidence items.

Using Equation 2, the total probability for a drilling fluid type and lactic acid treating fluid may be calculated according to Equation 3:

$$\sum_{i=1}^{m} p(\text{formatedrillingfluid} \mid \text{lacticacid}_i) P(\text{lacticacid}_i) \quad (3)$$

For example, using the probability data illustrated in FIGS. 6 and 7, the total probability for a formate drilling fluid type may be calculated as the sum of 0.9 (probability for a lactic acid treating fluid and water swelling packer) multiplied by 0.8 (probability for a formate drilling fluid type, lactic acid treating fluid, and water swelling packer) and 0.1 (probability for a lactic acid treating fluid and water swelling packer) multiplied by 0.2 (probability for a lactic acid treating fluid and water swelling packer).

The results of the total probability calculations for drilling fluid types are illustrated in table 1000 depicted in FIG. 10. Table 1000 depicts the total probabilities for various combinations of drilling fluids 1002 ("Formate drilling fluid) and 1004 ("CaCO3 drilling fluid") and a water swelling packer 1006 and an oil swelling packer 1008. As explained above, the total probabilities at the drilling fluid uncertainty node are dependent on the evidence from the treating fluid uncertainty node and the swelling packer decision node. As shown in table 1000 of FIG. 10, the total probability for a formate drilling fluid 1002 and the water swelling packer 1006 is 0.74, and the total probability for a formate drilling fluid 1002 and the oil swelling packer 1008 is 0.5. Similarly, total probabilities for the CaCO₃ drilling fluid type 1004 are also depicted in table 1000.

Using the total probabilities determined above, the Bayesian probability determination of Equation 1 may be used to calculate the Bayesian probability of a treating fluid used with a specific drilling fluid type and a particular swelling packer. Accordingly, a Bayesian probability may be derived by combining the Bayesian probability of Equation 1 with the total probability calculation of Equation 2, resulting in Equation 4:

$$P(A_j \mid B) = \frac{p(B \mid A_j) P(A_j)}{\sum_{i=1}^{m} P(B \mid A_i)(P(A_i)} \quad (4)$$

Thus, based on Equation 4, the Bayesian probability determination for a lactic acid treating fluid and a formate drilling fluid type for a water swelling packer may be determined according to Equation 5, using the total probabilities depicted in the table 700 of FIG. 7 and the table 1000 of FIG. 10:

$$P(lacticacid \mid formate) = \quad (5)$$

$$\left( \frac{P(\text{formate} \mid lacticacid) P(lacticacid)}{P(\text{formate})} \right) = \frac{0.8 \times 0.9}{0.74} = 0.9729$$

As depicted above in FIG. 7, the probability associated with a formate drilling fluid type conditioned on lactic acid treating fluid is 0.8 and the probability of lactic acid for a water swelling packer is 0.9. Additionally, as calculated above in FIG. 10, the total probability associated with a formate drilling fluid and a water swelling packer is 0.74. Using these probabilities, the Bayesian probability for a lactic acid treating fluid and a formate drilling fluid type may be calculated as shown in Equation 5. Similarly, Equation 6 depicts the Bayesian probability determination for an HCl treating fluid and a formate drilling fluid type, as shown below:

$$P(HClacid \mid formate) = \quad (6)$$

$$\left( \frac{P(\text{formate} \mid HClacid) P(HClacid)}{P(\text{formate})} \right) = \frac{0.2 \times 0.1}{0.74} = 0.0270$$

As noted above, the values for the probabilities depicted in Equation 6 may be obtained from the probability states depicted in tables 600 and 700 of FIGS. 6 and 7 and the total probability calculations depicted in table 1000 of FIG. 10. In a similar manner, Equations 7 and 8 depict the Bayesian probability determinations for a CaCO₃ drilling fluid type:

$$P(lacticacid \mid CaCo_3) = \quad (7)$$

$$\left( \frac{P(CaCo_3 \mid lacticacid) P(lacticacid)}{P(CaCo_3)} \right) = \frac{0.2 \times 0.9}{0.26} = 0.6923$$

-continued $$P(HClacid \mid CaCo_3 = \qquad (8)$$
$$\left(\frac{P(CaCo_3 \mid HClacid)P(HClacid)}{P(CaCo_3)}\right) = \frac{0.8 \times 0.1}{0.26} = 0.3076$$

The Bayesian probability determinations may also be performed for an oil swelling packer for the various combinations of treating fluid and drilling fluid types. Using the probability states depicted in tables 600 and 700 of FIGS. 6 and 7 and the total probability calculations depicted in table 1000 of FIG. 10, these Bayesian probability determinations are shown below in Equations 9-12:

$$P(lacticacid \mid formate = \qquad (9)$$
$$\left(\frac{P(formate \mid lacticacid)P(lacticacid)}{P(formate)}\right) = \frac{0.8 \times 0.5}{0.5} = 0.8$$

$$P(HClacid \mid formate = \qquad (10)$$
$$\left(\frac{P(formate \mid HClacid)P(HClacid)}{P(formate)}\right) = \frac{0.2 \times 0.5}{0.5} = 0.02$$

$$P(lacticacid \mid CaCo_3 = \qquad (11)$$
$$\left(\frac{P(CaCo_3 \mid lacticacid)P(lacticacid)}{P(CaCo_3)}\right) = \frac{0.8 \times 0.5}{0.5} = 0.8$$

$$P(HClacid \mid CaCo_3 = \qquad (12)$$
$$\left(\frac{P(CaCo_3 \mid HClacid)P(HClacid)}{P(CaCo_3)}\right) = \frac{0.2 \times 0.5}{0.5} = 0.2$$

The results of the calculations shown above in Equations 5-12 are depicted in table 1100 in FIG. 11. Table 1100 depicts the Bayesian probability determinations for treating fluids 1102 ("Lactic acid") and 1104 ("HCl acid") and swelling packers 1106 ("water swelling packer") and 1108 ("oil swelling packer"). The Bayesian probability determinations are shown for both a formate drilling fluid type 1110 and $CaCO_3$ drilling fluid type 1112.

After determining the Bayesian probabilities described above, the BDN model 400 may be used to select a swelling packer based on the inputs provided to the uncertainty nodes of the model 400. For example, the BDN model 400 may be used with two different interpretations of the output to provide the optimal swelling packer for the inputs provided to the model 400. In one interpretation, the model 400 may receive a user selection of an input for one uncertainty node, and an optimal swelling packer may be determined based on the possible inputs to the other uncertainty node. Thus, as shown table 1100 and FIG. 11, the drilling types 1110 and 1112 may be "Selected by user." By specifying a type of drilling fluid, the respective Bayesian probability determinations may be read from the table 1100.

FIG. 12 depicts a table 1200 illustrating the consequences for a user selection of a $CaCO_3$ drilling fluid type based on the Bayesian probability determinations depicted in FIG. 11. For example, if a $CaCO_3$ drilling fluid type is used to drill a well, the consequences of using a water swelling packer 1202 or an oil swelling packer 1204 are depicted in table 1200. The consequences illustrated in table 1200 may include a "Recommended" consequence 1206 and a "Not Recommended" consequence 1208. Accordingly, for a user selection of a $CaCO_3$ drilling fluid type, the Bayesian probabilities read from table 1100 for a water swelling packer are 0.6923 for a lactic acid and 0.3076 for an HCl acid treating fluid. Similarly, values for a user selection of a $CaCO_3$ drilling fluid type and an oil swelling packer are 0.8 and 0.2. As shown in FIG. 12, the Bayesian probability determinations greater than 50% (0.5) may be provided as Recommended consequences 1206 and the Bayesian probability determinations less than 50% (0.5) may be included as Non Recommended consequences 1208.

As mentioned above, table 900 of FIG. 9 depicts input utility values associated with Recommended and Not Recommended consequences. As shown in this table, a Recommended consequence has an input utility value of 1 and a Not Recommended consequence has an input utility value of 0. By combining the input utility values and the Bayesian probabilities depicted in FIG. 12, the expected utility may be calculated according to Equation 13:

$$Expectedutility = \sum_{i=1}^{n} consequenceresult \times inpututilityvalue \qquad (13)$$

Where:
Expectedutility is the expected utility value;
Consequence result is the Bayesian probability value associated with a consequence;
Inpututilityvalue is the input utility value associated with a consequence; and
n is the total number of consequences.

Accordingly, based on the input utility values depicted in FIG. 9 and the Bayesian probabilities depicted in FIG. 12, the expected utility value may be calculated using Equation 13. For example, for a user selection of a $CaCO_3$ drilling fluid type, the Bayesian probability associated with the Recommended consequence is 0.6923 (table 1100 in FIG. 11) and the input utility value associated with the Recommended consequence is 1 (table 900 in FIG. 9). Similarly, for a user selection of a $CaCO_3$ drilling fluid type, the Bayesian probability associated with the Recommended consequence is 0.3076 (table 1100 in FIG. 11) and the input utility value associated with the Recommended consequence is 0 (table 900 in FIG. 9). The calculation of the expected utility for a water swelling packer and a user selection of a $CaCO_3$ drilling fluid type is illustrated below in Equation 14:

$$Expectedutility = \sum_{i=1}^{n} consequenceresult \times inpututilityvalue = \qquad (14)$$
$$0.6923 \times 1 + 0.3076 \times 0 = 0.6923$$

The calculation the expected utility of the expected utility for an oil swelling packer and a user selection of a $CaCO_3$ drilling fluid type is illustrated below in Equation 15:

$$Expectedutility = \qquad (15)$$
$$\sum_{i=1}^{n} consequenceresult \times inpututilityvalue = 0.8 \times 1 + 0.2 \times 0 = 0.8$$

The results of the calculations performed in Equations 14 and 15 are summarized in FIG. 13. FIG. 13 depicts a table 1300 showing the expected utility 1302 calculated above. As shown in this figure, the expected utility 1302 for a water swelling packer 1304 is 0.6293 (Equation 14), and the expected utility 1302 for an oil swelling packer 1306 is 0.8 (Equation 15). Thus, after inputting a drilling fluid type in the drilling fluid uncertainty node 406 in the BDN model 400, the BDN model 400 may output these expected utility values for the swelling packers associated with the swelling packer decision node 402. Based on these expected utility values, a user may select an optimal swelling packer for use with the selected drilling fluid type. For example, a user may select the swelling packer with the higher expected utility value, i.e., the oil swelling packer. That is, as shown in table 1300 of FIG. 13, the expected utility value of 0.8 associated with the oil swelling packer is greater than the expected utility value of 0.6923 associated with the water swelling packer.

In other interpretations, a user may input values for all of the uncertainty nodes of the BDN model 400 to determine the optimal selection of a swelling packer. In such instances, the consequences may be determined directly from the consequences node 408 of the BDN model 400, as depicted above in table 800 of FIG. 8. For example, a user may select inputs for the treating fluid uncertainty node 404 and the drilling fluid type uncertainty node 406 of the BDN model 400. Accordingly, FIG. 14 depicts a table 1400 showing the consequences for different swelling packers based on a user selection of a formate drilling fluid type and a lactic acid treating fluid. As shown in FIG. 14, the consequences may include a "Recommended" consequence 1402 and a "Not Recommended" consequence 1404 for both a water swelling packer 1406 and an oil swelling packer 1408. For a user selection of a formate drilling fluid type and a lactic acid treating fluid, table 800 of FIG. 8 shows a Recommended consequence value of 0 Not Recommended consequence value of 1 for a water swelling packer. Accordingly, the table 1400 shows that the water swelling packer 1406 has a Recommended consequence value of 0 and a Not Recommended consequence value of 1. Similarly, for a user selection of a formate drilling fluid type and a lactic acid treating fluid, table 800 of FIG. 8 shows a Recommended consequence value of 1 and a Not Recommended consequence value of 0 for an oil swelling packer. Thus, the table 1400 shows that the oil swelling packer 1408 has a Recommended consequence value of 1 and a Not Recommended consequence value of 0.

Based on the consequences described above, the expected utility for the different swelling packers may be determined using Equation 13 described above. For example, based on table 1400 of FIG. 14, the calculation of the expected utility for a water swelling packer is illustrated below in Equation 16:

$$Expectedutiilty = \sum_{i=1}^{n} consequenceresult \times inpututilityvalue = 0 \times 1 + 1 \times 0 = 0 \quad (16)$$

Similarly, the calculation of the expected utility for an oil swelling packer, using the values for consequences shown in table 1400 of FIG. 14, is illustrated below in Equation 17:

$$Expectedutiilty = \sum_{i=1}^{n} consequenceresult \times inpututilityvalue = 1 \times 1 + 0 \times 0 = 0 \quad (17)$$

Figure 15:
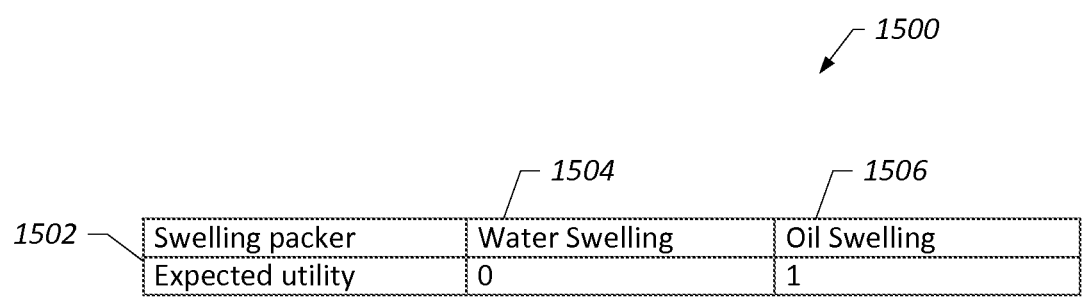
FIG. 15 is a table of expected utilities based on the consequences depicted in FIG. 14.

FIG. 15 depicts a table 1500 illustrated the results of the calculations performed above in Equations 16 and 17. An expected utility 1502 for a water swelling packer 1504 and an oil swelling packer 1506 is illustrated in table 1500. Based on a user selection of a formate drilling fluid type and a lactic acid treating fluid, an expected utility value for the water swelling packer 1504 is 0 and the expected utility value for the oil swelling packer 1506 is 1. Based on these values, a user may select a swelling packer for use based on the BDN model 400. For example, a user may select the swelling packer with the higher expected utility value in table 1500, i.e., an oil swelling packer. Here again, a user may select an optimal swelling packer for use with the inputs, i.e., a selected treating fluid and drilling fluid type, provided to the BDN model 400. For example, a user may select the swelling packer with the higher expected utility value, i.e., the oil swelling packer. That is, as shown in table 1500 of FIG. 15, the expected utility value of 1 associated with the oil swelling packer is greater than the expected utility value of 0 associated with the water swelling packer.

Figure 16A:
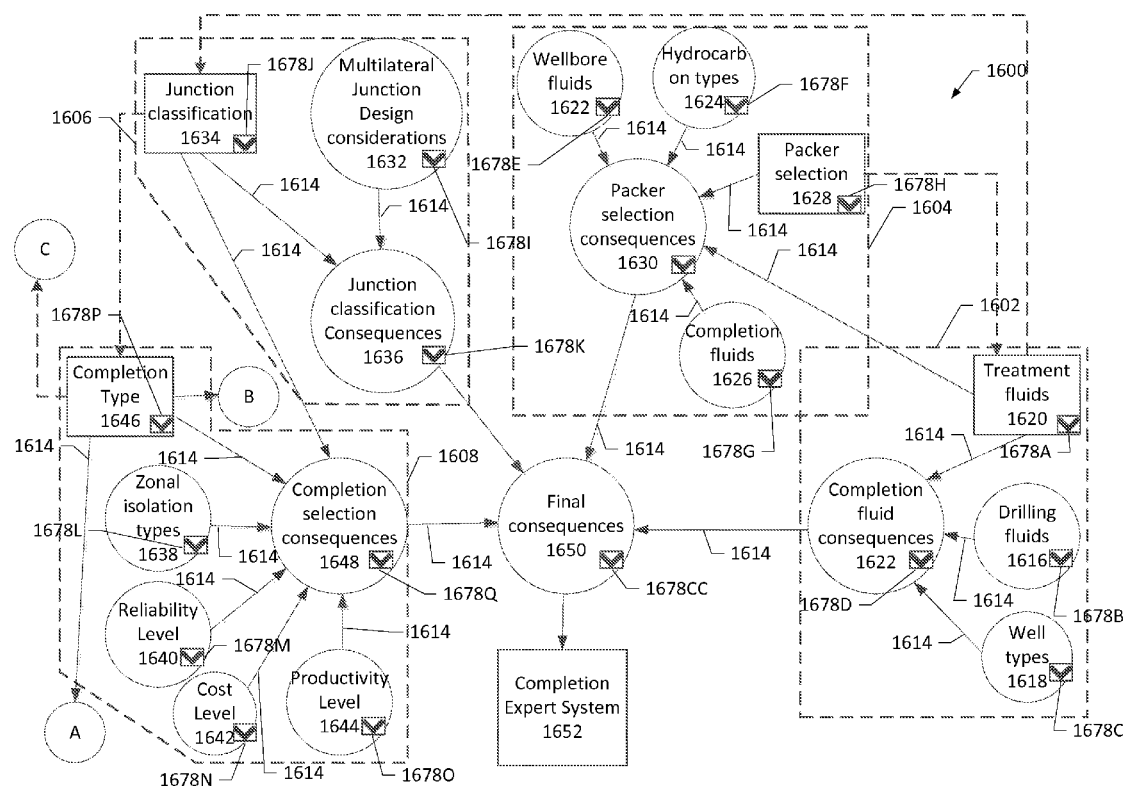
FIGS. 16A and 16B are schematic diagrams depicting a well completion Bayesian decision network (BDN) model in accordance with an embodiment of the present invention.
Figure 16B:
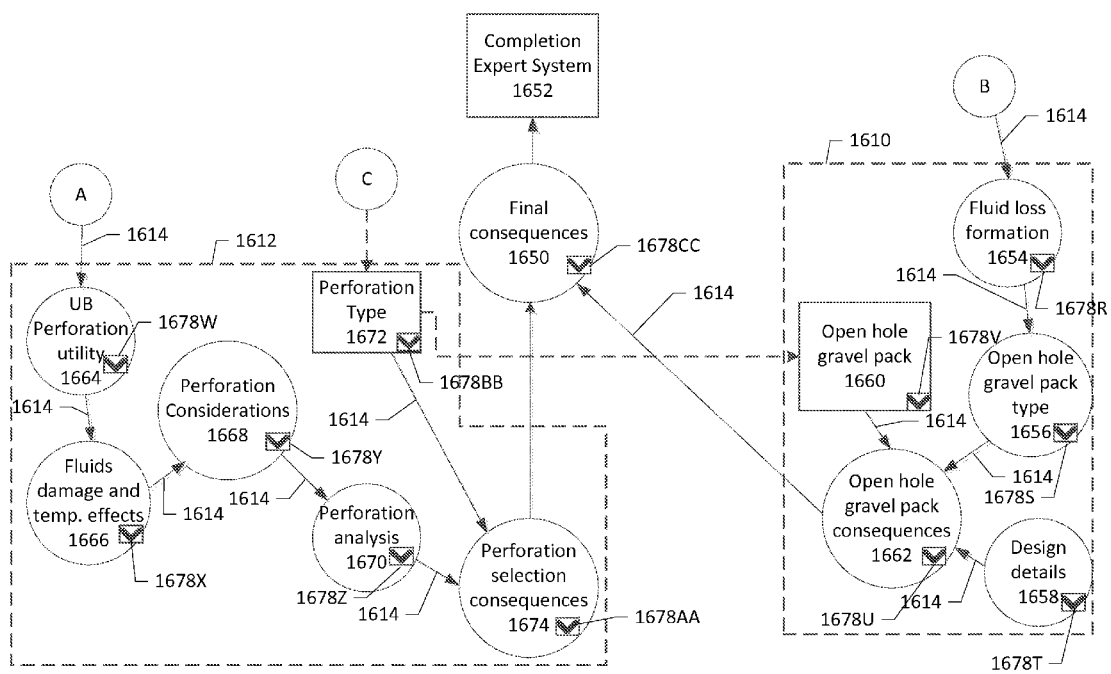

With the above concepts in mind, the BDN modeling techniques described above may be applied to more complicated models. Such models may serve as a training tool or a guide to aid engineers, scientists, or other users in selecting and executing operations of a drilling system. In some embodiments, a BDN model may be used for determining various well completion decisions for use in a drilling system, as described above in FIGS. 1-3. FIGS. 16A and 16B depicts an example of a well completion BDN model 1600 for providing well completion recommendations in a well completion expert system, such as the completion expert system 108 described above. The well completion BDN model 1600 may be divided into six sections relating to well completion: a treatment fluids section 1602, a packer section 1604, a junction classification section 1606, a lateral completion section 1608, an open hole gravel packing section 1610, and a perforation section 1612. The nodes of each section of the well completion BDN model 1600 are described further below. The connection lines 1614 in FIGS. 16A and 16B indicate the dependencies between each node of the model 1600.

The treatment fluids section 1602, a packer section 1604, a junction classification section 1606, and a perforation section 1608 are described with reference to FIG. 16A. The treatment fluids section 1602 includes a drilling fluid types uncertainty node 1616, a well types uncertainty node 1618, a treatment fluids decision node 1620, and a completion fluid consequences node 1622. As shown in FIG. 16A, the completion fluid consequences node 1622 is dependent on the uncertainty nodes 1616 and 1618 and the decision node 1620.

The packer section 1604 includes a wellbore fluids uncertainty node 1622, a hydrocarbon types uncertainty node 1624, a completion fluids uncertainty node 1626, a packer selection decision node 1628, and a packer selection consequences node 1630. As shown in FIG. 16A, the packer selection consequences node 1630 is dependent on the uncertainty nodes 1622, 1624, and 1626 and the decision node 1628. The junction classification section 1606 includes a multilateral junction design considerations uncertainty node 1632, a junction classification decision node 1634, and a junction classification consequences node 1636. As shown in FIG. 16A, the junction classification consequences node 1636 is dependent on the multilateral junction design considerations uncertainty node 1632 and the junction classification 1634 decision node.

As also shown in FIG. 16A, the lateral completion section 1608 includes a zonal isolation types uncertainty node 1638, a reliability level uncertainty node 1640, a cost level uncertainty node 1642, a productivity level uncertainty node 1644, a completion type decision node 1646, and a completion selection consequences node 1648. As shown in the figure, the completion selection consequences node 1648 is dependent on the uncertainty nodes 1638, 1640, 1642, and 1644 and the decision node 1646. The output from each section 1602, 1604, 1606, and 1608 of the well completion BDN model 1600 is propagated to a final consequences node 1650 and, then, to a well completion expert system 1652. Accordingly, the final consequences uncertainty node 1650 is dependent on the consequences nodes 1622, 1630, 1636, and 1648.

FIG. 16B depicts the nodes of the open hole gravel packing section 1610 and the perforation section 1612. The open hole gravel packing section 1610 includes a fluid loss formation uncertainty node 1654, an open hole gravel pack types uncertainty node 1656, a design details uncertainty node 1658, an open hole gravel pack decision node 1660, and an open hole gravel pack consequences node 1662. As shown in FIGS. 16A, and 16B by connection block B, the fluid loss formation uncertainty node 1654 is dependent on the completion type decision node 1646. Additionally, the open hole gravel pack type uncertainty node 1656 is dependent on the fluid loss formation uncertainty node 1654. As also shown in FIG. 16B, the open hole gravel pack consequences node 1662 is dependent on the uncertainty nodes 1656 and 1658 and the decision node 1660.

Finally, the perforation section 1612 includes an underbalanced (UB) perforation utility uncertainty node 1664, a fluids damage and temperature effects uncertainty node 1666, a perforation considerations uncertainty node 1668, a perforation analysis uncertainty node 1670, a perforation type decision node 1672, and a perforation selection consequences node 1674. As shown in FIGS. 16A and 16B and connection block A, the UB perforation utility uncertainty node 1664 is dependent on the completion type decision node 1646. The fluids damage and temperature effects uncertainty node 1666 is dependent on the UB perforation utility uncertainty node 1664, and the perforation considerations uncertainty node 1668 is dependent on the fluids damage and temperature effects uncertainty node 1666. Additionally, the perforation analysis uncertainty node 1670 is dependent on the perforation considerations uncertainty node 1668. As also in shown in FIG. 16B, the perforation selection consequences node 1674 is dependent on the perforation analysis uncertainty node 1670 and the perforation type decision node 1672.

Here again, as shown in FIG. 16B, the output from the sections 1610 and 1612 of the well completion BDN model 1600 are propagated to the final consequences node 1650 and then to the well completion expert system 1652. Accordingly, the final consequences uncertainty node 1650 is dependent on the consequences nodes 1662 and 1674.

In some embodiments, the BDN model 1600 may be implemented in a user interface similar to the depiction of the model 1600 in FIG. 16. In such embodiments, for example, each node of the model 1600 may include a button 1678 that enables a user to select a value for the node or see the determinations performed by a node. For example, as described below, a user may select (e.g., click) the button 1678A to view and select inputs for the uncertainty node 1618, select (e.g., click) the button 1678L to view and select inputs for the uncertainty node 1638, and so on.

Figure 17A:
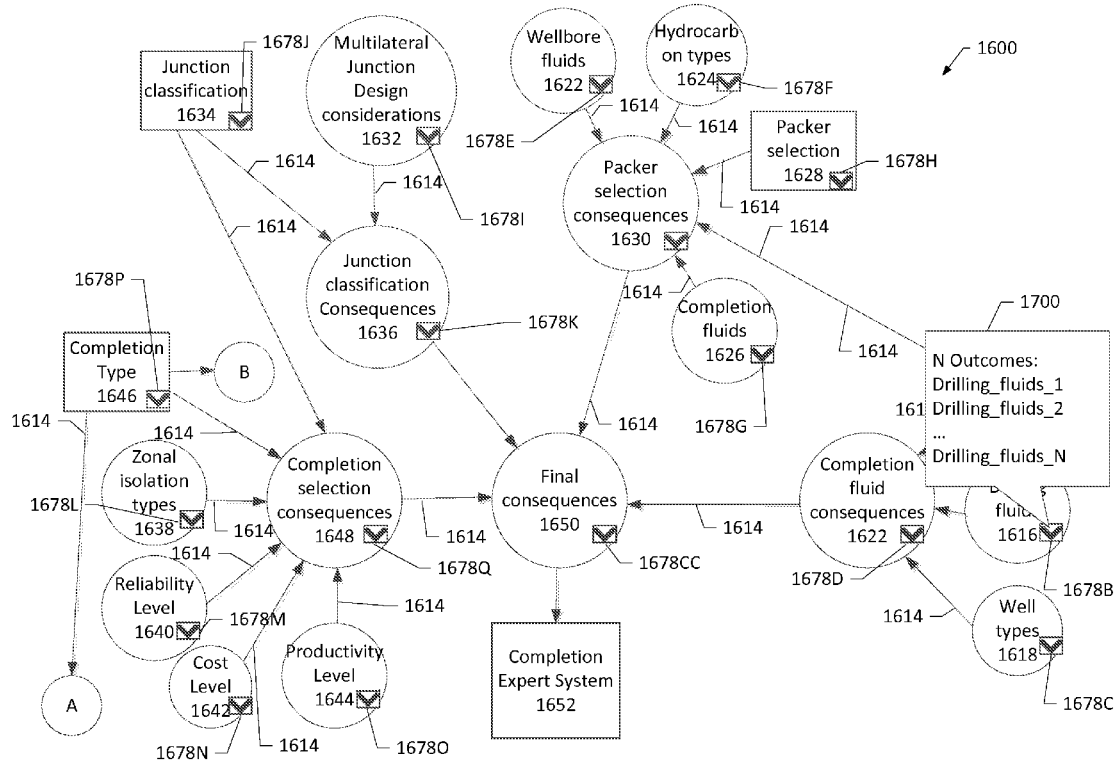
FIGS. 17A-17C are schematic diagrams depicting inputs for a completion fluid section of the well completion BDN model of FIGS. 16A and 16B in accordance with an embodiment of the present invention.
Figure 17B:
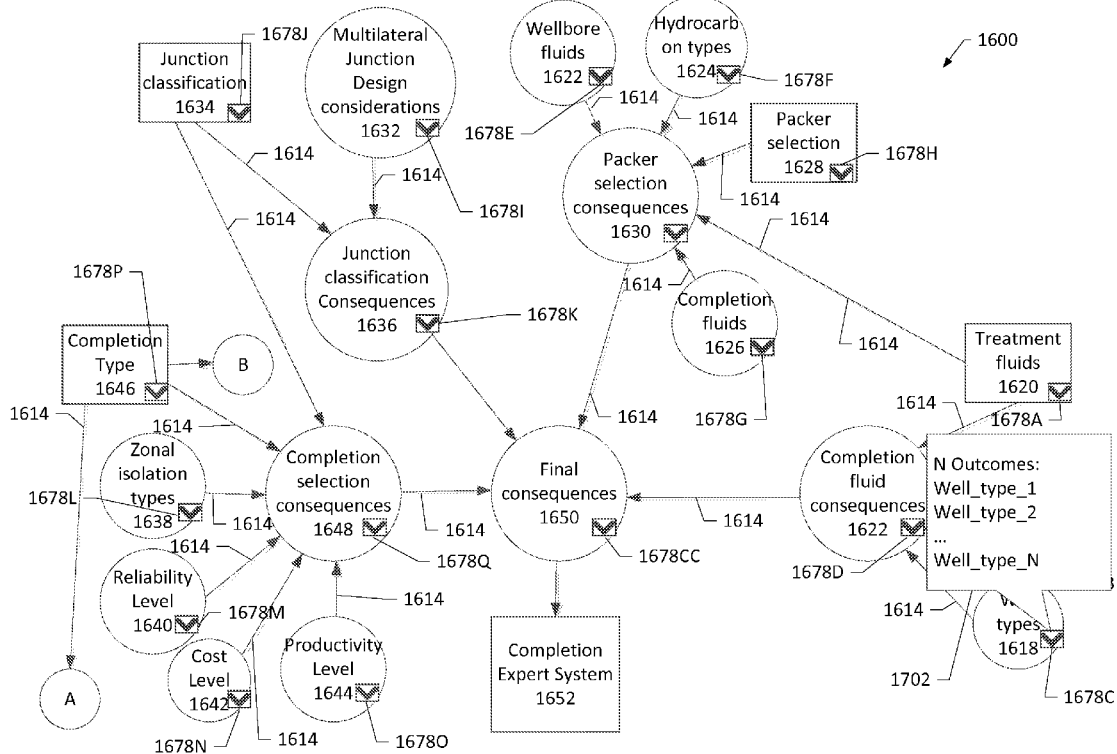
Figure 17C:
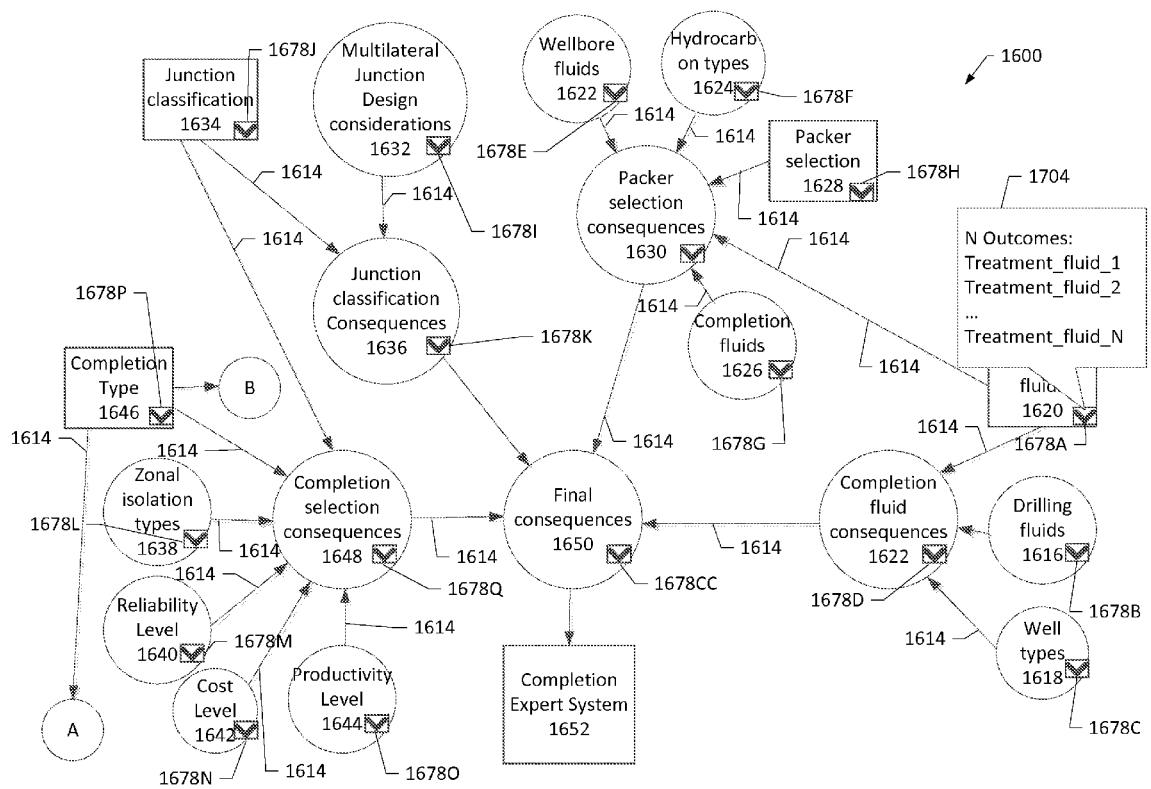

FIGS. 17-29 depict the inputs for each node of the well completion BDN model 1600 in further detail. For example, FIGS. 17A-17C depict the inputs for the completion fluid section 1602 of the BDN model 1600. FIG. 17A depicts inputs 1700 for the drilling fluids node 1616 in accordance with an embodiment of the present invention. As shown in FIG. 17A, the inputs 1700 may be drilling fluids and may include N number of inputs from "drilling_fluids_1" through "drilling_fluids_N." As will be appreciated, in some embodiments the inputs 1700 may include associated probabilities, such as probabilities p_1 through p_N. The inputs 1700 may include different drilling fluids that may be used in a drilling system. For example, in some embodiments the inputs 1700 may include the following: "Water based mud with $CaCO_3$,", "Water based mud with Barite", "Emulsion oil based mud", "All Oil based mud", "Potassium formate mud", and "Drilling fluid based with $Mn_3O_4$."

FIG. 17B depicts inputs 1702 for the well types uncertainty node 1618 in accordance with an embodiment of the present invention. As shown in FIG. 17B, the inputs 1702 may be different well types and may have N number of inputs from "well_type_1" through "well_type_N." As will be appreciated, in some embodiments the inputs 1702 may include associated probabilities, such as probabilities p_1 through p_N. The inputs 1702 may correspond to different types of wells. For example, in some embodiments the inputs 1702 may include the following: "Short horizontal section" and "Long horizontal section".

FIG. 17C depicts inputs 1704 for the treatment fluids decision node 1620 in accordance with an embodiment of the present invention. As shown in FIG. 17C, the inputs 1704 may include treatment fluids for treating a well and may have N number of inputs from "treatment_fluid_1" through "treatment_fluid_N." For example, in some embodiments the inputs 1704 may include: "Inhibitors Amines", "Alcohol methanol", "Acid less than 15 wt percentage HCl acid", "Acid more than 15 wt percentage HCl acid", "HF acid less than 65 wt percentage", "Acetic acid", "Surfactants", "Citric", "Formic", "Lactic", "Potassium formate", "Enzymes", and "Circulation of new volume drilling fluid".

After selecting inputs for the nodes of the completion fluid section 1602 of the well completion BDN model 1600, the selections may be propagated to the completion fluid consequences node 1622. The well completion BDN model 1600 may propagate the inputs using the Bayesian probability determinations described above in Equations 1, 2, and 4. By using the probabilities assigned to the inputs, the well completion BDN model 1600 may then provide recommended completion fluids or expected utilities based on the inputs from the nodes of the completion fluid section 1602, such as by assigning a value of 1 to a recommended completion fluid.

In some embodiments, the uncertainty nodes of the well completion BDN model 1600 may have inputs with associated probabilities. A user may select an input for one or more uncertainty nodes and view the recommendations based on the propagation of the selected input. For example, a user may select an input for the drilling fluids uncertainty node 1616 and receive a recommended completion fluid at the consequences node 1622 (based on the inputs to the other nodes of the section 1602). In another example, a user may also select an input for the well types uncertainty node 1618 and receive a recommended completion fluid at the consequences node 1622 (based on the inputs to other nodes of the section 1602).

FIG. 18 depicts an example of the output from the completion fluid consequences node 1622 based on the inputs described above in FIGS. 17A-17C in accordance with an embodiment of the present invention. As shown in FIG. 18, in some embodiments the output may be presented as a table 1800 displaying an expected utility for completion fluids. The table 1800 may display a recommended value determined according to the techniques described above and calculated by Equations 1, 2, 4, and 13. For example, the inputs to the treatment fluids node 1620 of the well completion BDN model 1600 may be used to determine the consequences via the completion fluid consequences node 1622. Based on the results, recommended completion fluids may be determined and expected utility values may be calculated. As shown in FIG. 18, based on an input to the drilling fluids uncertainty node 1616 ("drilling_fluids_2"), various proposed completion fluids may have recommended or not recommended expected utility values of 0 or 1. For example, the completion fluid "Treatment fluid_1" has a recommended expected utility value of 1 and not recommended expected utility value of 0. In contrast, the completion fluid "Treatment fluid_2" has a recommended expected utility value of and not recommended expected utility value of 1, and so on.

Figure 19A:
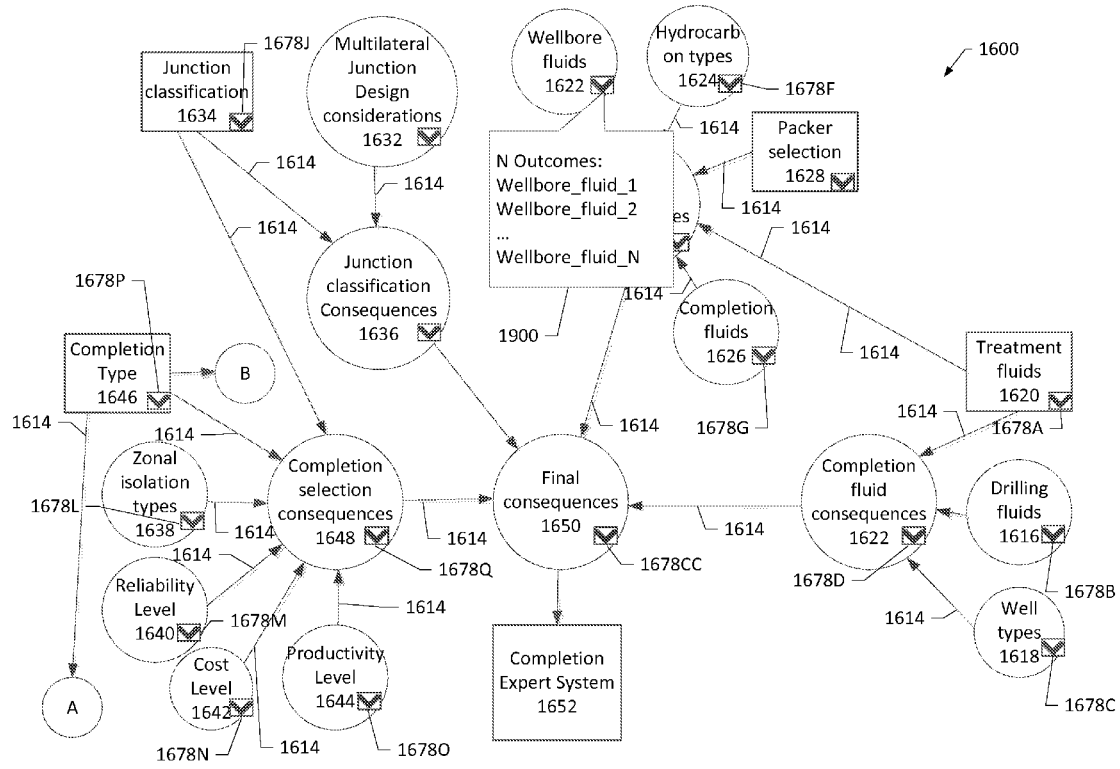
FIGS. 19A-19D are schematic diagrams depicting inputs for a packer section of the well completion BDN model of FIGS. 16A and 16B in accordance with an embodiment of the present invention.
Figure 19B:
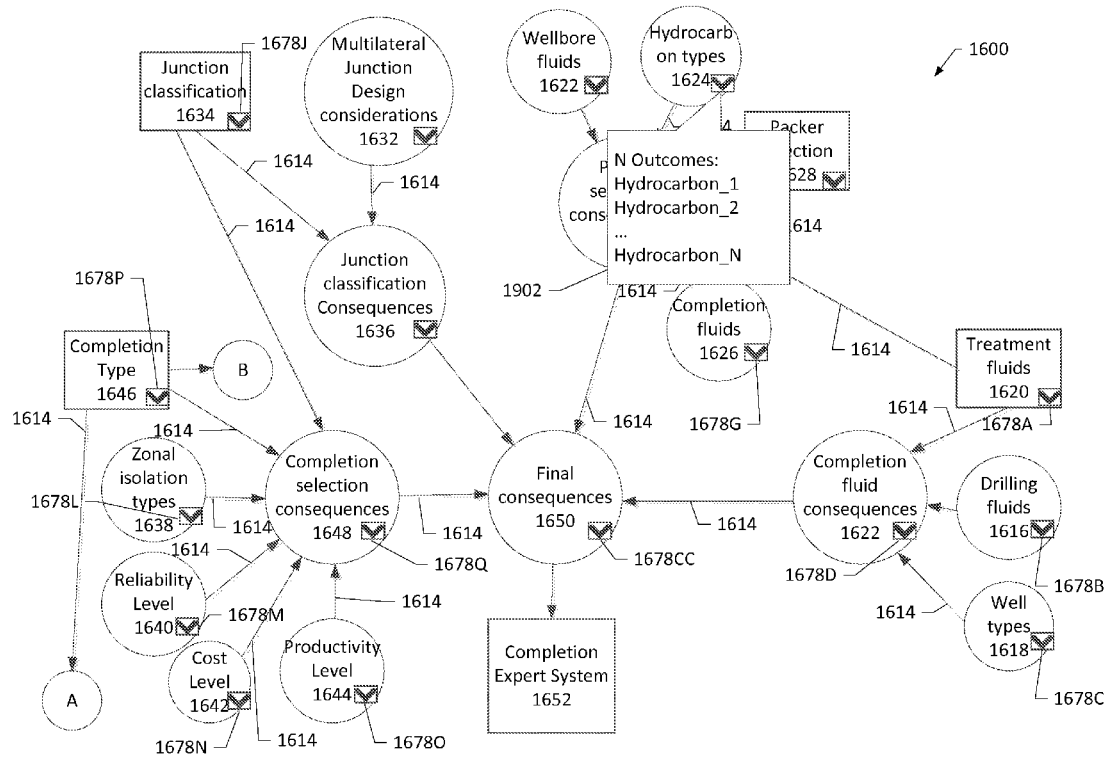
Figure 19C:
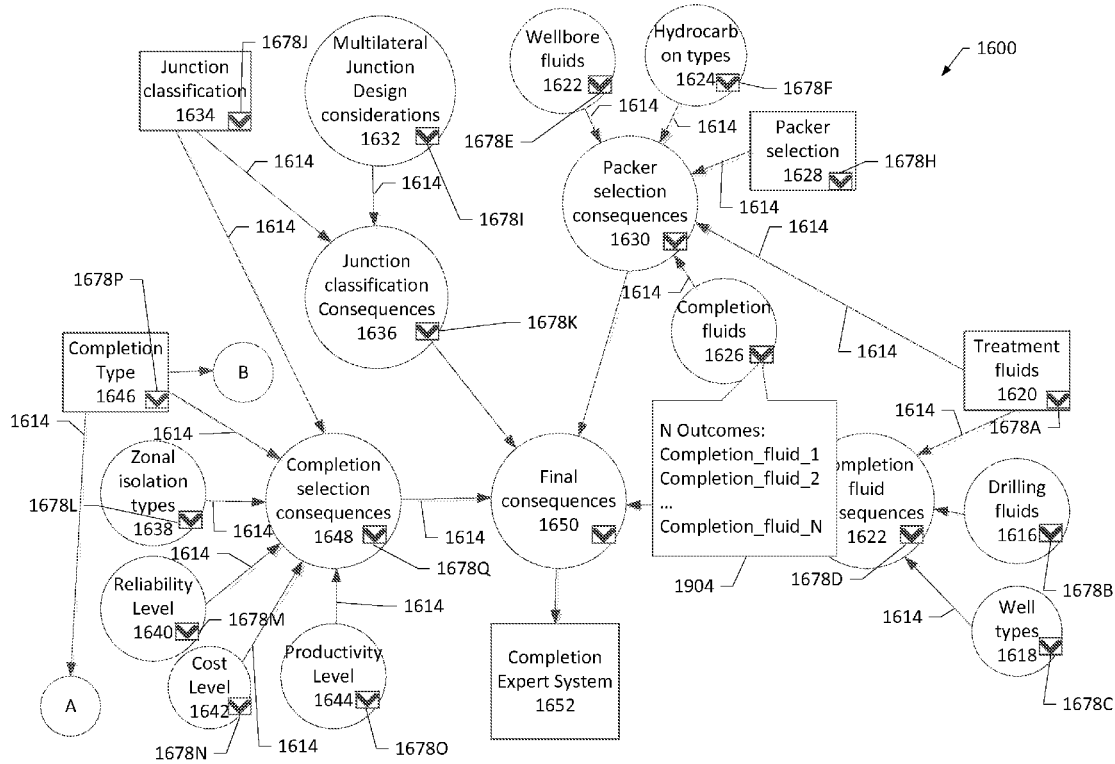
Figure 19D:
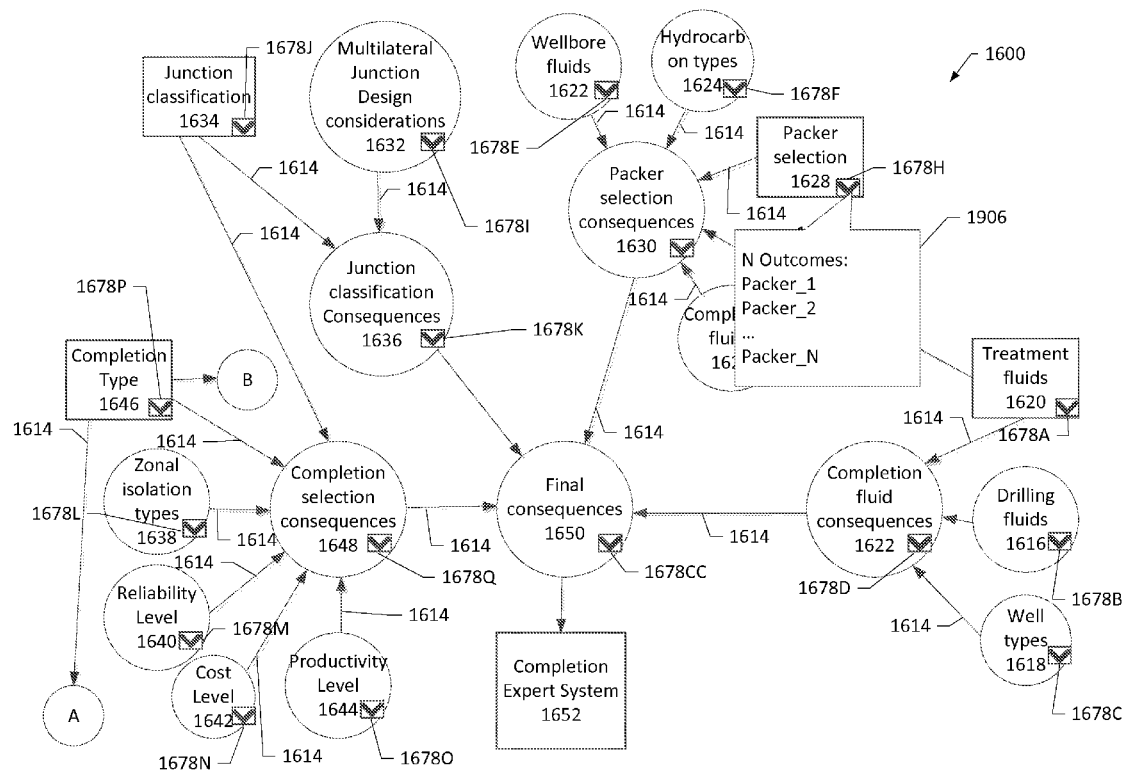

FIGS. 19-19D depict the selectable inputs for each node of the packer section 1604 of the well completion BDN model 1600 in accordance with an embodiment of the present invention. FIG. 19A depicts inputs 1900 for the wellbore fluids uncertainty node 1622 in accordance with an embodiment of the invention. As shown in FIG. 19A, the inputs 1900 may include different wellbore fluids and may have N number of inputs from "wellbore_fluid_1" through "wellbore_fluid_N." As will be appreciated, in some embodiments the inputs 1900 may include associated probabilities, such as probabilities p_1 through p_N. The inputs 1900 may include to possible well completion scenarios that occur during well completion operations in a drilling system. For example, in some embodiments, the inputs 1900 may include the following: "water", "steam", "methane", "CO2", and "$H_2S$".

FIG. 19B depicts inputs 1902 for the hydrocarbon types uncertainty node 1624 in accordance with an embodiment of the present invention. As shown in FIG. 19B, the inputs 1902 may include different types of hydrocarbons in a well and may have N number of input from "hydrocarbon_1" through "hydrocarbon _N." As will be appreciated, in some embodiments the inputs 1902 may include associated probabilities, such as probabilities p_1 through p_N. In some embodiments, for example, the inputs 1902 may include "Aliphatic hydrocarbons", "Aromatic hydrocarbons", "Crude oil less than 250° F.", "Crude oil more than 250° F.", "Sour crude", and "Gas sour natural gas".

Additionally, FIG. 19C depicts inputs 1904 for the completion fluids uncertainty node 1626 in accordance with an embodiment of the present invention. The inputs 1904 may include various completion fluids and may have N number of inputs from "completion_fluid_1" to "completion_fluid_N." As will be appreciated, in some embodiments the inputs 1904 may include associated probabilities, such as probabilities p_1 through p_N. In some embodiment, the inputs 1904 may include the following completion fluids: "$CaCl_2/CaBr_2$", "$ZnBr$", "$K_2CO_3$," and "Brine seawater."

Finally, inputs may be provided to the well completion BDN model 1600 via the packer selection decision node 1628. FIG. 19D depicts inputs 1906 for the packer selection decision node 1628 in accordance with an embodiment of the present invention. As shown in FIG. 19C, the inputs 1906 may include different packers and may have N number of inputs from "packer_1" to "packer_N." In some embodiments, for example, the inputs 1906 may include: "Increase_choke_size," "Decrease_choke_size," "Increase_pump_rate," "CR Neoprene", "AE AU Urethane", "NBR Nitrile", "ECO Hydrin", "PVDF Coflon", "HNBR Therban", "FKM Viton", "ETFE Tefzel", "FCM Aflas", "PEEK Victrex", "FFKM Kalrez", "PTFE Teflon", "Oil swelling packer" and "water swelling packer".

After selecting inputs for the nodes of the packer section 1604 of the well completion BDN model 1600, the selections may be propagated to the packer selection consequence node 1630 by using the Bayesian probability determinations described above in Equations 1, 2, and 4. By using the probabilities assigned to each of the inputs, the well completion BDN model 1600 may then provide recommended packers or expected utilities based on the inputs from the nodes of the packer section 1604, such as by assigning a value of 1 to the recommended well completion practices.

In some embodiments, the uncertainty nodes of the well completion BDN model 1600 may have inputs with associated probabilities. A user may select an input for one or more uncertainty nodes and view the recommendations based on the propagation of the selected input. For example, a user may select an input for the wellbore fluids uncertainty node 1622 and receive a recommended packer at the consequences node 1630 (based on the inputs to the nodes of the section 1604). In another example, a user may also select an input for the completion fluids uncertainty node 1626 and receive a recommended packer at the consequences node 1630 (based on the inputs to the nodes of the section 1604).

FIG. 20 depicts an example of the output from the packer consequence node 1630 based on the inputs described above in FIGS. 19A-19D and in accordance with an embodiment of the present invention. As shown in FIG. 20, in some embodiments the output may be presented as a table 2000 displaying expected utilities 2002 for a selected packer 2004 based on a selected hydrocarbon type 2006, a selected completion fluid 2008, treatment fluids 2010, and wellbore fluids 2012. The table 2000 may display a recommendation value determined according to the techniques described above and calculated by Equations 1, 2, 4, and 13. For example, the inputs to the packer section 1604 of the well completion BDN model 1600 may be used to determine the consequences via the packer selection consequence node 1630. Based on the results, recommended proposed circulations may be determined and expected utility values may be calculated. As shown in FIG. 20, various recommendations have values of 0 or 1 for the recommended or not recommended expected utilities. For example, the recommendation for "treatment_fluid_1" and "wellbore_fluid_2" includes a recommended expected utility value of 1 and a not recommended expected utility value of 0, while other recommended practices depicted in table 2000 may have a recommended expected utility value of 0 and a not recommended expected utility value of 1. In some embodiments, multiple recommended practices may have a recommended utility value of 1 depending on the expected utility calculations performed by the well completion BDN model 1600.

Figure 21A:
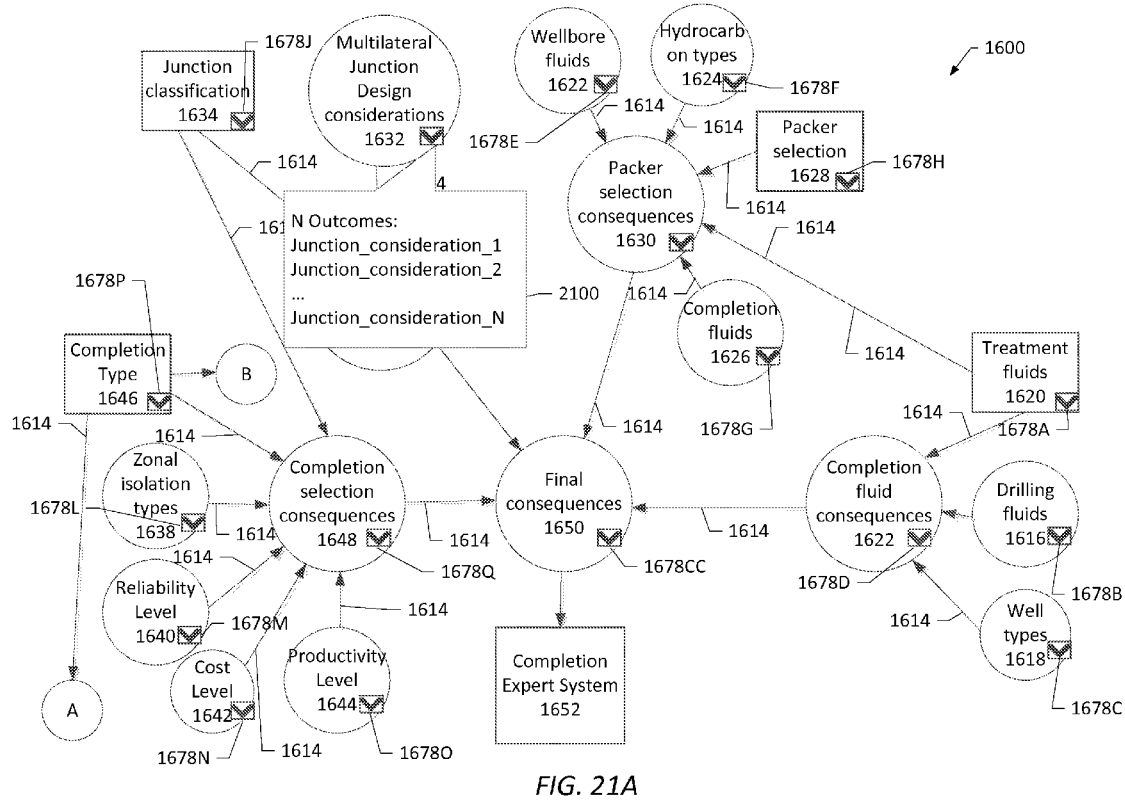
FIGS. 21A and 21B are schematic diagrams depicting inputs for a junction classification section of the well completion BDN model of FIGS. 16A and 16B in accordance with an embodiment of the present invention.
Figure 21B:
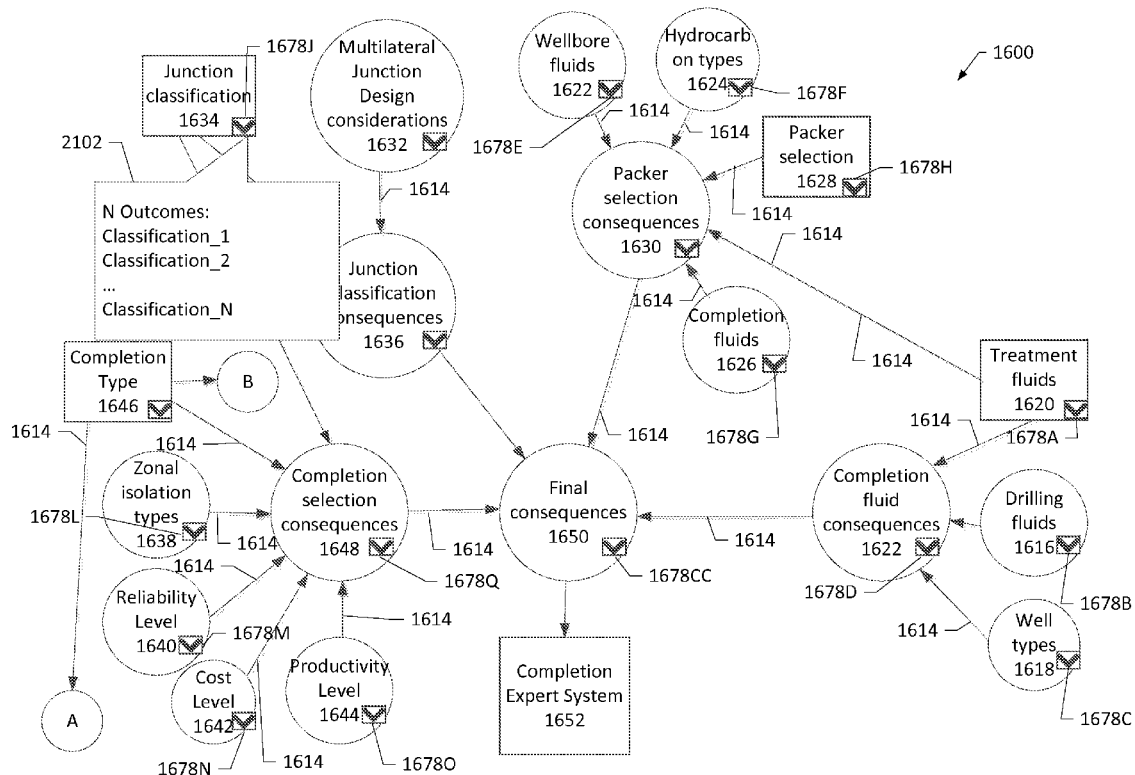

FIGS. 21A and 21B depict the inputs for each node of the junction classification section 1606 of the well completion BDN model 1600. FIG. 21A depicts inputs 2100 for the multilateral junction design considerations uncertainty node 1632 in accordance with an embodiment of the invention. The inputs 2100 may include considerations for designing a multilateral junction and may have N number of inputs from "junction_consideration_1" to "junction_consideration_N." As will be appreciated, in some embodiments the inputs 2100 may include associated probabilities, such as probabilities p_1 through p_N. The considerations may include challenges, benefits, limits, or other considerations for various multilateral designs. For example, in some embodiments the inputs 2100 may include:
"Consolidated_strong_formatio-n_and_zonal_control_is_not_critical",
"Formation_stability_is_required_ but_not_at_the_junction",
"Formation_stability_is_required_and_mechanical_isolation_and_ limited_stability_at_the_juncti on", "Reentry_is_possible", "Formation_stability_is_required_and_hydraulic_iso-lation_and_stability_at_the_junction",
"Best_completion_for_weak_incompe-tent_susceptible_to_wellbore_collapse", "Single_component_completion_hydraulic_isolation_is_maximum_and_does_not_depend_on_cementing_and_continuous_liner_I-D_accessing_both_bores_increase_well_control_capability", and "kickoff_point_is_not_possible_at_strong_formation".

FIG. 21B depicts inputs 2102 for the junction classification 1634 in accordance with an embodiment of the present invention. As shown in FIG. 21B, the inputs 2102 may include different junction classifications and may have N number of inputs from "classification_1" through "classification_N." In some embodiments, the inputs 2102 may include the following junction classifications: "Level 1", "Level 2", "Level 3", "Level 4", "Level 5", and "Level 6."

Again, after selecting inputs for the nodes of the junction classification section 1606 of the well completion BDN model 1600, the selections may be propagated to the junction classification consequences node 1634 by performing the Bayesian probability determinations described above in Equation 1, 2, and 4. By using the probabilities assigned to each of the inputs, the well completion BDN model 1600 may then provide recommended junction classifications based on the inputs from the nodes 1632 and 1634.

As noted above, in some embodiments, the uncertainty nodes of the well completion BDN model 1600 may have inputs with associated probabilities. A user may select an input for one or more uncertainty nodes and view the recommendations based on the propagation of the selected input. For example, a user may select an input for the multilateral junction design considerations uncertainty node 1632 and receive a recommendation at the consequences node 1636 (based on the inputs to the nodes 1632 and 1636).

Figure 22:
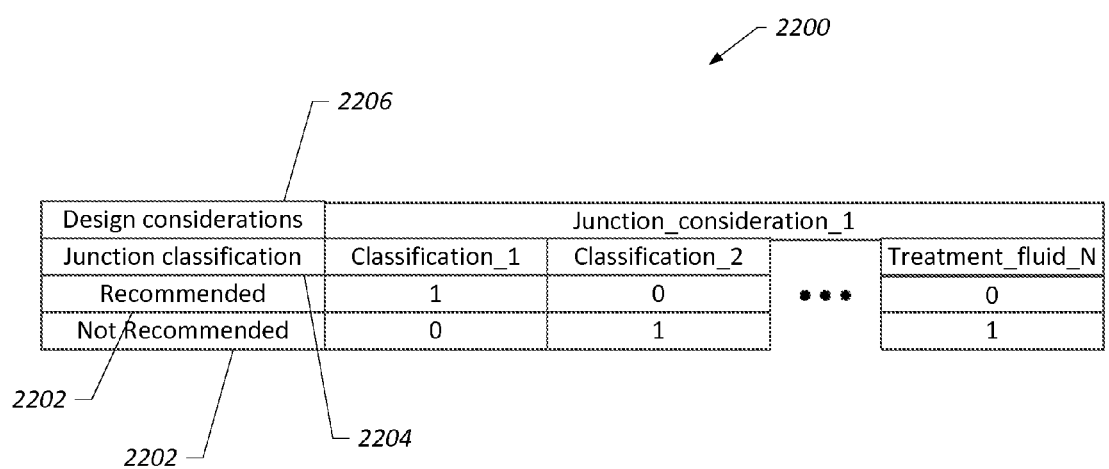
FIG. 22 is a table depicting outputs from a junction classification section of the well completion BDN model of FIGS. 16A and 16B in accordance with an embodiment of the present invention.

FIG. 22 depicts an example of the output from the junction classification consequences node 1636 based on the inputs described above in FIGS. 21A and 21B and in accordance with an embodiment of the present invention. Here again, as shown in FIG. 22, in some embodiments the output may be presented as a table 2200 displaying expected utilities 2202 for junction classifications 2204 based a selected multilateral junction design consideration 2206. The table 2200 may display a recommended value determined according to the techniques described above and calculated by Equations 1, 2, 4, and 13, based on, for example, selected inputs to the uncertainty node 1632. For example, the selected inputs to the junction classification section 1606 of the well completion BDN model 1600 may be used to determine the consequences via the junction classification consequences node 1636. Based on the results, recommended junction classifications may be determined and expected utility values may be calculated. As shown in FIG. 22, recommended solutions have values of 0 or 1 for the recommended or not recommended expected utilities. For example, "classification_1" has a recommended expected utility value of 1 and a not recommended expected utility value of 0, while other classifications depicted in table 2200 have a recommended expected utility value of 0 and a not recommended expected utility value of 1. In some embodiments, multiple classifications may have a recommended utility value of 1 depending on the expected utility calculations performed by the well completion BDN model 1600.

Figure 23A:
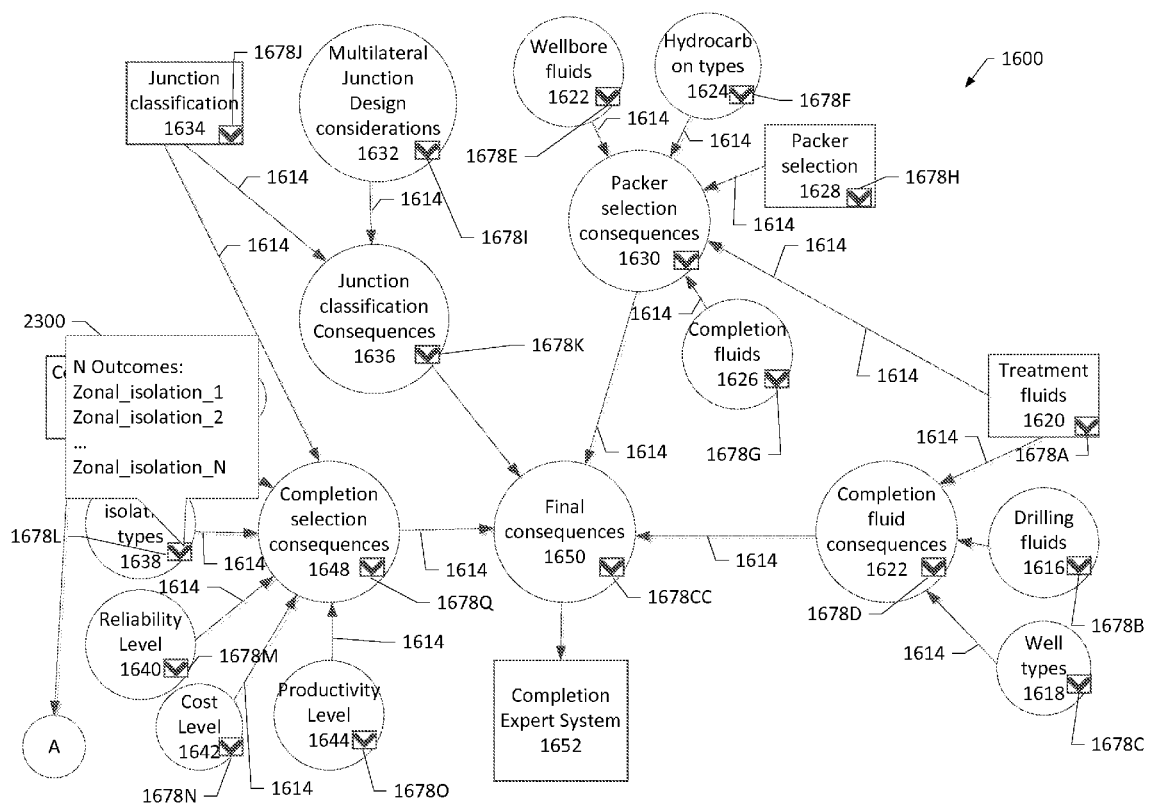
FIGS. 23A-23E are schematic diagrams depicting inputs for a lateral completion section of the well completion BDN model of FIGS. 16A and 16B in accordance with an embodiment of the present invention.

FIGS. 23A-23E depict the inputs for each node of the lateral completion section 1608 of the well completion BDN model 1600 in accordance with an embodiment of the present invention. FIG. 23A depicts inputs 2300 for the zonal isolation types uncertainty node 1638 in accordance with an embodiment of the invention. As shown in FIG. 23A, the inputs 2300 may include different levels of zonal isolation and may have N number of inputs from "zonal_isolation_type 1" through "zonal_isolation_type_N." As will be appreciated, in some embodiments the inputs 2300 may include associated probabilities, such as probabilities p_1 through p_N. In some embodiments, the inputs 2300 may include the following: "high", "medium", and "low".

Figure 23B:
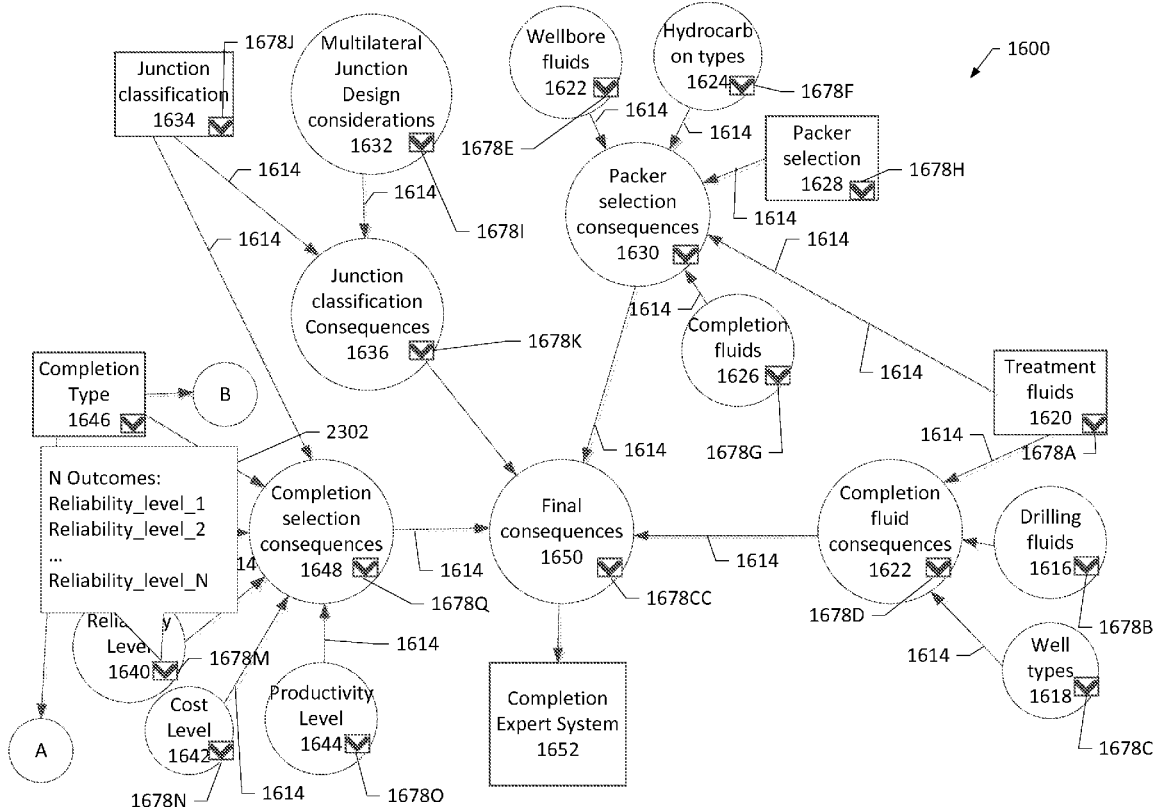

Additionally, FIG. 23B depicts inputs 2302 for the reliability level uncertainty node 1640 in accordance with an embodiment of the present invention. The inputs 2303 may include different levels of reliability and may have N number of inputs from "reliability_level_1" to "reliability_level_N." In some embodiments, the inputs 2300 to the uncertainty node 1640 may include associated probabilities, such as probabilities p_1 through p_N. In some embodiments, the inputs 2302 may include the following levels: "high", "medium", and "low".

Figure 23C:
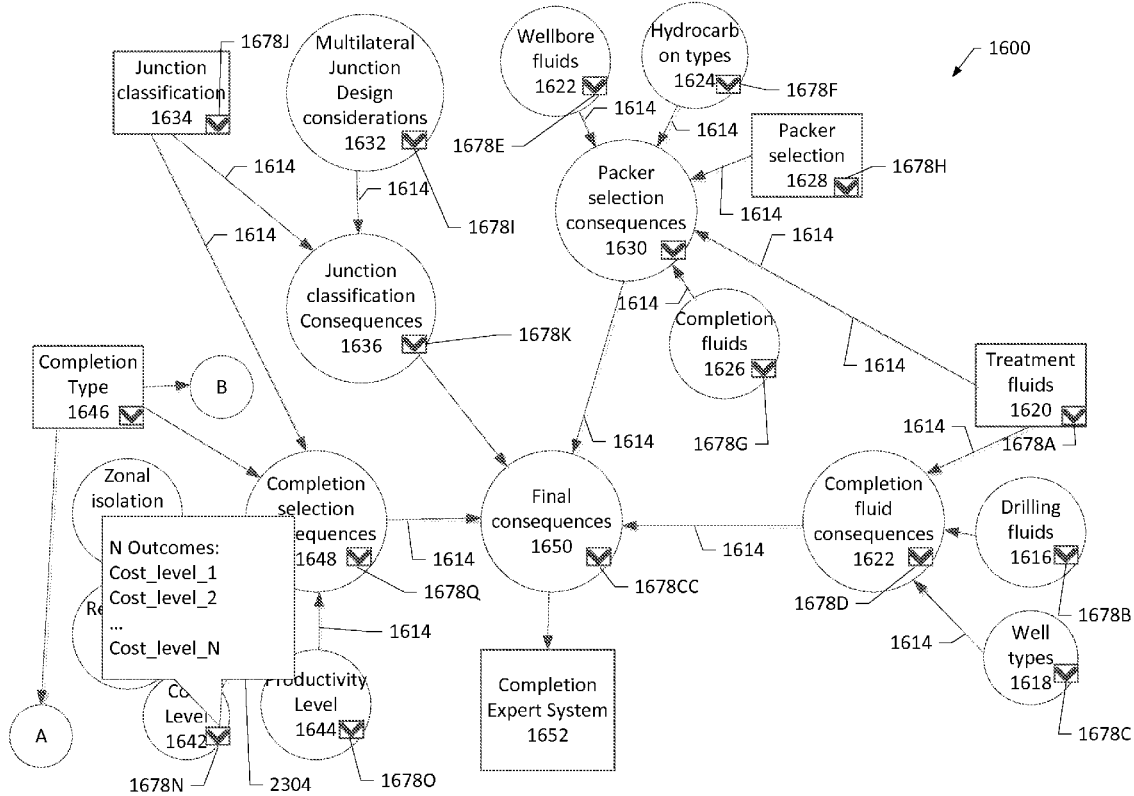
Figure 23D:
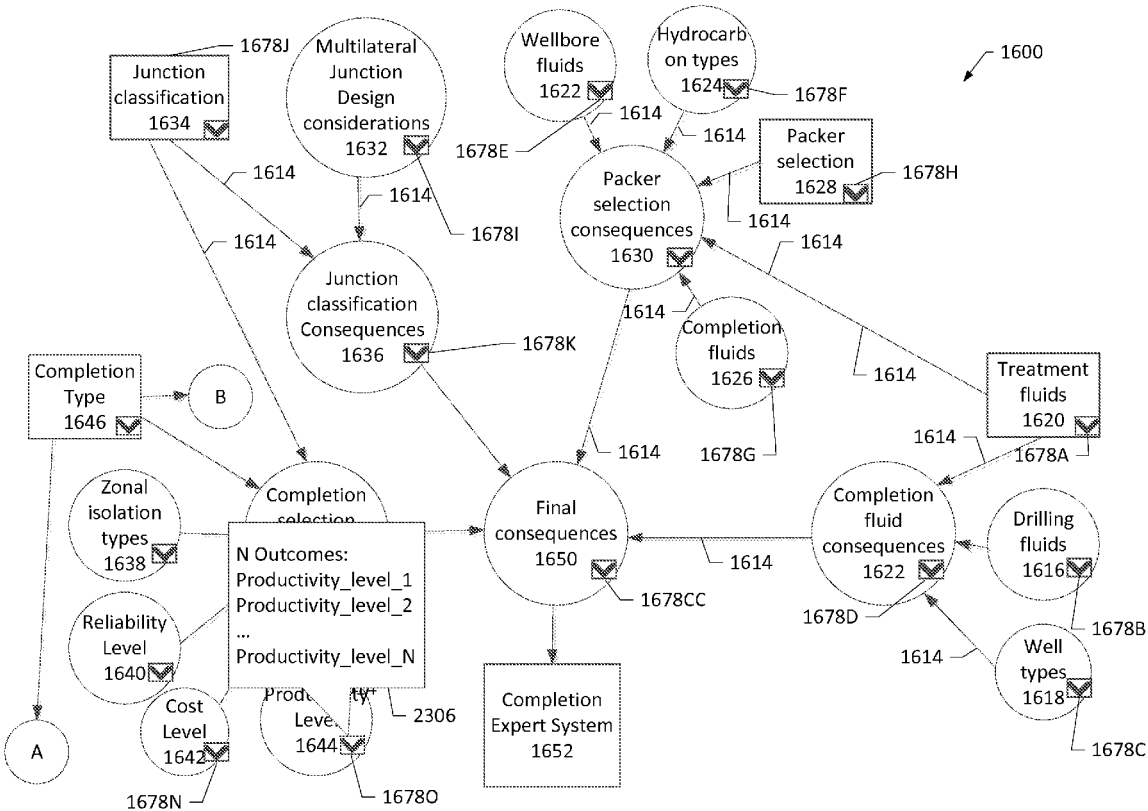

Next, FIG. 23C depicts inputs 2304 for the cost level uncertainty node 1642 in accordance with an embodiment of the present invention. The inputs 1642 may include different cost levels and may have N number of inputs from "cost_level_1" to "cost_level_N." Here again, in some embodiments the inputs 2304 may include associated probabilities, such as probabilities p_1 to p_N. In some embodiments, the inputs 2302 may include the following levels: "high", "medium", and "low". Additionally, FIG. 23D depicts inputs 2306 for the productivity level uncertainty node 1644 in accordance with an embodiment of the present invention. As shown in FIG. 23D, the inputs 2306 to the uncertainty node 1644 may be different productivity levels and may have N number of inputs from "productivity_level_1" to "productivity_level_N." In some embodiments, the inputs 2306 may include the following productivity levels: "high", "medium", and "low".

Figure 23E:
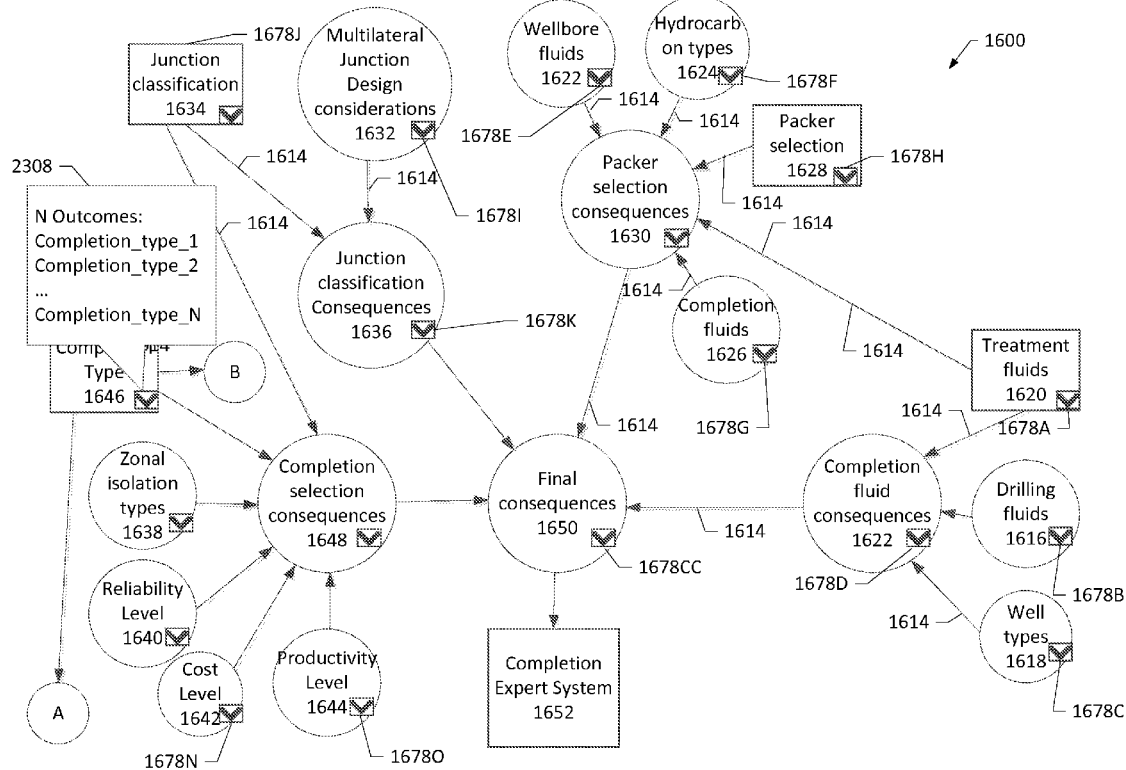

Finally, FIG. 23E depicts inputs 2308 for the completion type decision node 1646 in accordance with an embodiment of the present invention. The inputs 2308 to the decision node 1646 may include different types of lateral completion technologies and may have N number of inputs from "completion_type_1" to "completion_type_N." For example, in some embodiments the inputs 2308 may include: "Standalone screen", "Open hole gravel pack", "Cased hole gravel pack", "Frac pack", and "Openhole expandable screens."

The lateral completion section 1608 may operate in a manner similar to the other sections described above. For example, after selecting inputs for the nodes of the lateral completion section 1608 of the well completion BDN model 1600, the selections may be propagated to the completion selection consequences node 1648 by performing the Bayesian probability determinations described above in Equation 1, 2, and 4. By using the probabilities assigned to each of the inputs, the well completion BDN model 1600 may then provide recommended lateral completion selections based on the inputs from the nodes 1638, 1640, 1642, 1644, and 1646.

As noted above, in some embodiments, the uncertainty nodes of the well completion BDN model 1600 may have inputs with associated probabilities. A user may select an input for one or more uncertainty nodes and view the recommendations based on the propagation of the selected input. For example, a user may select an input for the zonal isolation types uncertainty node 1638 and receive a recommendation at the consequences node 1648 (based on the inputs to the other nodes 1640, 1642, 1644, and 1646). In another example, a user may select an input for the cost level uncertainty node 1642 and receive a recommendation at the consequences node 1648 (based on the inputs to the other nodes 1638, 1640, 1644, and 1646).

FIG. 24 depicts an example of the output from the completion selection consequences node 1636 based on the inputs described above in FIGS. 23A-23E and in accordance with an embodiment of the present invention. As shown in FIG. 24, in some embodiments the output may be presented as a table 2400 displaying expected utilities 2402 for completion types 2404 and junction classification consequences 2406 based on a selected junction classification 2408, a reliability level 2410, a productivity level 2412, a cost level 2414, and a zonal isolation type 2416. The table 2400 may display a recommended value determined according to the techniques described above and calculated by Equations 1, 2, 4, and 13, based on, for example, inputs to the uncertainty nodes of the section 1608. For example, the selected inputs to one or more of the uncertainty nodes 1638, 1640, 1642, and 1644 of the well completion BDN model 1600 may be used to determine the consequences via the completion selection consequences node 1648. Based on the results, recommended completions may be determined and expected utility values may be calculated. As shown in FIG. 24, recommended solutions have values of 0 or 1 for the recommended or not recommended expected utilities. For example, "completion_1" has a recommended expected utility value of 1 and a not recommended expected utility value of 0, while other classifications depicted in table 2400 have a recommended expected utility value of 0 and a not recommended expected utility value of 1. In some embodiments, multiple classifications may have a recommended utility value of 1 depending on the expected utility calculations performed by the well completion BDN model 1600.

Figure 25A:
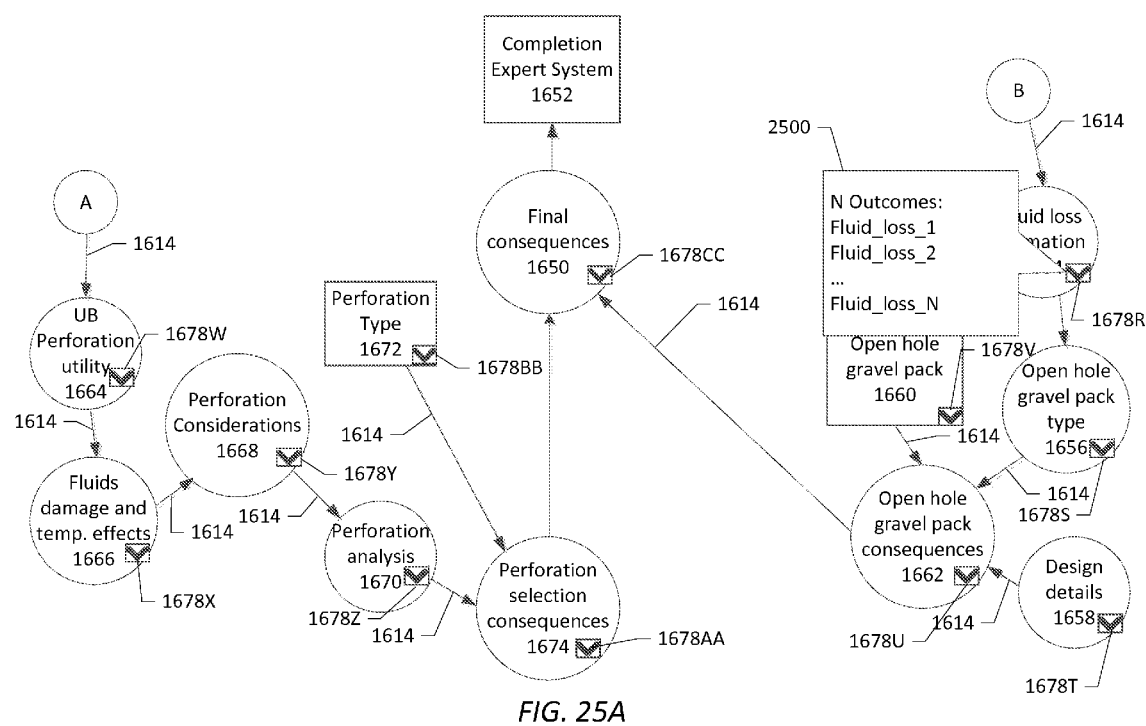
FIGS. 25A-25D are schematic diagrams depicting inputs for an open hole gravel pack section of the well completion BDN model of FIGS. 16A and 16B in accordance with an embodiment of the present invention.

Next, FIGS. 25A-25D depict the inputs for each node of the open hole gravel packing section 1610 of the well completion BDN model 1600 in accordance with an embodiment of the present invention. FIG. 25A depicts inputs 2500 for the fluid loss formation uncertainty node 1654 in accordance with an embodiment of the invention. As shown in FIG. 25A, the inputs 2500 may include the categorization of potential fluid loss formation and may have N number of inputs from "fluid_loss_1" through "fluid_loss_N." As will be appreciated, in some embodiments the inputs 2500 may include associated probabilities, such as probabilities p_1 through p_N. In some embodiments, the inputs 2500 may include the following: "Not required", "Fluid loss", and "No fluid loss".

Figure 25B:
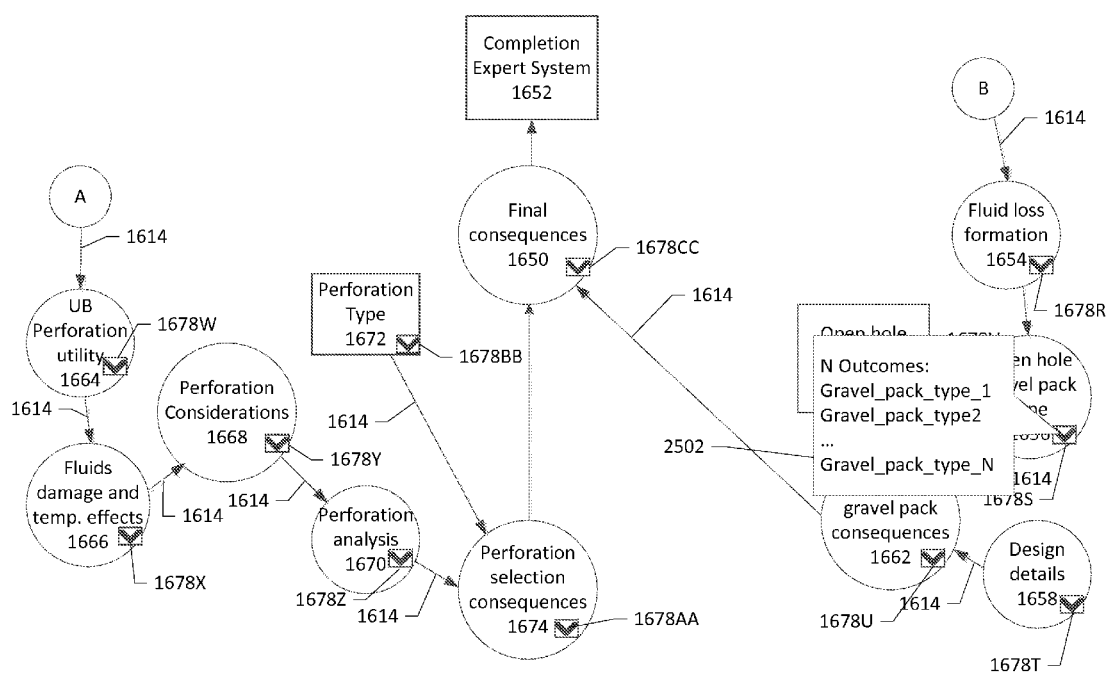

Additionally, FIG. 25B depicts inputs 2502 for the open hole gravel pack type uncertainty node 1656 in accordance with an embodiment of the present invention. The inputs 2502 may include different types of open hole gravel packing and may have N number of inputs from "gravel_pack_type_1" to "gravel_pack_type_N." In some embodiments, the inputs 2502 to the uncertainty node 1656 may include associated probabilities, such as probabilities p_1 through p_N. In some embodiments, for example, the inputs 2502 may include the following levels: "alternate path" and "circulation pack".

Figure 25C:
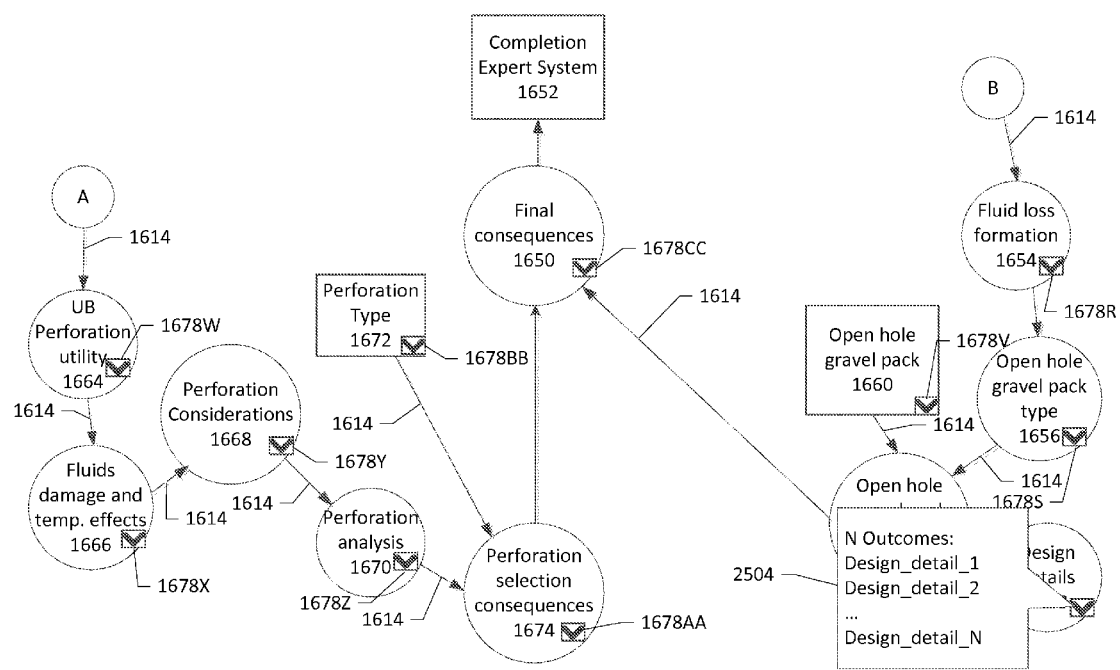

Next, FIG. 25C depicts inputs 2504 for the design details uncertainty node 1658 in accordance with an embodiment of the present invention. As shown in FIG. 25C, the inputs 2504 may include design details and may have N number of inputs from "design_detail_1" to "design_detail_N." In some embodiments, the inputs 2502 to the uncertainty node 1656 may include associated probabilities, such as probabilities p_1 through p_N. The inputs 2504 may include different details that may be used in designing an open hole gravel pack for well completion. For example, in some embodiments the inputs 2504 may include the following:" gravel pack fluids", "slurry density", "Fluid volume and time", "Fluid loss", "Pressure", "Hole condition", "Filter cake removal", "Screen size", and "Cost".

Figure 25D:
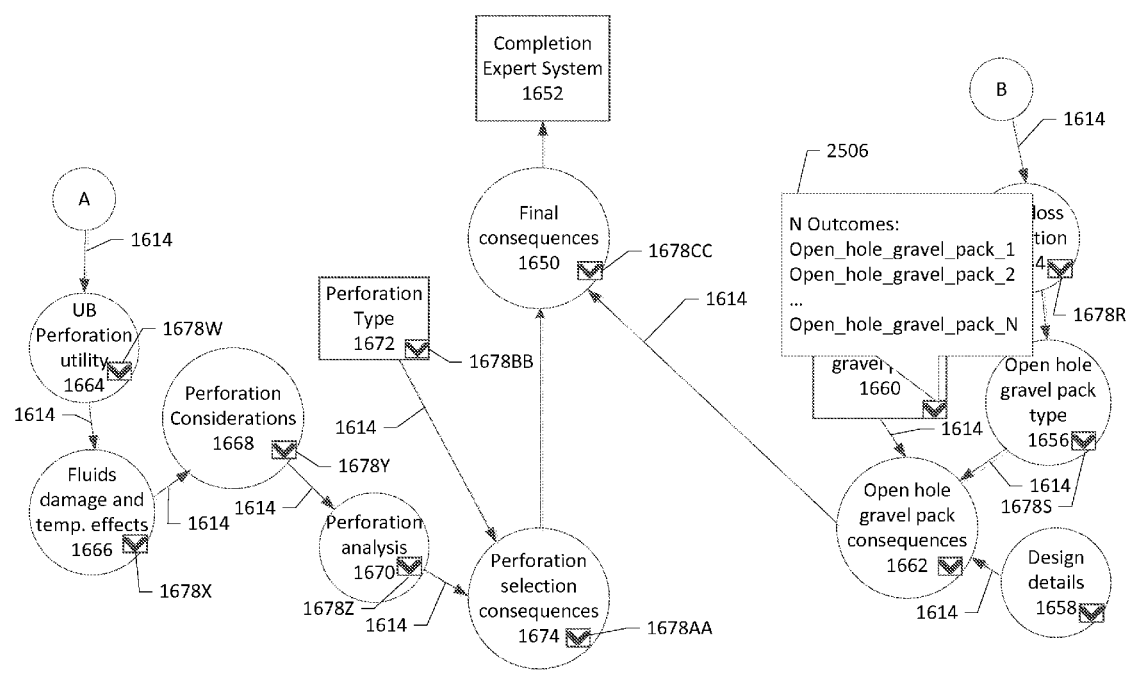

Further, FIG. 25D depicts inputs 2506 for the open hole gravel pack decision node 1660 in accordance with an embodiment of the present invention. The inputs 2506 may include different open hole gravel pack considerations and may N number of inputs from "open_hole_gravel_pack_1" to "open_hole_gravel_pack_N." For example, in some embodiment, the inputs 2506 may include:" gravel pack fluid of water or oil with viscosifier", "gravel pack fluid of water used with friction reducer", "high slurry density of 8 ppa", "low slurry density of up to 2 ppa", "low fluid volume and reduced pumping time", "large fluid volume", "No need for complete returns", "Complete returns is required", "can exceed fracture pressure", "cannot exceed fracture pressure", "critical washout is not a problem", "critical washout is a problem", "filter cake need to be removed", "filter cake does not have to be removed", "small base pipe but larger overall diameter for shunts", "large base pipe screen", "less time but more expensive chemicals", and "More rig time for pumping is required."

After selecting inputs for the nodes of the open hole gravel packing section 1610 of the well completion BDN model 1600, the selections may be propagated to the open hole gravel pack consequences node 1662 by performing the Bayesian probability determinations described above in Equation 1, 2, and 4. By using the probabilities assigned to each of the inputs, the well completion BDN model 1600 may then provide open hole gravel pack recommendations based on the inputs from the nodes 1656, 1658, and 1660. As noted above, in some embodiments, the uncertainty nodes of the well completion BDN model 1600 may have inputs with associated probabilities. A user may select an input for one or more uncertainty nodes and view the recommendations based on the propagation of the selected input. For example, a user may select an input for the open hole gravel pack type uncertainty node 1656 and receive a recommendation at the consequences node 1662 (based on the inputs to the other nodes 1658 and 1660). Similarly, a user may select inputs for the fluid loss formation uncertainty node 1654, the design details uncertainty node 1658, or all uncertainty nodes to receive recommendations at the consequences node 1662.

Figure 26:
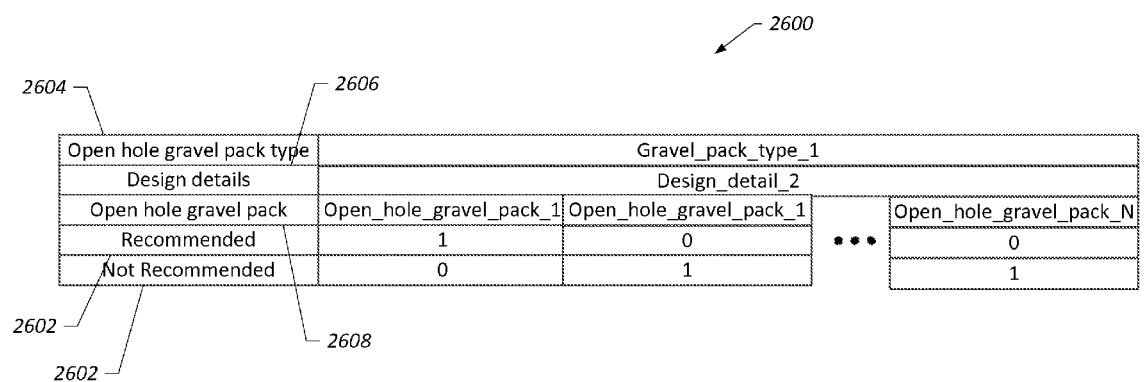
FIG. 26 is a table depicting outputs from an open hole gravel pack section of the well completion BDN model of FIGS. 16A and 16B in accordance with an embodiment of the present invention.

FIG. 26 depicts an example of the output from the open hole gravel pack consequences node 1662 based on the inputs described above in FIGS. 25A-25D and in accordance with an embodiment of the present invention. As shown in FIG. 26, in some embodiments the output may be presented as a table 2600 displaying expected utilities 2602 for open hole gravel packs 2604 based on a selected open hole gravel pack type 2606 and a design detail 2608. The table 2600 may display a recommended value determined according to the techniques described above and calculated by Equations 1, 2, 4, and 13, based on, for example, selected inputs to the uncertainty nodes of the section 1610. For example, the selected inputs to the uncertainty nodes 1656 and 1658 may be used to determine the consequences via the open hole gravel pack consequences node 1662. Based on the results, open hole gravel pack recommendations may be determined and expected utility values may be calculated. As shown in FIG. 26, open hole gravel pack considerations have values of 0 or 1 for the recommended or not recommended expected utilities respectively. For example, "open_hole_gravel_pack_1" has a recommended expected utility value of 1 and a not recommended expected utility value of 0, while other classifications depicted in table 2600 have a recommended expected utility value of 0 and a not recommended expected utility value of 1. In some embodiments, multiple open hole gravel pack considerations may have a recommended utility value of 1 depending on the expected utility calculations performed by the well completion BDN model 1600.

Figure 27A:
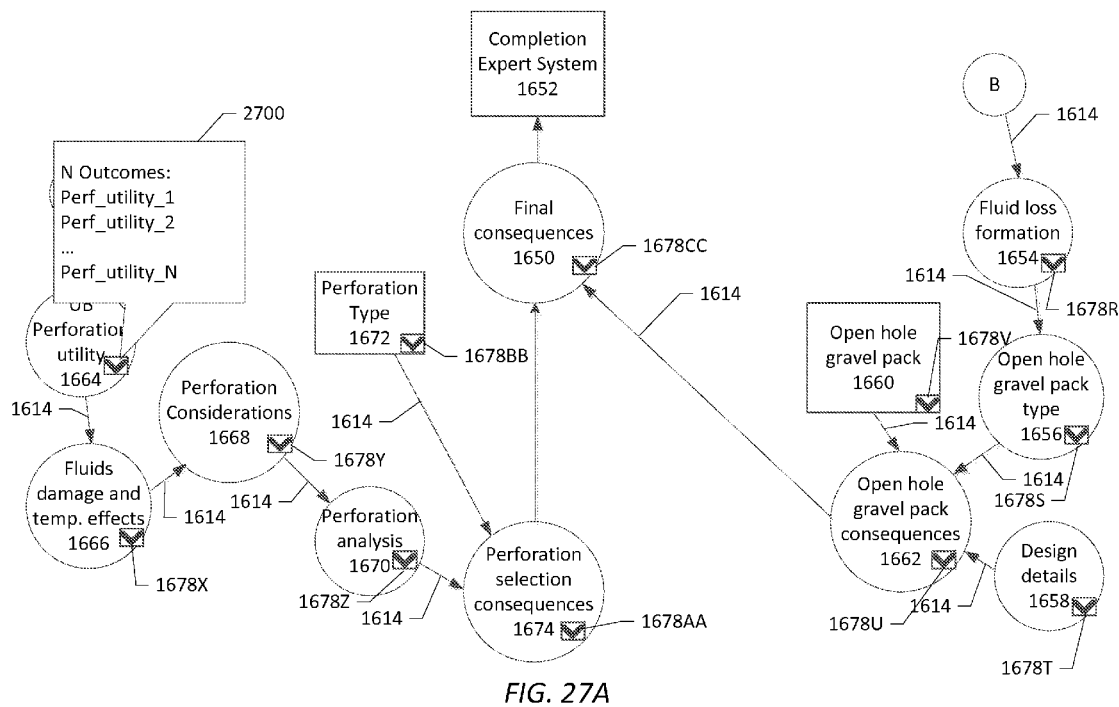
FIGS. 27A-27E are schematic diagrams depicting inputs for a perforation section of the well completion BDN model of FIGS. 16A and 16B in accordance with an embodiment of the present invention.

Finally, FIGS. 27A-27E depict the inputs for each node of the perforation section 1612 of the well completion BDN model 1600 in accordance with an embodiment of the present invention. FIG. 27A depicts inputs 2700 for the UB perforation utility uncertainty node 1664 in accordance with an embodiment of the invention. As shown in FIG. 27A, the inputs 2700 may have N number of inputs from "perf_utilty_1" through "perf_utility_N." As will be appreciated, in some embodiments the inputs 2700 may include associated probabilities, such as probabilities p_1 through p_N. The inputs 2700 may identify if UB perforation is useful in a well completion operation. In some embodiments, the inputs 2700 may include the following: "Not required", "Yes", and "No".

Figure 27B:
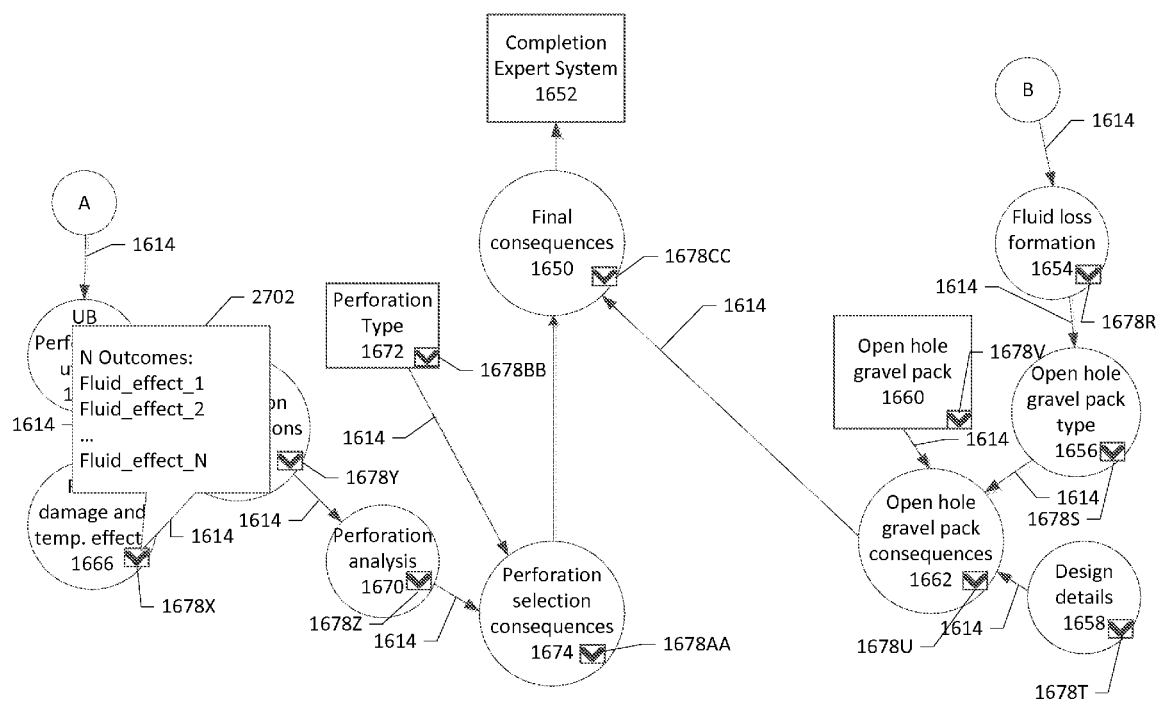

Next, FIG. 27B depicts inputs 2702 for the fluid damage and temperature effects uncertainty node 1666 in accordance with an embodiment of the present invention. The inputs 2703 may include damages and temperature effects and may have N number of inputs from "fluid_effect_1" to "fluid_effect_N." In some embodiments, in some embodiments the inputs 2700 may include associated probabilities, such as probabilities p_1 through p_N. The inputs 2702 may include various damage and temperate effects that may be caused by fluids used in perforation during a well completion operation. For example, in some embodiments, the inputs 2703 may include: "Can we formulate non damaging fluid" and "Need to consider temperature."

Figure 27C:
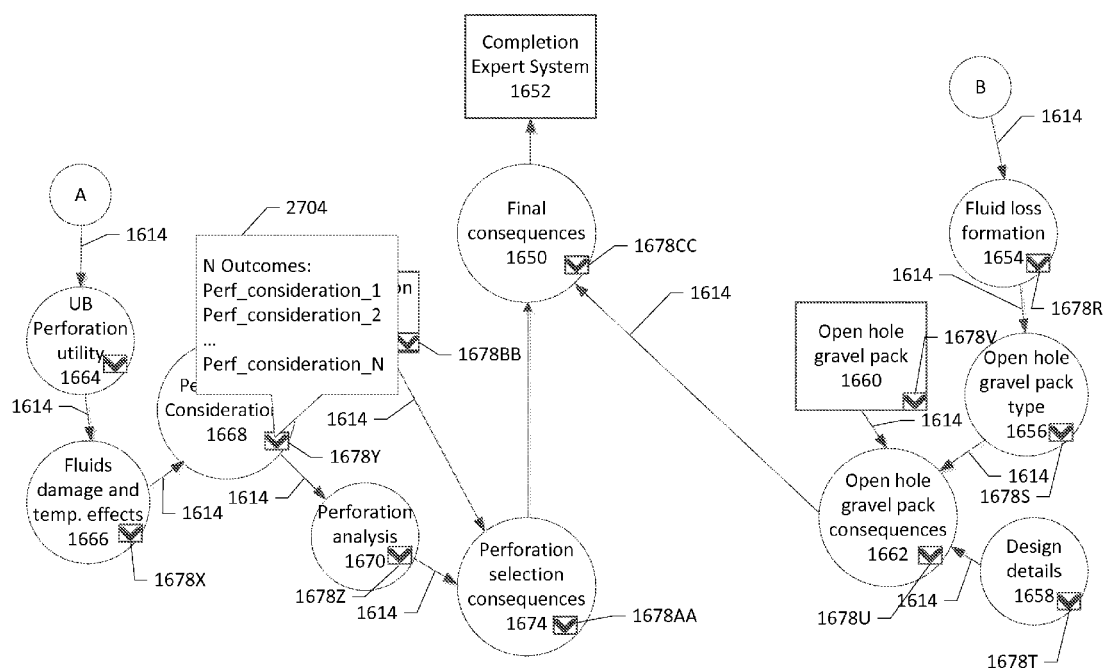

Additionally, FIG. 27C depict inputs 2704 for the perforation considerations uncertainty node 1668 in accordance with an embodiment of the present invention. The inputs 2704 may have N number of inputs from "perf_consideration_1" to "perf_consideration_N." In some embodiments, in some embodiments the inputs 2704 may include associated probabilities, such as probabilities p_1 through p_N. The inputs 2704 may include various considerations, such as challenges, benefits, limits, and so on, for using perforation in a well completion operation. For example, in some embodiments, the inputs 2704 may include the following: "Higher than 450° F.", "Lower than 450° F.", "We can formulate non damaging fluid", and "We cannot formulate non damaging fluid".

Figure 27D:
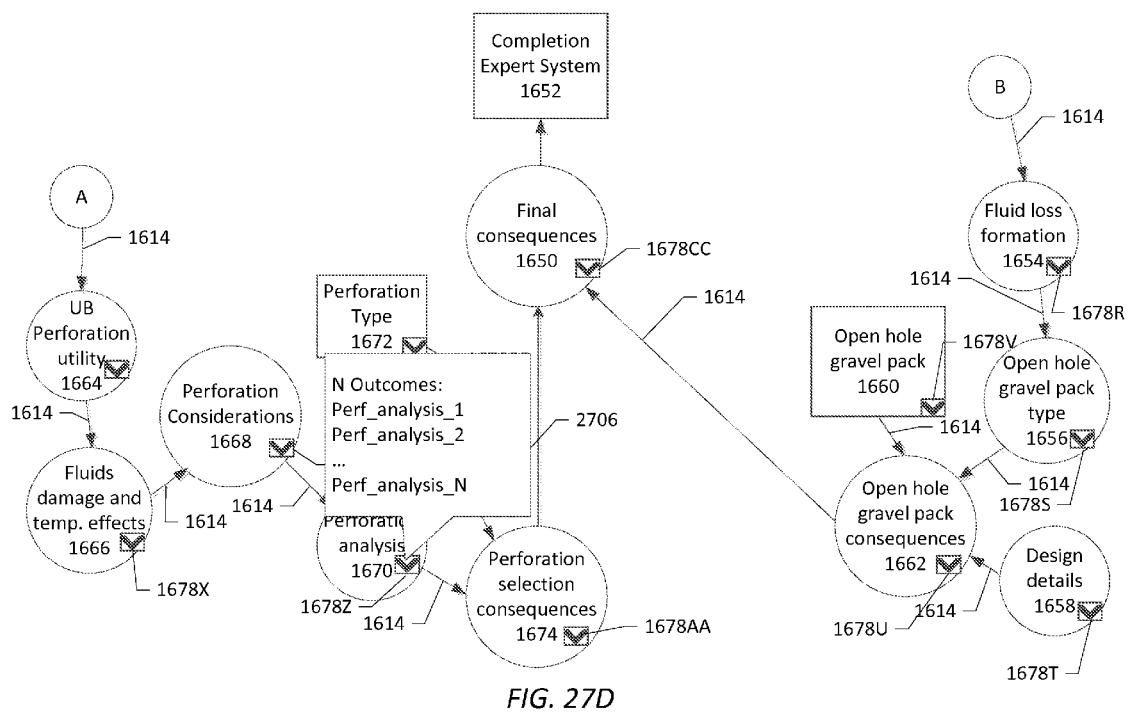

Further, FIG. 27D depicts inputs 2706 for the perforation analysis uncertainty node 1670 in accordance with an embodiment of the present invention. As shown in FIG. 27D, the inputs 2706 may include different perforation analysis and may have N number of inputs from "perf_analysis_1" to "perf_analysis_N." In some embodiments, in some embodiments the inputs 2706 may include associated probabilities, such as probabilities p_1 through p_N. In some embodiments, for example, the inputs 2706 may include: "multiple runs with through tubing guns cannot achieve adequate well rates", "multiple runs with through tubing guns can achieve adequate well rates", "through tubing guns can be used", "through tubing guns cannot be used", "can the damage be removed by acidizing in carbonate formation", "can the damage be removed by fractured stimulation", and "we can formulate non damaging fluid."

Figure 27E:
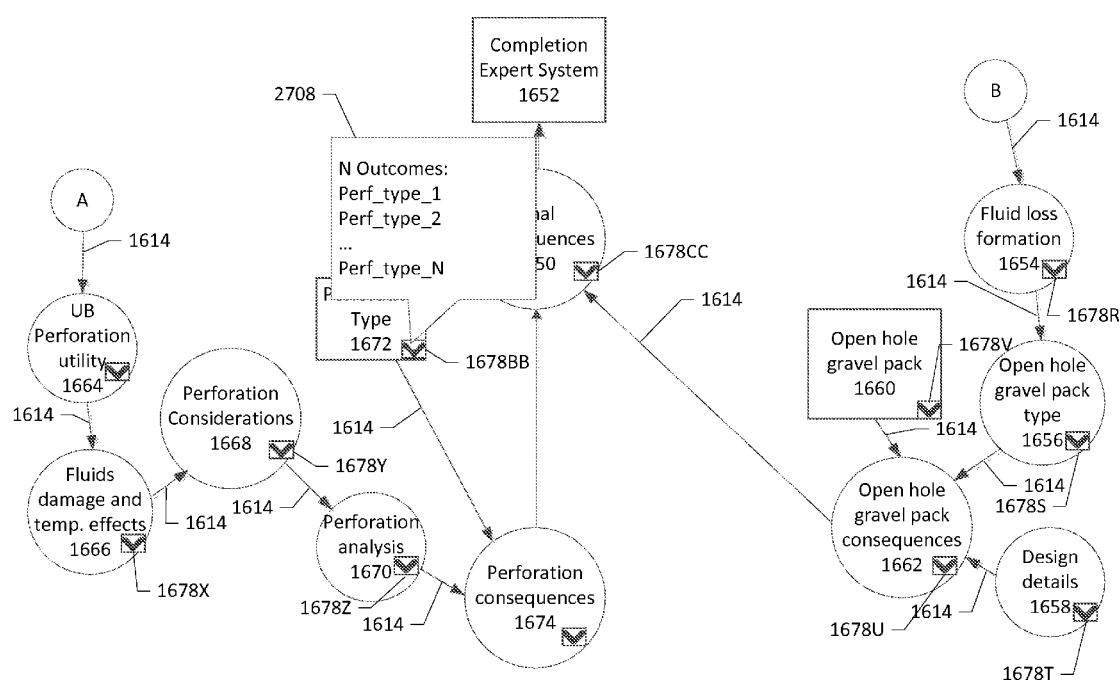

Finally, FIG. 27E depicts inputs 2708 for the perforation type decision node in accordance with an embodiment of the present invention. The inputs 2708 may include different types of perforation for well completion and may have N number of inputs from "perf_type_1" to "perf_type_N" For example, in some embodiments, the inputs 208 may include the following: "Multiple runs with through tubing guns", "through tubing guns", "Design for tubing conveyed perforation", "Consider if underbalanced perforating with casing guns is acceptable and evaluate fluid damage risks during completion running if well will kill itself if perforated without tubing", Consider perforating overbalanced in acid with casing or through tubing guns", "Review special perforation requirements for fracturing such as diversion and proppant placement", and "Design for overbalanced perforating using wire line conveyed casing guns".

After selecting inputs for the nodes of the perforation section 1612 of the well completion BDN model 1600, the selections may be propagated to the perforation consequences node 1674 by performing the Bayesian probability determinations described above in Equation 1, 2, and 4. By using the probabilities assigned to each of the inputs, the well completion BDN model 1600 may then provide perforation recommendations based on the inputs from the nodes 1670 and 1672. As noted above, in some embodiments, the uncertainty nodes of the well completion BDN model 1600 may have inputs with associated probabilities. A user may select an input for one or more uncertainty nodes and view the recommendations based on the propagation of the selected input. For example, a user may select an input for the UB perforation utility uncertainty node 1664 and receive a recommendation at the consequences node 1674 (based on the propagated inputs to the other nodes). Similarly, a user may select inputs for the perforation considerations uncertainty node 1668 or the other uncertainty nodes and receive recommendations at the consequences node 1662.

Figure 28:
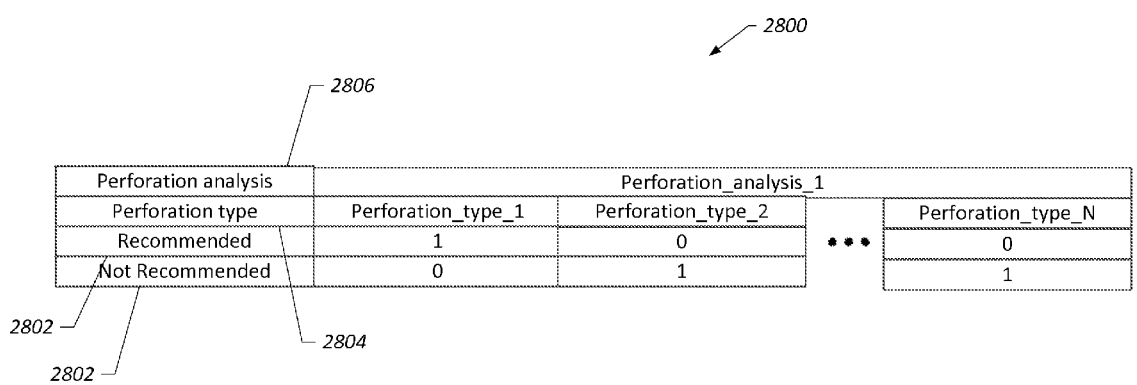
FIG. 28 is a table depicting outputs from an open hole gravel pack section of the well completion BDN model of FIGS. 16A and 16B in accordance with an embodiment of the present invention.

FIG. 28 depicts an example of the output from the perforation consequences node 1662 based on the inputs described above in FIGS. 27A-27ED and in accordance with an embodiment of the present invention. As shown in FIG. 28, in some embodiments the output may be presented as a table 2800 displaying expected utilities 2802 for perforation types 2804 based on a perforation analysis 1670. The table 2800 may display a recommended value determined according to the techniques described above and calculated by Equations 1, 2, 4, and 13, based on, for example, selected inputs to the uncertainty nodes of the section 1610. For example, the inputs to the uncertainty nodes 1664, 1666, 1668, and 1670 may be used to determine the consequences via the perforation consequences node 1674. Based on the results, perforation recommendations may be determined and expected utility values may be calculated. As shown in FIG. 28, perforation types may have values of 0 or 1 for the recommended or not recommended expected utilities respectively. For example, "perforation_type_1" has a recommended expected utility value of 1 and a not recommended expected utility value of 0, while other perforation types depicted in table 2800 have a recommended expected utility value of 0 and a not recommended expected utility value of 1. In some embodiments, multiple perforation types may have a recommended utility value of 1 depending on the expected utility calculations performed by the well completion BDN model 1600.

In using the using the well completion BDN model 1600, one or more sections 1602, 1604, 1606, 1608, 1610, and 1612 may be used; thus a user may use one or more sections of the well completion BDN model 1600 but not use the remaining sections of the well completion BDN model 1600. Additionally, the well completion BDN model 1600 may provide recommendations or expected utilities at the final consequence node 1650 based on the propagated outputs from the consequence nodes 1622, 1630, 1636, 1648, 1662, and 1674. For example, a user may select (e.g., click) the final consequence node 1650 to receive the recommendations from the well completion BDN model 1600. FIG. 29 depicts an example of the output from the final consequence node 1650 based on the inputs described above in FIGS. 17-28 in accordance with an embodiment of the present invention. The output from the consequence node 1650 may be displayed as a table 2900 that includes expected utilities 2902 for junction classification consequences 2904, lateral completion consequences 2906, completion fluid consequences 2908, packer consequences 2910, open hole gravel packs consequences 2912, and perforation consequences 2914. The table 2900 may include recommended and not recommended utilities 2902 for the various combinations of inputs and associated expected utilities, as determined by the techniques described above in Equations 1, 2, and 4. For example, as shown in FIG. 29, for the recommended expected utility for the various combinations of consequences may be 0 or 1. Similarly, the not recommended expected utility for various combinations of consequences may be 0 or 1. Based on these expected utility values, a user may decide to implement various combinations junction classifications, lateral completions, completion fluids, packers, open hole gravel packs, and perforations. The utility node 1652 may calculate expected values from the final consequences node 1650, such as by calculating a Recommended value (e.g., 0 or 1) and a Not recommended value (e.g., 0 or 1).

Figure 30A:
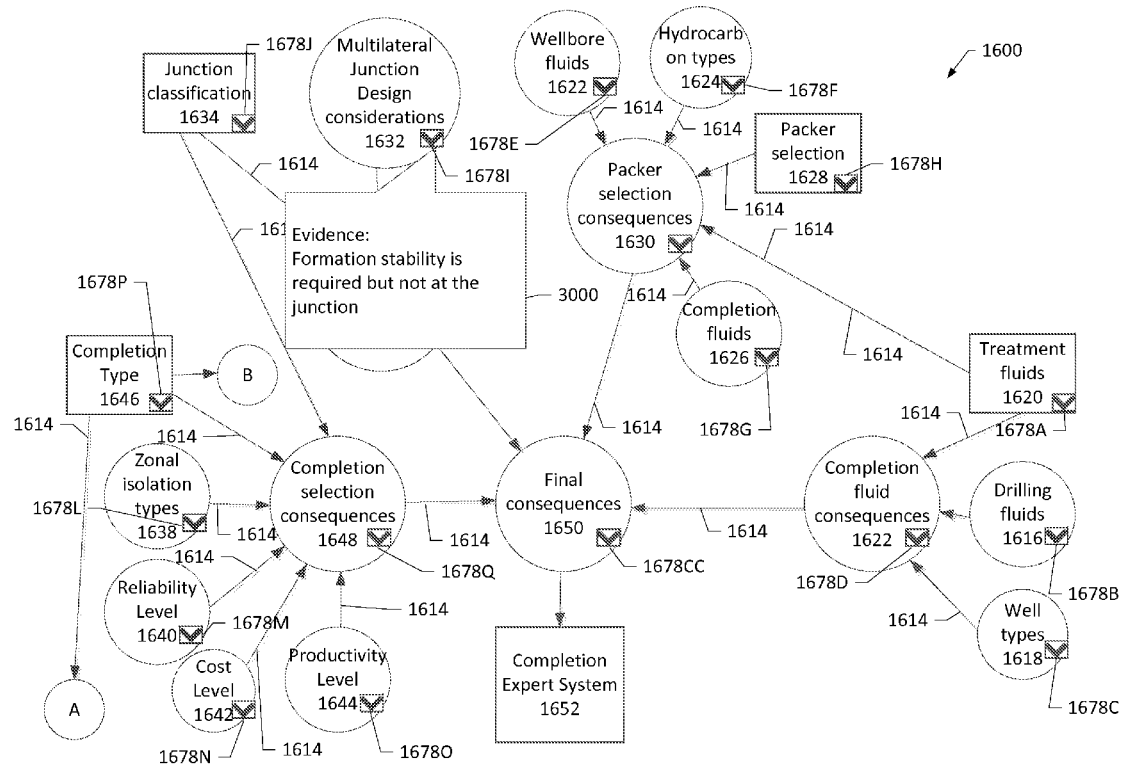
FIGS. 30A-30F are schematic diagrams depicting user selected inputs of the well completion BDN model of FIGS. 16A and 16B in accordance with an embodiment of the present invention.

As described above, a user may interact with the well completion BDN model 1600 as part of a well completion expert system to enter inputs at uncertainty nodes and receive outputs from consequence nodes, such as recommendations of a completion fluid, a junction classification, and so on. Each uncertainty node may include inputs having an associated probability distribution of probabilities. Additionally, a user may select a particular input for an uncertainty node such that a probability state of 1 is assigned to the selected input. Accordingly, the selected input may be the only input to the selected uncertainty node. FIGS. 30A-30F depict examples of user selected inputs and corresponding outputs of the well completion BDN model 1600 in accordance with an embodiment of the present invention. For example, FIG. 30A depicts a user selected input for the junction classification section 1606. FIG. 30A depicts an input 3000 for the multilateral junction design considerations uncertainty node 1632 in accordance with an embodiment of the present invention. The user may select (e.g., click) the button 16781 to display multilateral junction design considerations for the multilateral junction design considerations uncertainty node 1632. A user may then select (e.g., click) one of the multilateral junction design considerations. For example, as shown in FIG. 30, a user may select the multilateral junction design considerations "Formation_stability_is_required_ but_not_at_ the_junction" as the input 3000. The input 3000 may be displayed to indicate the selected input for the uncertainty node 1610.

Figure 30B:
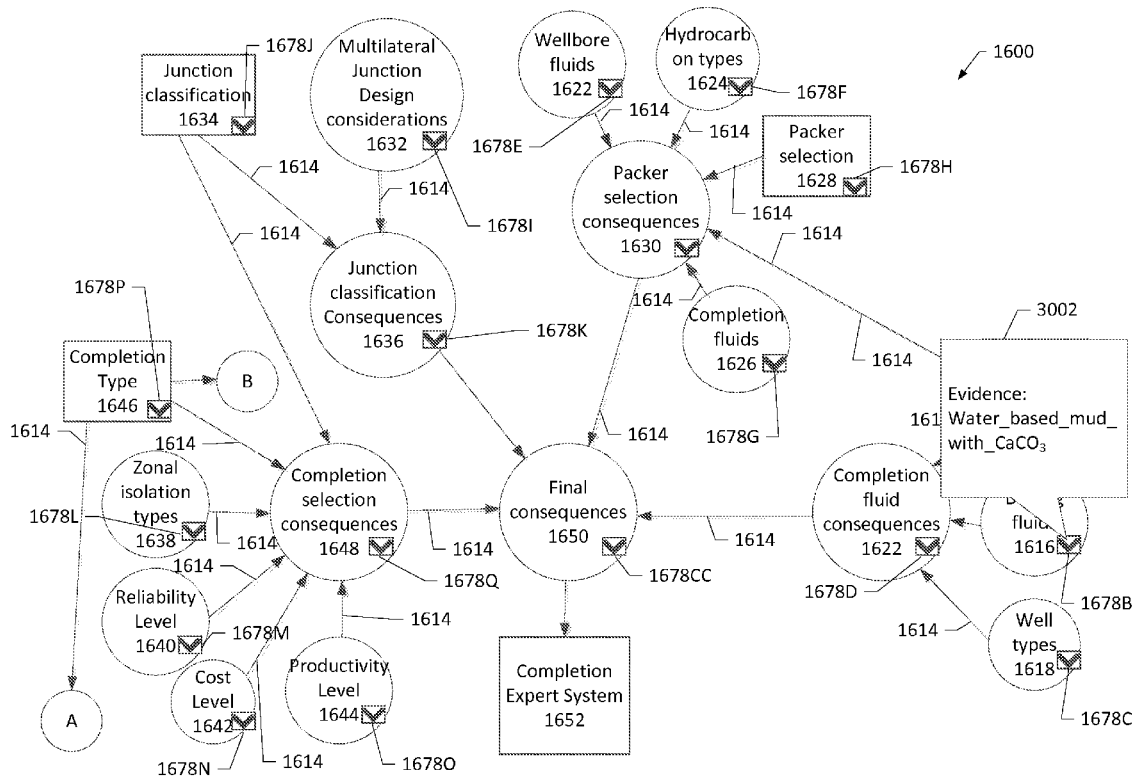
Figure 30C:
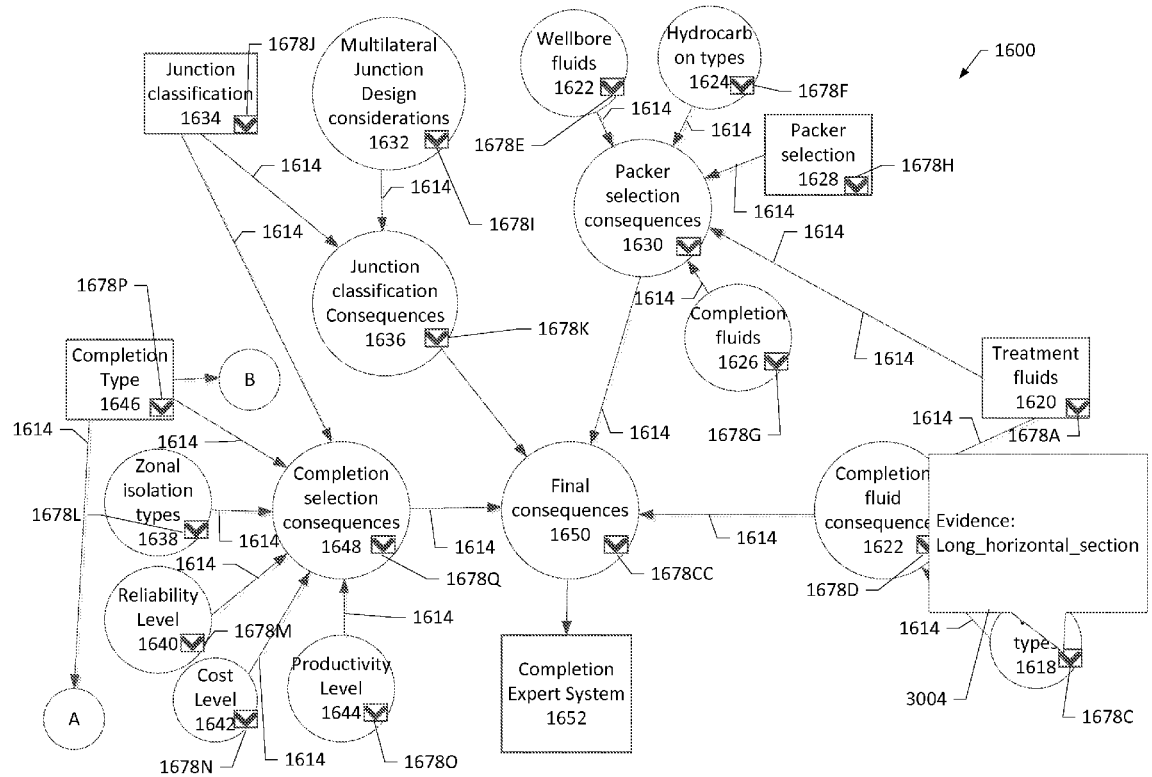

A user may select inputs for other uncertainty nodes and other sections in the well completion BDN model 1600. For example, as shown in FIG. 30B, a user may select an input 3002 for the drilling fluids uncertainty node 1616 in accordance with an embodiment of the present invention. The user may select (e.g., click) the button 1678B to display drilling fluids for the uncertainty node 1616. The user may then select (e.g., click) one of the drilling fluids 1616 to select a specific input for the uncertainty node 1616. As shown in the figure, the user may select "Water_based_mud_with_CaCO$_3$" as the input 3002 to the uncertainty node 1616. Additionally, FIG. 30C shows an input 3004 selected by a user for the well types uncertainty node 1618 in accordance with an embodiment of the present invention. Here again, a user may select the button 1678C to display the well types for the uncertainty node 1618, and a user may then select (e.g., click) a well type to specific an input for the uncertainty node 1618. As shown in FIG. 30C, a user may select "Long_horizontal_section" as the input 3004 for the uncertainty node 1618

Figure 30D:
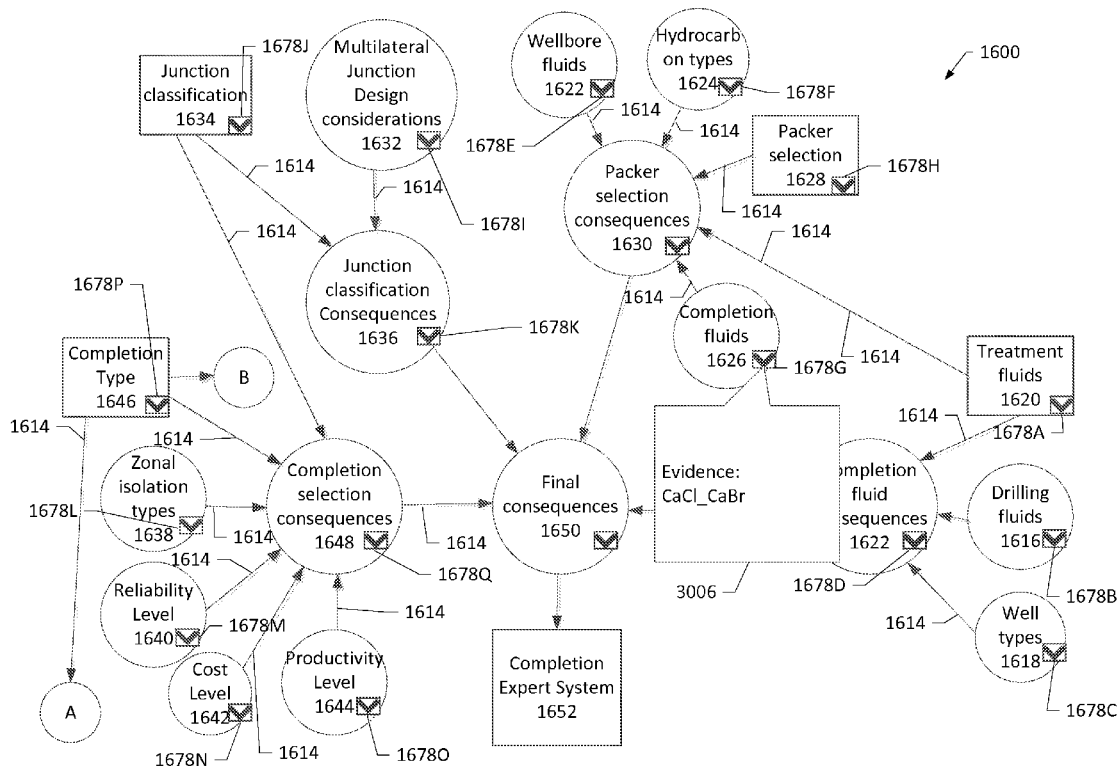

Next, FIG. 30D shows an input 3006 selected by a user for the completion fluids uncertainty node 1626 in accordance with an embodiment of the present invention. As described above, by selecting the button 1678G, the user may view completion fluids associated with the uncertainty node 1622 and select one of the completion fluids as a specific input for the uncertainty node 1626. For example, as shown in FIG. 30D, a user may select "CaCl_CaBr" as the input 3006 for the uncertainty node 1626.

Figure 30E:
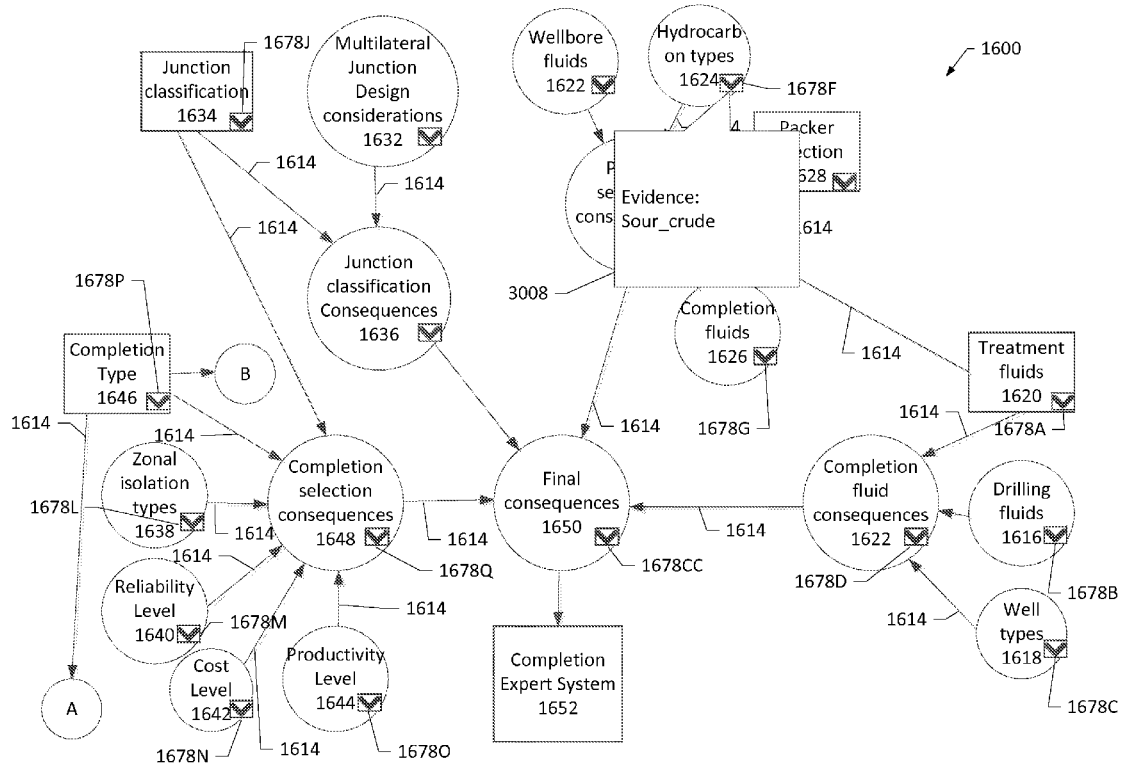
Figure 30F:
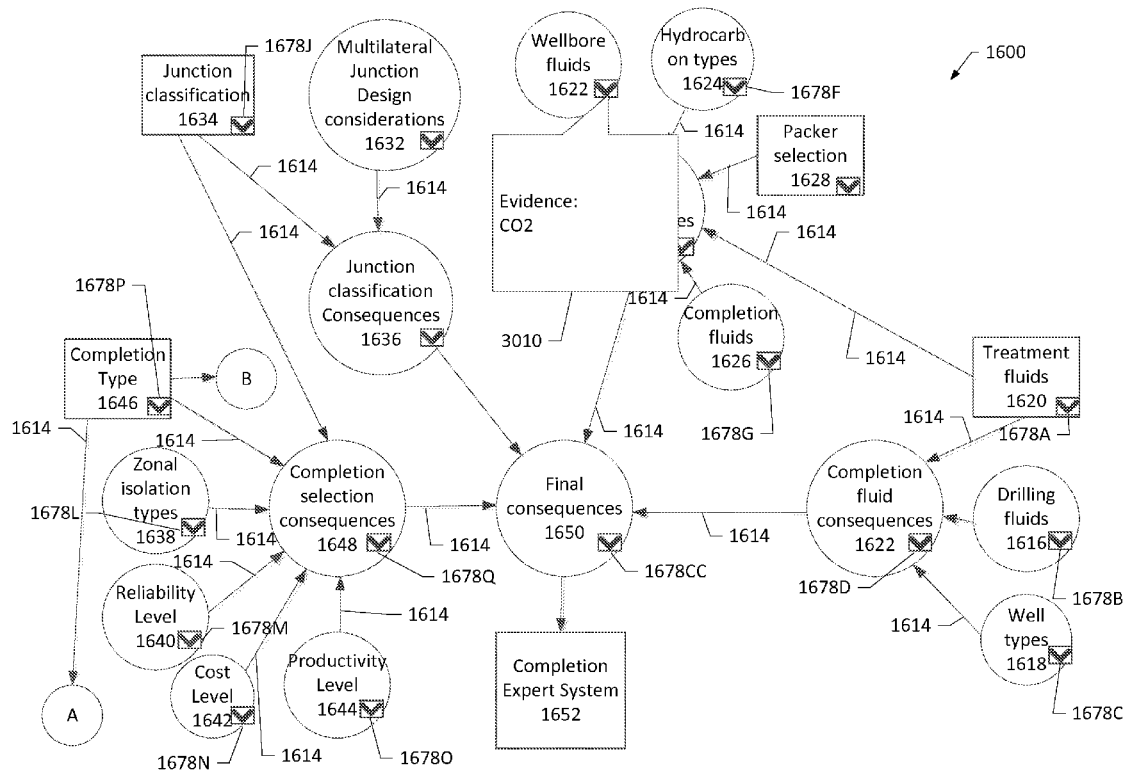

FIGS. 30E and 30F show additional selected inputs for the well completion BDN model 1600. FIG. 30E depicts an input 3008 for the hydrocarbon types uncertainty node 1624 in accordance with an embodiment of the present invention. As shown in the figure, a user may select "Sour_crude" as the input 3008 for the hydrocarbon types uncertainty node 1624, such as by selecting the button 1678F. Similarly, FIG. 30F depicts an input 3010 for the wellbore fluids uncertainty node 1622 in accordance with an embodiment of the present invention. As shown in FIG. 30F, a user may select "CO2" as the input 3010 for the wellbore fluids uncertainty node 1624, such as by selecting the button 1678E.

Based on the input described above in FIGS. 30A-30F, a user may select various consequence nodes to receive the output for each section of the well completion BDN model 1600. FIG. 31A depicts the output from the junction classification section 1606 of the well completion BDN model 1600 based on the selected inputs described above in FIGS. 30A-30F and in accordance with an embodiment of the present invention. As shown in FIG. 31 in some embodiments the output from the well completion BDN model 1600 may be presented as a table 3100 displaying expected utilities 3102 for junction classifications 3104 as input to the junction classifications decision node 1634. For example, as shown in FIG. 31, the junction classifications 3104 may include: "Level_1", "Level_2", "Level_3", "Level_4", and "Level_5". The junction classifications 3104 may each be associated with a recommended expected utility value and a not recommended expected utility value according to the calculations performed by the well completion BDN model 1600. For example, as shown in FIG. 31, the "Level_4" junction classification has a recommended expected utility of 1 and a not recommended expected utility of 0. As also shown in FIG. 31, the other junction classifications 3104 have a recommended expected utility of 0 and a not recommended expected utility of 1. Accordingly, based on the selected inputs provided to the BDN model 1600 illustrated in FIGS. 30A-30F, a user may decide to use a "Level_4" junction classification in well completion operation for a drilling system characterized by the selected inputs.

Additionally, a user may select other consequence nodes to view outputs from the other sections of the well completion BDN model 1600 based on the inputs described above in FIGS. 30A-30F. For example, a user may select the completion fluid consequences node 1622 to view the output from the completion fluid section 1602. As shown in FIG. 32, the output from the consequence node 1622 may be presented as a table 3200 having expected utilities 3202 for treatment fluids 3104, based on the treatment fluids input to the treatment fluids decision node 1620. For example, as shown in FIG. 32, the treatment fluids 3104 may include "Inhibitors_Amines", "Alcohol_methanol", "Formic" and N number of other fluids up to "treatment_fluid_N. As shown in the figure, the "Formic" treatment fluid has a recommended utility of 1 and a not recommended utility of 0. Thus, based on the selected inputs provided to the BDN model 1600 illustrated in FIGS. 30A-30F, a user may decide to use a "Formic" treating fluid in a well completion operation for a drilling system characterized by the selected inputs.

In another example, a user may select the completion selection consequences node 1648 to receive recommendations for the lateral completion section 1608. FIG. 33 depicts the output from the completion selection consequences node 1648 in accordance with an embodiment of the present invention. Here again, the output may be presented as a table 3300 having expected utilities 3302 for completion types 3304 based on the completion types input to the completion type decision node 1646 and junction classifications 3306. As shown in FIG. 33, the lateral completions may include, for example, "Standalone screen", "Open hole gravel pack", and "Open_hole_expandable_screen" up to N number of lateral completions ("completion_type_N"). As also shown in FIG. 33, for a junction classification of "Level 4", the completion type "Open_hole_expandable_screen" has a recommended utility of 1 and a not recommended utility of 0. Thus, a user may decide to use this completion types in a well completion operation for a drilling system characterized by the selected inputs.

Further, in another example, a user may select the open hole gravel pack consequences node 1662 to receive recommendations for the open hole gravel pack section 1610. FIG. 34 depicts a table 3400 that may be output from the open hole gravel pack section 1610. The table 3400 may display expected utilities 3402 for open gravel packs 3304 based on the open hole gravel packs input to the open hole gravel pack decision node 1660. For example, the open hole gravel packs 3304 may include "gravel_pack_fluid_water_or_oil_ with_viscosifier", "gravel_pack_fluid_of_water_used_ with_friction_reducer" and "high slurry density of 8 ppa" up to N number of open hole gravel packs ("open_hole_gravel_pack_N"). As shown in FIG. 34, the expected utilities may be fractional values if a user has not selected any specific inputs in the open hole gravel pack section 1610. Thus, the inputs to the consequences node may be probability distributions from the uncertainty nodes of the section 1610. As shown in table 3400, none of the open hole gravel packs have an recommended expected utility greater than the not recommended expected utility. Accordingly, a user may decide not to use open hole gravel packs in a well completion operation for a drilling system characterized by the selected inputs. As will be appreciated, a user may select other consequence nodes, such as the packer consequences node 1630 or the perforation consequences node 1674, to receive recommendations from other sections of the well completion BDN model 1600.

Figure 35A:
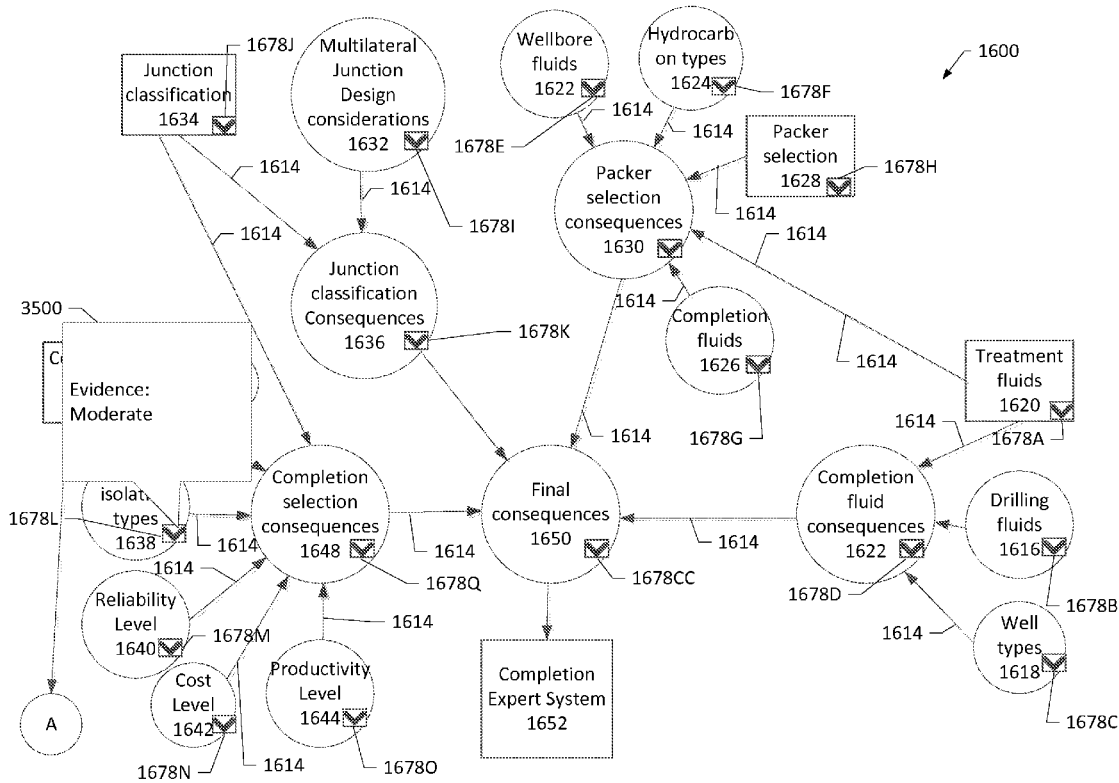
FIGS. 35A-35D are schematic diagrams depicting user selected inputs of the well completion BDN model of FIGS. 16A and 16B in accordance with an embodiment of the present invention.
Figure 35B:
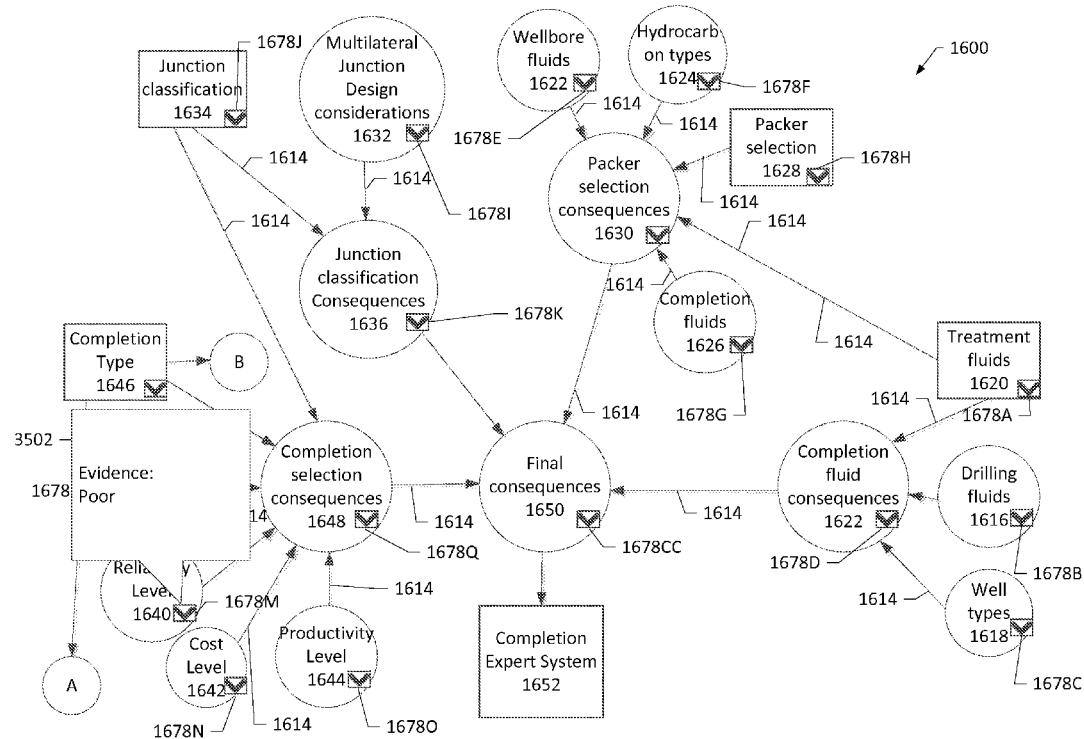
Figure 35C:
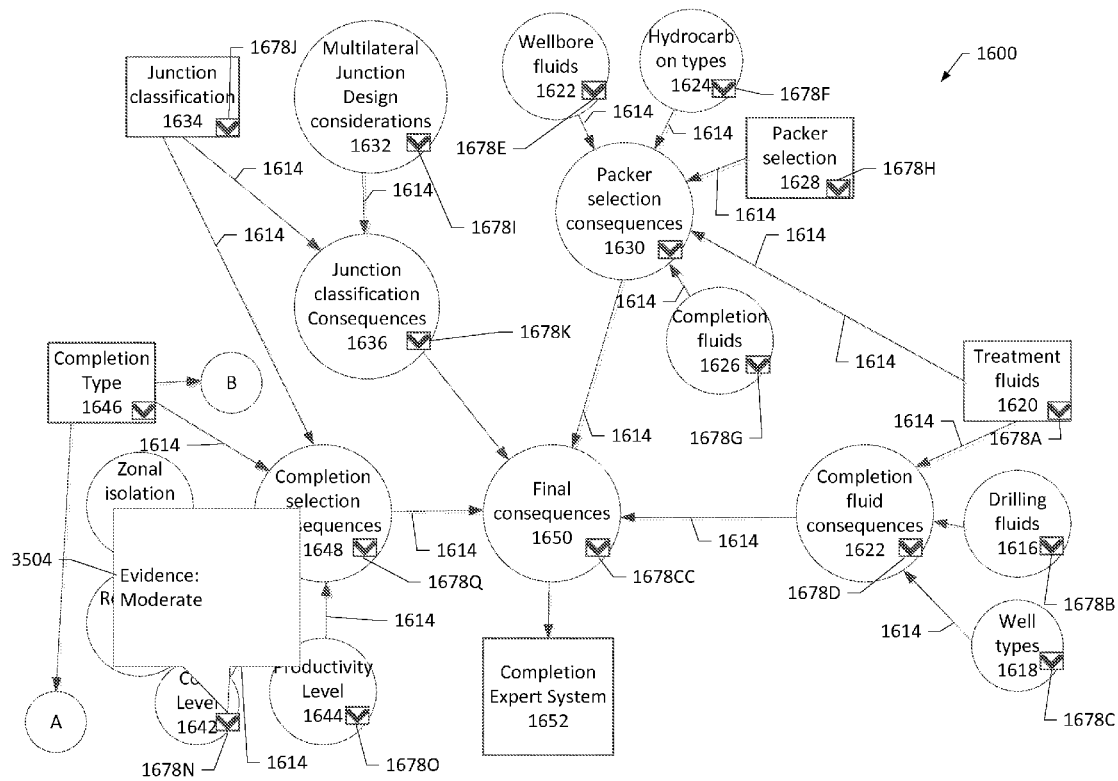
Figure 35D:
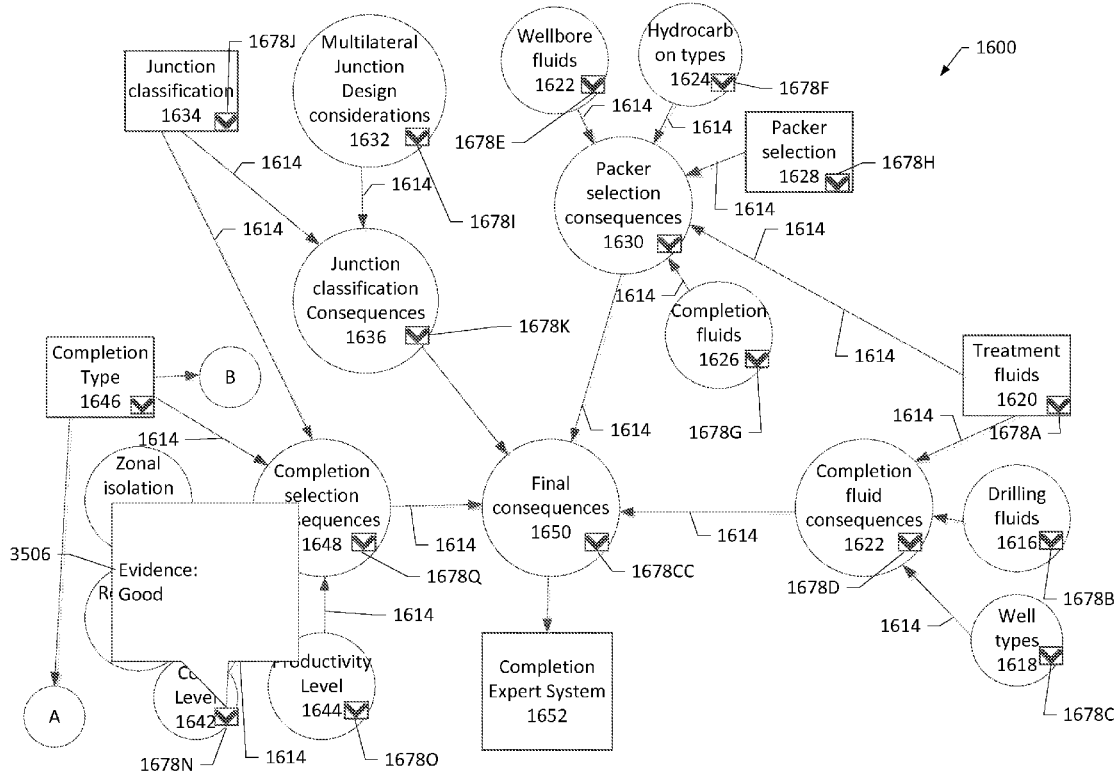

A user may add inputs at any nodes of the well completion BDN model 1600 after entry of the inputs described above in FIGS. 30A-30F. For example, as shown in FIGS. 35A-35D, a user may select inputs to the uncertainty nodes 1638, 1640, 1642, and 1644 of the lateral completion section 1608 in accordance with an embodiment of the present invention. As described above, the input to each uncertainty node may be selected by selecting (e.g., clicking) the appropriate button and viewing and selecting an input. For example, as shown in FIG. 35A, a user may select an input 3500 ("moderate") for the zonal isolation type uncertainty node 1638. In another example, as shown in FIG. 35B, a user may select an input 3502 ("poor") for the reliability level uncertainty node 1640. Similarly, as shown in FIG. 35C, a user may select an input 3504 ("moderate") for the cost level uncertainty node 1642. Finally, as shown in FIG. 35D, a user may select an input 3506 ("good") for the productivity level uncertainty node 1644.

After selection of specific inputs for the lateral completion section 1608, the output from the completion consequences node 1648 depicted in table 3300 in FIG. 33 may change. FIG. 36 depicts the output from the completion consequences node 1648 in accordance with an embodiment of the present invention. For example, after selecting the button 1678Q, a table 3600 may be displayed that depicts changed output from the consequences node 1648 in response to the user selections described above in FIGS. 35A-35D. The table 3600 includes expected utilities 3602 for completion types 3604 based on the completion types input to the completion type decision node 1646 and junction classifications 3606. As shown in FIG. 33, the lateral completions may include, for example, "Standalone screen", "Open hole gravel pack", and "Cased hole gravel pack" up to N number of lateral completions ("completion_type_N"). As also shown in FIG. 33, for a junction classification of "Level 4", the completion type "Open_hole_gravel_pack" has a recommended utility of 1 and a not recommended utility of 0. In contrast, the "Open_hole_expandable_screen" completion type now has recommended utility of 0 and a not recommended utility of 1. Thus, a user may decide to use the "Open_hole_gravel_pack" completion type in a well completion operation for a drilling system characterized by the selected inputs additionally entered for the lateral completion section 1608.

Figure 37A:
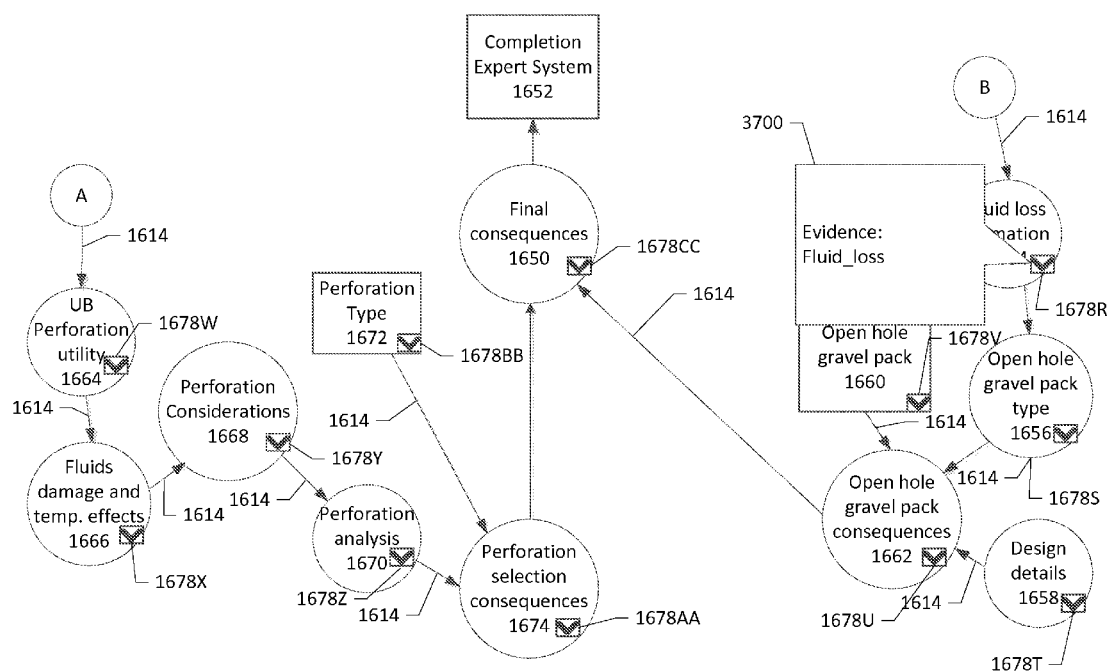
FIGS. 37A and 37B are schematic diagrams depicting user selected inputs of the well completion BDN model of FIGS. 16A and 16B in accordance with an embodiment of the present invention.
Figure 37B:
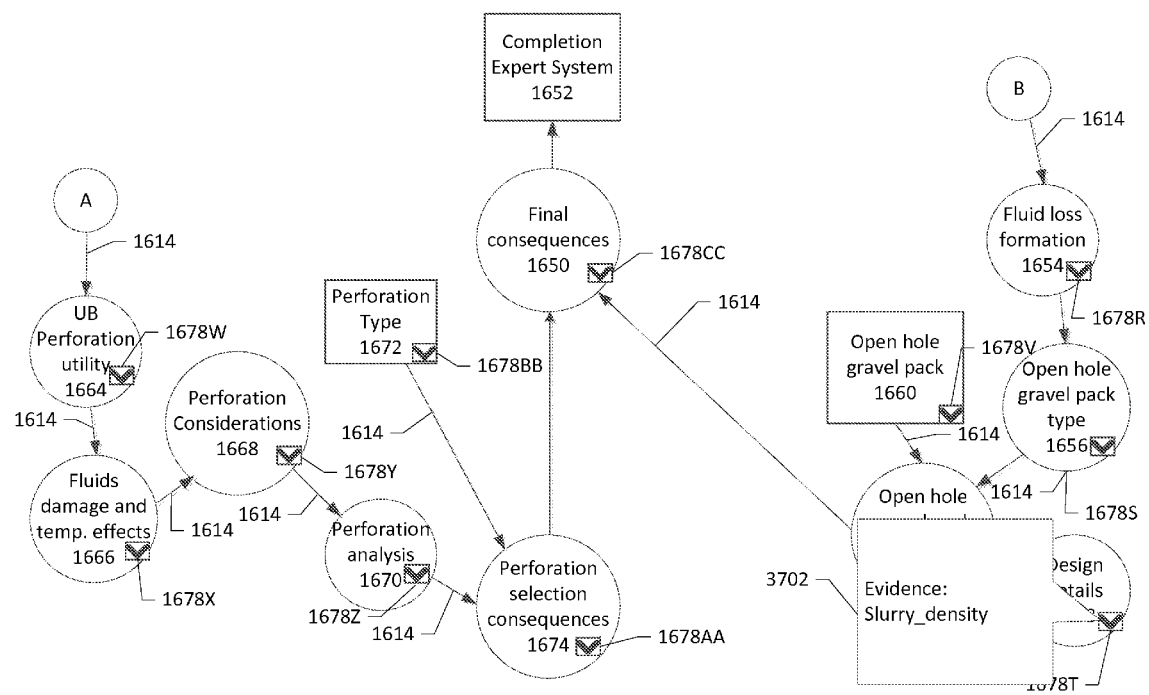

Based on the example described above, a user may enter inputs for the open hole gravel pack section 1610 to receive additional recommendations regarding use of an open hole gravel pack. For example, as shown in FIG. 37A, a user may select an input 3700 for the fluid loss formation uncertainty node in accordance with an embodiment of the present invention. By selecting (e.g., clicking) the button 1678R, a user may view fluid loss formation inputs and select a specific input. For example, as shown the figure, a user may select "fluid_loss" as the input 3700 to the fluid loss formation uncertainty node 1654. Similarly, a user may enter inputs for other uncertainty nodes of the open hole gravel pack section 1610. As shown in FIG. 37B, a user may select an input 3702 for the design details uncertainty node 1658 in accordance with an embodiment of the present invention. As shown in FIG. 37Bm, the user may select "slurry_density" as the input 3702 for the design details uncertainty node 1658, such as by selecting (e.g., clicking) the button 1678T.

After selection of specific inputs for the open hole gravel pack section 1610, the output from the open hole gravel pack consequences node 1662 depicted in table 3400 in FIG. 34 may change. FIG. 38 depicts the output from the open hole gravel pack consequences node 1662 in accordance with an embodiment of the present invention. For example, after selecting the consequences node 1662, a table 3800 may be displayed that depicts the output from the consequences node 1662 in response to the user selections described above in FIGS. 35A-35D and 37A-37B. The table 3800 includes expected utilities 3802 for open gravel packs 3804 based on the open hole gravel packs input to the open hole gravel pack decision node 1660. For example, the open hole gravel packs 3804 may include "gravel_pack_fluid_water_or_oil_ with_viscosifier", "gravel_pack_fluid_of_water_used_ with_friction_reducer" and "high slurry density of 8 ppa" up to N number of open hole gravel packs ("open_hole_gravel_pack_N"). As shown in table 3800, the "high slurry density of 8 ppa" open hole gravel pack has a recommended expected utility of 1 and a not recommended expected utility of 0. Accordingly, a user may decide to use an open hole gravel pack with a "high slurry density of 8 ppa" in a well completion operation for a drilling system characterized by the inputs additionally entered to the open hole gravel pack section 1610. Additionally, as will be appreciated, the expected utility values have changed to whole numbers, as the user's selection of inputs has removed the probability distributions from the uncertainty nodes (i.e., a user selection has a single probability of "1").

Figure 39:
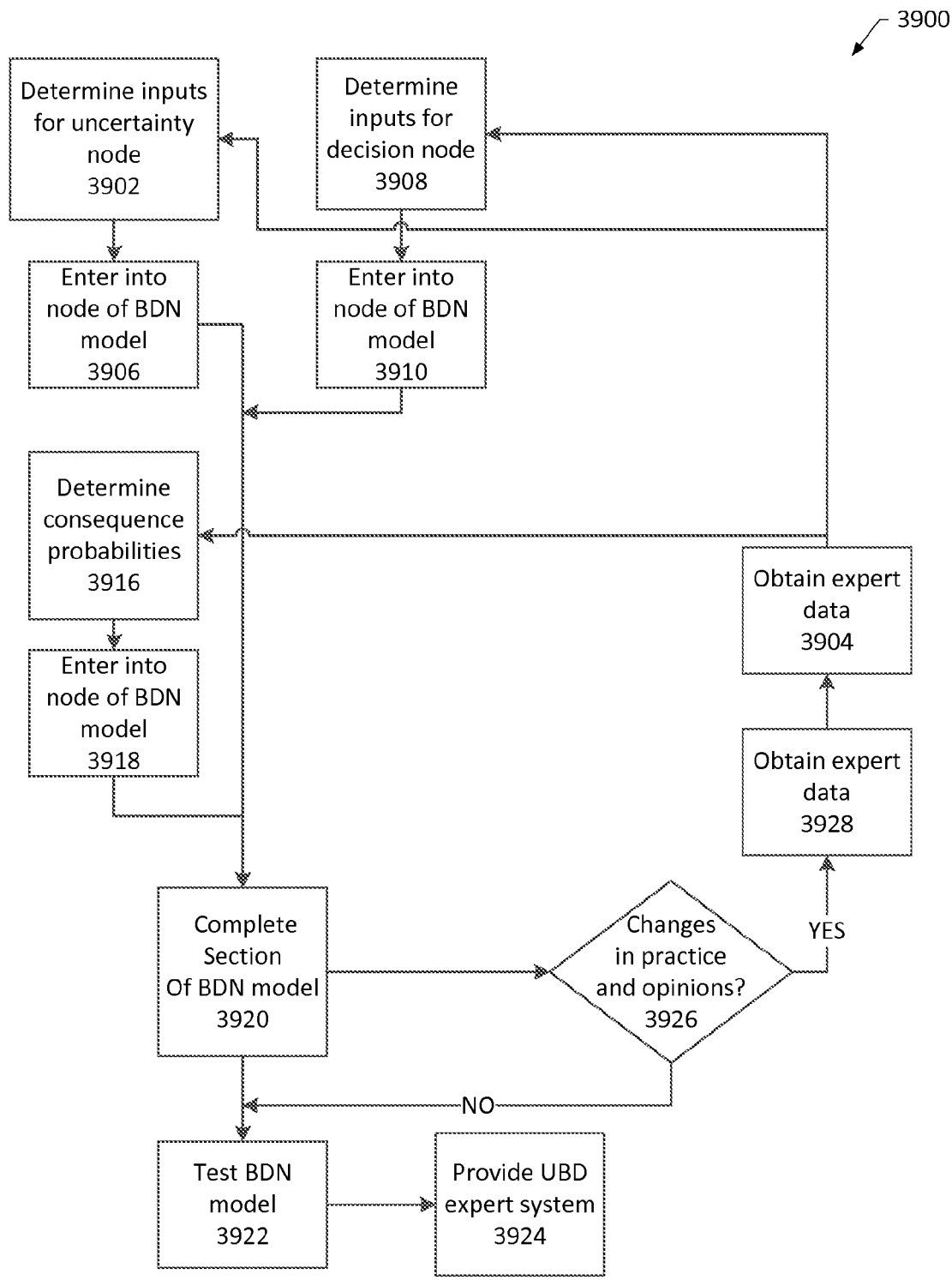
FIG. 39 is a block diagram of a process for constructing the well completion BDN model in accordance with an embodiment of the present invention.

The well completion BDN model 1600 described above may be constructed based on the inputs for the uncertainty nodes, decision nodes, and the associated probabilities. The construction of a section of the various BDN models is illustrated in FIG. 39. FIG. 39 depicts a process 3900 illustrating the construction of a section of a BDN model in accordance with an embodiment of the present invention. The process 3900 depicts the construction of a section having an uncertainty node, a decision node, and a consequences node, arranged in the manner described above. For example, the inputs to an uncertainty node may be determined (block 3902). The inputs for an uncertainty node of a particular section of a specific BDN model may be determined from expert data 3904. For example, in some embodiments expert data may be obtained from various sources, such as consultations with experts, scientific literature, expert reports, and the like. The determine inputs may be entered in the uncertainty node of the appropriate BDN model (block 3906).

Additionally, inputs for a decision node of a section of a specific BDN model may be determined (block 3908). Here again, the inputs may be determined from the expert data 3904. As described above, in some embodiments, the expert data 3904 may be used to generate probability data stored in a database. The determined inputs and associated probability states may then be entered into a decision node of the appropriate BDN model. (block 3910).

Finally the consequence probabilities may be determined based on the Bayesian logic described above in Equations 1, 2, and 4 (block 3912). Here again, the determination of various probabilities may be determined from expert data 3904. For example, various combinations of inputs to the uncertainty node and decision node may result in different probability states as determined from the expert data 3904. The consequence probabilities may then be entered into the consequences node of the appropriate BDN model (block 3914). Next the section of the BDN model may be completed and additional sections may be constructed in the manner described above.

In some embodiments, after completing a section of a BDN model or all sections of a BDN model, the BDN model may be tested (block 3916). For example, inputs to the uncertainty nodes of the BDN model may be selected and the outputs may be tested against manual determinations based on the expert data 3904. Finally, if the model is complete and tested, the well completion expert system incorporating the BDN model may be provided (block 3918).

Advantageously, in the case of new and changed practices, expert opinions, and the like, a BDN model may be updated by changing the probability states for the appropriate nodes. For example, practices, expert opinions, and the like may be reviewed to determine if there are changes (decision block 3920). If there are new or changed practices, expert opinions, or other sources of expert data (line 3922), then additional expert data may be obtained (block 3924) and used to determine inputs to the uncertainty node and decision node of the appropriate section of a BDN model. Any new and changed determinations may be entered into the appropriate nodes and an updated BDN model may be completed (block 3926).

Figure 40:
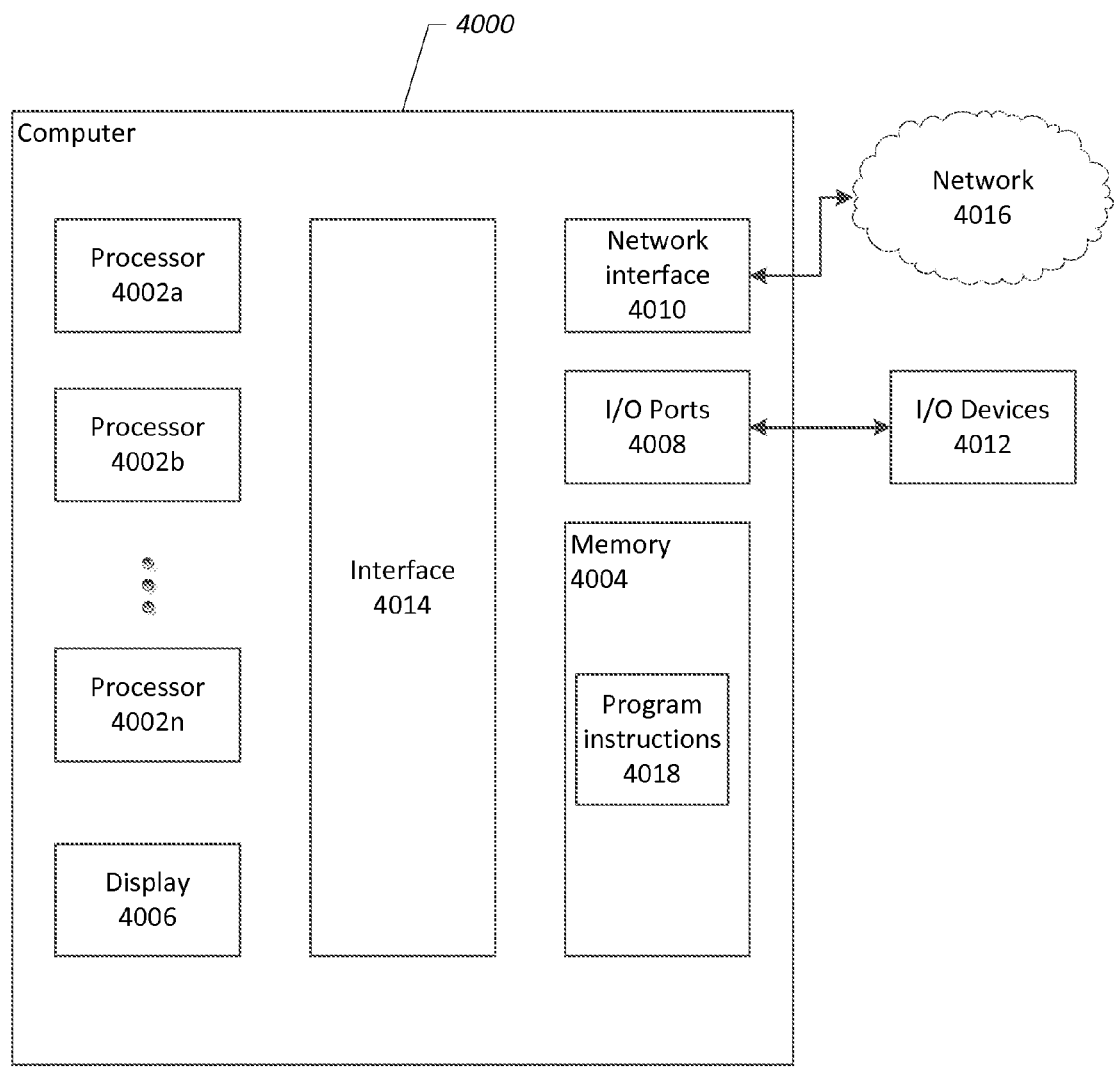
FIG. 40 is a block diagram of a computer in accordance with an embodiment of the present invention.

FIG. 40 depicts a computer 4000 in accordance with an embodiment of the present invention. Various portions or sections of systems and methods described herein include or are executed on one or more computers similar to computer 4000 and programmed as special-purpose machines executing some or all steps of methods described above as executable computer code. Further, processes and modules described herein may be executed by one or more processing systems similar to that of computer 4000. For example, the completion expert system 108 described may be implemented on one or more computers similar to computer 4000 and programmed to execute the Bayesian decision network model described above.

As will be understood by those skilled in the art, the computer 4000 may include various internal and external components that contribute to the function of the device and which may allow the computer 4000 to function in accordance with the techniques discussed herein. As will be appreciated, various components of computer 4000 may be provided as internal or integral components of the computer 4000 or may be provided as external or connectable components. It should further be noted that FIG. 40 depicts merely one example of a particular implementation and is intended to illustrate the types of components and functionalities that may be present in computer 4000. As shown in FIG. 40, the computer 4000 may include one or more processors (e.g., processors 4002a-4002n) coupled to a memory 4004, a display 4006, I/O ports 4008 and a network interface 4010, via an interface 4014.

Computer 4000 may include any combination of devices or software that may perform or otherwise provide for the performance of the techniques described herein. For example, the computer 4000 may be representative of the client computer 200 or a server implementing some or all portions of the completion expert system 108 or other components of the systems described above. Accordingly, the computer 4000 may include or be a combination of a cloud-computing system, a data center, a server rack or other server enclosure, a server, a virtual server, a desktop computer, a laptop computer, a tablet computer, a mobile telephone, a personal digital assistant (PDA), a media player, a game console, a vehicle-mounted computer, or the like. The computer 4000 may be a unified device providing any one of or a combination of the functionality of a media player, a cellular phone, a personal data organizer, a game console, and so forth. Computer 4000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

In addition, the computer 4000 may allow a user to connect to and communicate through a network 4016 (e.g., the Internet, a local area network, a wide area network, etc.) and to acquire data from a satellite-based positioning system (e.g., GPS). For example, the computer 4000 may allow a user to communicate using the World Wide Web (WWW), e-mail, text messaging, instant messaging, or using other forms of electronic communication, and may allow a user to obtain the location of the device from the satellite-based positioning system, such as the location on an interactive map.

In one embodiment, the display 4006 may include a liquid crystal display (LCD) or an organic light emitting diode (OLED) display, although other display technologies may be used in other embodiments. The display 4006 may display a user interface (e.g., a graphical user interface), such a user interface for a Bayesian decision network. In accordance with some embodiments, the display 4006 may include or be provided in conjunction with touch sensitive elements through which a user may interact with the user interface. Such a touch-sensitive display may be referred to as a "touch screen" and may also be known as or called a touch-sensitive display system.

The processor 4002 may provide the processing capability required to execute the operating system, programs, user interface, and any functions of the computer 4000. The processor 4002 may receive instructions and data from a memory (e.g., system memory 4004). The processor 4002 may include one or more processors, such as "general-purpose" microprocessors, and special purpose microprocessors, such as ASICs. For example, the processor 4002 may include one or more reduced instruction set (RISC) processors, such as those implementing the Advanced RISC Machine (ARM) instruction set. Additionally, the processor 4002 may include single-core processors and multicore processors and may include graphics processors, video processors, and related chip sets. Accordingly, computer 4000 may be a uni-processor system including one processor (e.g., processor 4002*a*), or a multi-processor system including any number of suitable processors (e.g., 4002*a*-4002*n*). Multiple processors may be employed to provide for parallel or sequential execution of one or more sections of the techniques described herein. Processes, such as logic flows, described herein may be performed by one or more programmable processors executing one or more computer programs to perform functions by operating on input data and generating corresponding output.

As will be understood by those skilled in the art, the memory 4004 (which may include one or more tangible non-transitory computer readable storage medium) may include volatile memory, such as random access memory (RAM), and non-volatile memory, such as ROM, flash memory, a hard drive, any other suitable optical, magnetic, or solid-state storage medium, or a combination thereof. The memory 4004 may be accessible by the processor 4002 and other components of the computer 4000. The memory 4004 may store a variety of information and may be used for a variety of purposes. The memory 4004 may store executable computer code, such as the firmware for the computer 4000, an operating system for the computer 4000, and any other programs or other executable code necessary for the computer 4000 to function. The executable computer code may include program instructions 4018 executable by a processor (e.g., one or more of processors 4002*a*-4002*n*) to implement one or more embodiments of the present invention. Instructions 4018 may include modules of computer program instructions for implementing one or more techniques described. Program instructions 4018 may define a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, a subroutine. A computer program may or may not correspond to a file in a file system. A program may be stored in a section of a file that holds other programs or data (e.g., one or more scripts stored in a markup language document), in a single file dedicated to the program in question, or in multiple coordinated files (e.g., files that store one or more modules, sub programs, or sections of code). A computer program may be deployed to be executed on one or more computer processors located locally at one site or distributed across multiple remote sites and interconnected by a communication network. In addition, the memory 4004 may be used for buffering or caching during operation of the computer 4000. The memory 4004 may also store data files such as media (e.g., music and video files), software (e.g., for implementing functions on computer 4000), preference information (e.g., media playback preferences), wireless connection information (e.g., information that may enable media device to establish a wireless connection), telephone information (e.g., telephone numbers), and any other suitable data.

As mentioned above, the memory 4004 may include volatile memory, such as random access memory (RAM). The memory 4004 may also include non-volatile memory, such as ROM, flash memory, a hard drive, any other suitable optical, magnetic, or solid-state storage medium, or a combination thereof. The interface 4014 may include multiple interfaces and may couple various components of the computer 4000 to the processor 4002 and memory 4004. In some embodiments, the interface 4014, the processor 4002, memory 4004, and one or more other components of the computer 4000 may be implemented on a single chip, such as a system-on-a-chip (SOC). In other embodiments, these components, their functionalities, or both may be implemented on separate chips. The interface 4014 may be configured to coordinate I/O traffic between processors 4002*a*-4002*n*, system memory 4004, network interface 1400, I/O devices 1412, other peripheral devices, or a combination thereof. The interface 4014 may perform protocol, timing or other data transformations to convert data signals from one component (e.g., system memory 4004) into a format suitable for use by another component (e.g., processors 4002*a*-4002*n*). The interface 4014 may include support for devices attached through various types of peripheral buses, such as a variant of the Peripheral Component Interconnect (PCI) bus standard or the Universal Serial Bus (USB) standard.

The computer 4000 may also include an input and output port 4008 to allow connection of additional devices, such as I/O devices 4012. Embodiments of the present invention may include any number of input and output ports 4008, including headphone and headset jacks, universal serial bus (USB) ports, Firewire or IEEE-1394 ports, and AC and DC power connectors. Further, the computer 4000 may use the input and output ports to connect to and send or receive data with any other device, such as other portable computers, personal computers, printers, etc.

The computer 4000 depicted in FIG. 40 also includes a network interface 4010, such as a wired network interface card (NIC), wireless (e.g., radio frequency) receivers, etc. For example, the network interface 4010 may receive and send electromagnetic signals and communicate with communications networks and other communications devices via the electromagnetic signals. The network interface 4010 may include known circuitry for performing these functions, including an antenna system, an RF transceiver, one or more amplifiers, a tuner, one or more oscillators, a digital signal processor, a CODEC chipset, a subscriber identity module (SIM) card, memory, and so forth. The network interface 1400 may communicate with networks (e.g., network 4016), such as the Internet, an intranet, a cellular telephone network, a wireless local area network (LAN), a metropolitan area network (MAN), or other devices by wireless communication. The communication may use any suitable communications standard, protocol and technology, including Ethernet, Global System for Mobile Communications (GSM), Enhanced Data GSM Environment (EDGE), a 3G network (e.g., based upon the IMT-2000 standard), high-speed downlink packet access (HSDPA), wideband code division multiple access (W-CDMA), code division multiple access (CDMA), time division multiple access (TDMA), a 4G network (e.g., IMT Advanced, Long-Term Evolution Advanced (LTE Advanced), etc.), Bluetooth, Wireless Fidelity (Wi-Fi) (e.g., IEEE 802.11a, IEEE 802.11b, IEEE 802.11g or IEEE 802.11n), voice over Internet Protocol (VoIP), Wi-MAX, a protocol for email (e.g., Internet message access protocol (IMAP), or any other suitable communication protocol.

Various embodiments may further include receiving, sending or storing instructions and/or data implemented in accordance with the foregoing description upon a computer-accessible medium. Generally speaking, a computer-accessible/readable storage medium may include a non-transitory storage media such as magnetic or optical media, (e.g., disk or DVD/CD-ROM), volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" mean including, but not limited to. As used throughout this application, the singular forms "a", "an" and "the" include plural referents unless the content clearly indicates otherwise. Thus, for example, reference to "an element" includes a combination of two or more elements. Unless specifically stated otherwise, as apparent from the discussion, it is appreciated that throughout this specification discussions utilizing terms such as "processing", "computing", "calculating", "determining" or the like refer to actions or processes of a specific apparatus, such as a special purpose computer or a similar special purpose electronic processing/computing device. In the context of this specification, a special purpose computer or a similar special purpose electronic processing/computing device is capable of manipulating or transforming signals, typically represented as physical electronic or magnetic quantities within memories, registers, or other information storage devices, transmission devices, or display devices of the special purpose computer or similar special purpose electronic processing/computing device.

What is claimed is:

1. A system, comprising:
   one or more processors;
   a non-transitory tangible computer-readable memory, the memory comprising:
      a well completion expert system executable by the one or more processors and configured to provide one or more well completion recommendations based on one or more inputs, the well completion expert system comprising a well completion Bayesian decision network (BDN) model, the well completion BDN model comprising:
         a fluid loss formation uncertainty node configured to receive one or more fluid loss formations from the one or more inputs;
         an open hole gravel pack type uncertainty node dependent on the fluid loss formation uncertainty node and configured to receive one or more open hole gravel pack types from the one or more inputs;
         a gravel pack design details uncertainty node configured to receive one or more gravel pack design details from the one or more inputs;
         an open hole gravel pack decision node uncertainty node configured to receive one or more open hole gravel packs from the one or more inputs;
         a completion type decision node configured to receive one or more completion types from the one or more inputs; and
         an open hole gravel pack consequences node dependent on the open hole gravel pack type uncertainty node, the gravel pack design details uncertainty node, the open gravel pack decision node, and the completion type decision node and configured to output one or more well completion recommendations based on one or more Bayesian probabilities calculated from the one or more open hole gravel pack types, the one or more gravel pack design details, the one or more open hole gravel packs, and the one or more completion types.

2. The system of claim 1, comprising a user interface configured to display the well completion BDN model and receive user selections of the one or more input.

3. The system of claim 1, wherein the one or more zonal isolation types, the one or more reliability levels, the one or more cost levels, and the one or more productivity levels each associated with a respective plurality of probabilities.

4. The system of claim 1, wherein the well completion BDN model comprises:
   a completion consequences node dependent on a zonal isolation types uncertainty node, a reliability level uncertainty node, a cost level uncertainty node, a productivity level uncertainty node, a junction classification decision node, and the completion type decision node, wherein the completion consequences node is configured to output the one or more well completion recommendations based on one or more Bayesian probabilities calculated from the one or more zonal isolation types input to the zonal isolation type uncertainty node, one or more reliability levels input to the reliability levels uncertainty node, one or more cost levels input to the one or more cost levels uncertainty node, one or more productivity levels input to the productivity levels uncertainty node, one or more junction classifications input to the junction classifications decision node, and the one or more completion types.

5. A computer-implemented method for a well completion expert system having a well completion Bayesian decision network (BDN) model, the method comprising:
   receiving, at one or more processors, one or more inputs;
   providing, by one or more processors, the one or more inputs to one or more nodes of the well completion BDN model, the one or more nodes comprising:
      a fluid loss formation uncertainty node;
      an open hole gravel pack type uncertainty node dependent on the fluid loss formation uncertainty node;
      a gravel pack design details uncertainty node;
      an open hole gravel pack decision node uncertainty node;
      a completion type decision node; and
      a consequences node dependent on the open hole gravel pack type uncertainty node, the gravel pack design details uncertainty node, the open gravel pack decision node, and the completion type decision node;

determining, by one or more processors, one or more well completion recommendations at the consequences node of the well completion BDN model, the determination comprising a calculation of one or more Bayesian probabilities based on the one or more inputs; and providing, by one or more processors, the one or more well completion recommendations to a user.

6. The computer-implemented method of claim 5, wherein providing, by one or more processors, the one or more well completion recommendations to a user comprises displaying the one or more well completion recommendations in a user interface element of a user interface configured to display the well completion BDN model.

7. The computer-implemented method of claim 5, comprising determining the one or more well completion recommendations at a second consequences node of the well completion BDN model, the determination comprising a calculation of one or more Bayesian probabilities based on the one or more inputs, wherein the one or inputs are provided to a zonal isolation types uncertainty node, a reliability level uncertainty node, a cost level uncertainty node, a productivity level uncertainty, and the completion type decision node.

* * * * *